United States Patent
Utagawa et al.

(10) Patent No.: US 6,529,640 B1
(45) Date of Patent: Mar. 4, 2003

(54) IMAGE PROCESSING APPARATUS

(75) Inventors: Ken Utagawa, Yokohama (JP); Hideaki Matsuda, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/327,677

(22) Filed: Jun. 8, 1999

(30) Foreign Application Priority Data

Jun. 9, 1998 (JP) ............................................ 10-175301
Aug. 28, 1998 (JP) ............................................ 10-259362

(51) Int. Cl.[7] ............................ G06K 9/36; H04N 9/68; G02B 26/02; G03B 7/00
(52) U.S. Cl. ....................... 382/284; 348/234; 359/227; 396/63
(58) Field of Search ................................. 382/284, 300, 382/305, 274, 254, 255, 162; 348/64, 222.1, 234, 238, 264, 340, 218, 344, 348, 361, 207, 229, 298; 359/230, 227; 396/63, 65, 89, 90; 355/120, 79, 85

(56) References Cited

U.S. PATENT DOCUMENTS

| | | | | |
|---|---|---|---|---|
| 4,831,452 A | * | 5/1989 | Takanashi et al. | ......... 348/340 |
| 5,099,317 A | * | 3/1992 | Takemura | .................. 348/264 |
| 5,386,228 A | * | 1/1995 | Okino | ........................ 348/218 |
| 6,011,876 A | * | 1/2000 | Kishner | ...................... 382/284 |
| 6,037,972 A | * | 3/2000 | Horiuchi et al. | .............. 348/64 |

FOREIGN PATENT DOCUMENTS

| JP | 8-223491 | 8/1996 |
|---|---|---|
| JP | 10-155158 | 6/1998 |

OTHER PUBLICATIONS

Yamada, Keiichi et al., "A Method of Dynamic Range Expansion of TV Cameras for Vehicles", *Electronic Information Communication Society*, vol. J78–D–II, No. 10, pp. 1439–1449 (Oct. 1995).

Mizosoe, Hiroki et al., "Study of HD Camera Using Pixel Reduction Method", *ITE Technical Report*, vol. 17, No. 51, pp. 1–6 (Sep. 1993).

* cited by examiner

Primary Examiner—Jose L. Couso
Assistant Examiner—Kanji Patel
(74) Attorney, Agent, or Firm—Miles & Stockbridge P.C.

(57) ABSTRACT

The image reading-out apparatus is capable of always obtaining a good image irrespective of a luminance difference. A control unit controls storage times of a pair of image pickup devices through a timing generator independently, thus controlling these storage times to optimized values. Outputs of both of the image pickup devices are subjected to an AD conversion for a digital data processing, and then a synthesis of luminance is performed by a synthesizer. When an automatic mode is selected, a ratio of storage times of both of the image pickup devices is set so that a synthesized image with a suitable dynamic range is obtained in accordance with an object luminance range detected by a luminance range detection section. On the other hand, when a manual mode is selected, the ratio of the storage times of both of the image pickup devices is set so that a synthesized image intended by a photographer depending on which mode is set among a wide dynamic range preference mode, an image quality preference mode and an intermediate mode.

23 Claims, 42 Drawing Sheets

FIG. 10
(A) OUTPUTS OF IMAGING DEVICE A24a
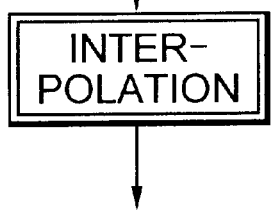
(B) OUTPUTS OF IMAGING DEVICE A24b
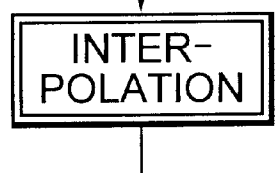
(C)
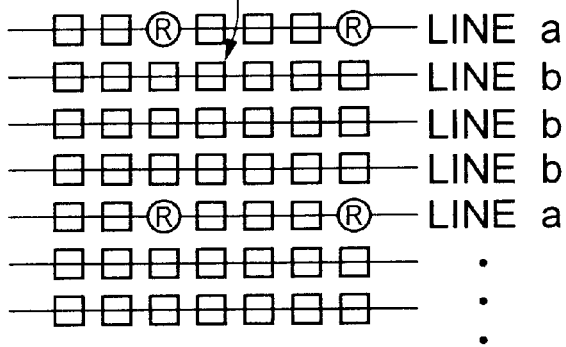
(D)
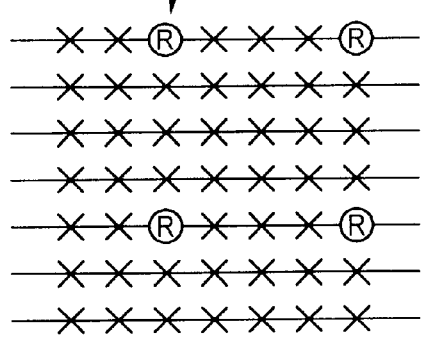

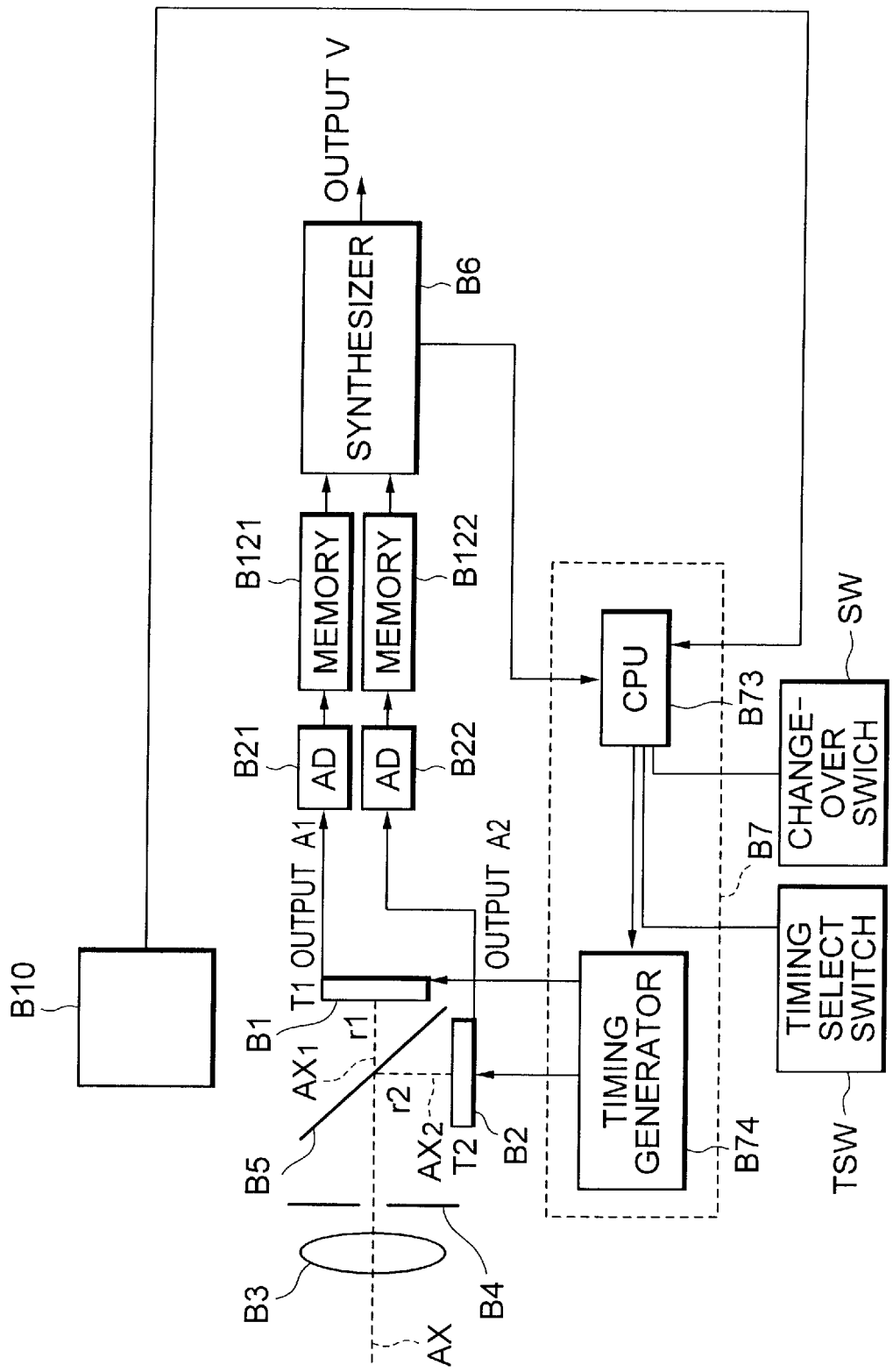

| R | G | R | G |
|---|---|---|---|
| G | B | G | B |
| R | G | R | G |
| G | B | G | B |

B101a

+

| r | g | r | g |
|---|---|---|---|
| g | b | g | b |
| r | g | r | g |
| g | b | g | b |

| R | G | R | G |
|---|---|---|---|
| G | B | G | B |
| R | G | R | G |
| G | B | G | B |

| b | g | b | g |
|---|---|---|---|
| g | r | g | r |
| b | g | b | g |
| g | r | g | r |

| $R_{11}$ | $G_{21}$ | $R_{31}$ | $G_{41}$ |
|---|---|---|---|
| $G_{12}$ | $B_{22}$ | $G_{32}$ | $B_{42}$ |
| $R_{13}$ | $G_{23}$ | $R_{33}$ | $G_{43}$ |
| $G_{14}$ | $B_{24}$ | $G_{34}$ | $B_{44}$ |

| $g_{11}$ | $r_{21}$ | $g_{31}$ | $r_{41}$ |
|---|---|---|---|
| $b_{12}$ | $g_{22}$ | $b_{32}$ | $g_{42}$ |
| $g_{13}$ | $r_{23}$ | $g_{33}$ | $r_{43}$ |
| $b_{14}$ | $g_{24}$ | $b_{34}$ | $g_{44}$ |

B102a

FIG. 40A PRIOR ART
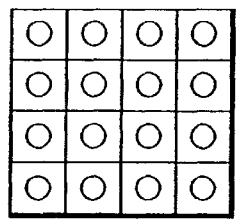
FIG. 40B PRIOR ART
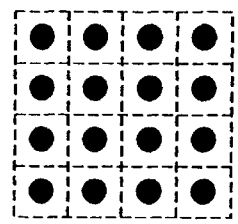
FIG. 40C PRIOR ART
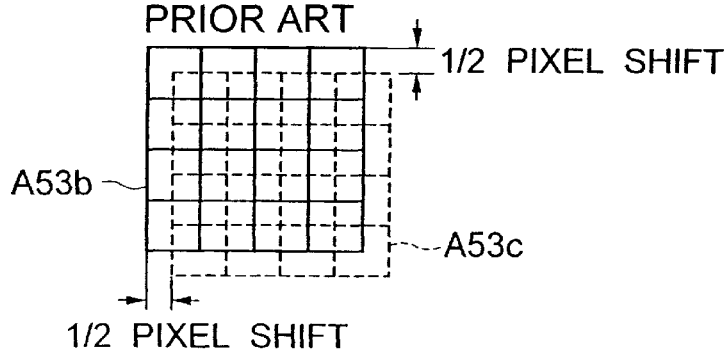
FIG. 40D PRIOR ART
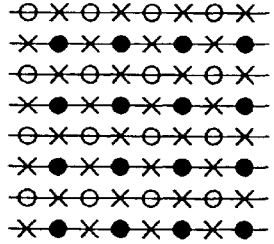
○ :OUTPUT OF DEVICE 53b
● :OUTPUT OF DEVICE 53c
× :BLANK
PRIOR ART FIG. 40E
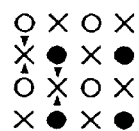
PRIOR ART FIG. 40F
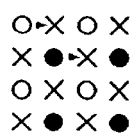
PRIOR ART FIG. 40G
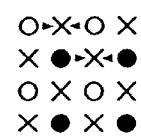

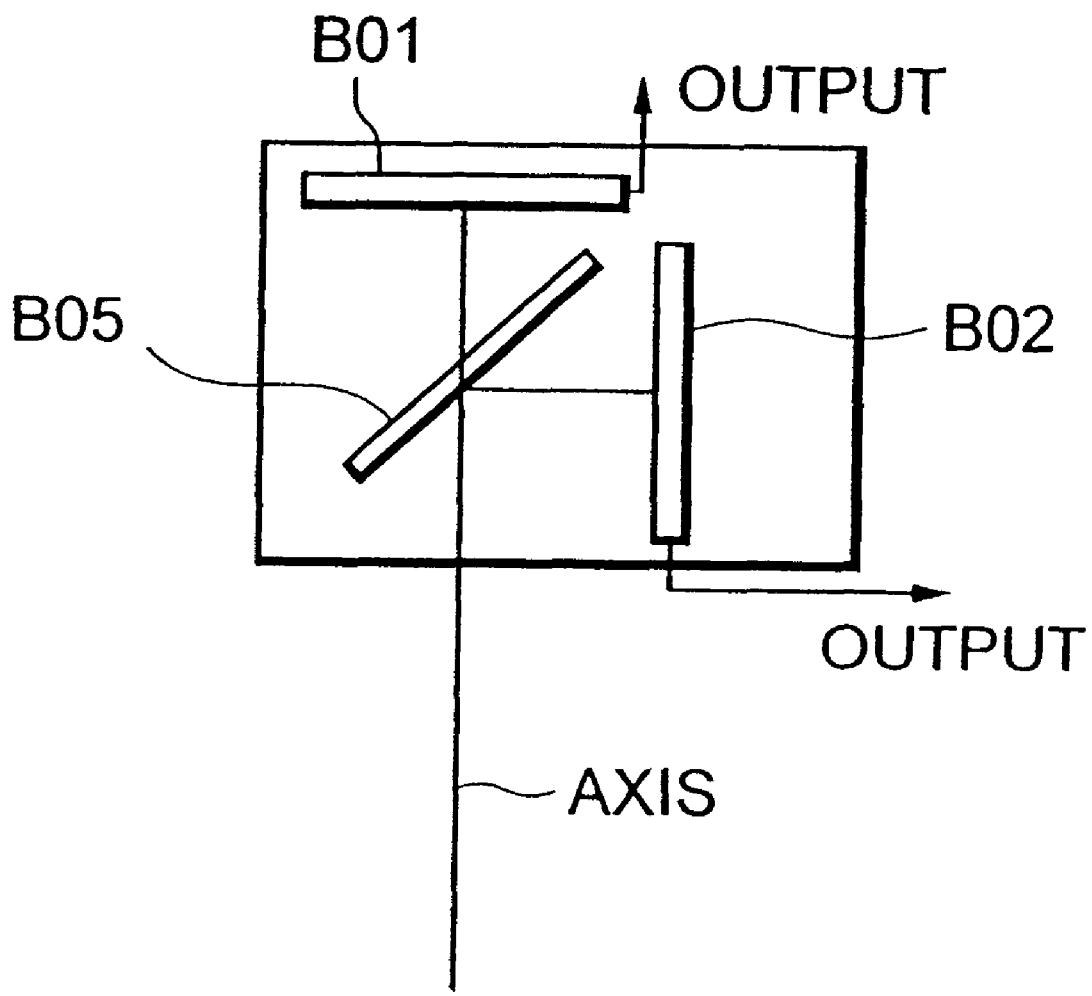

IMAGE PROCESSING APPARATUS

This application claims the benefits of Japanese Application Nos. 9-050132, 10-175301 and 10-259362 which are hereby incorporated by reference.

BACKGROUND OF THE INVENTION

1. Field of the Invention

The present invention relates to an image processing apparatus such as an image pickup apparatus which performs an image pickup using a space pixel offset method and an image take-in apparatus taking a static image as a digital signal, more particularly to an image pickup apparatus which performs an interpolating processing prior to an image superposition and a technology for enlarging a dynamic range of a digital still camera and improving an image quality while reflecting an intention of a photographer.

2. Related Background Art

In general, a plural image sensor type image pickup apparatus using a color separation prism has been incorporated in video cameras and electronic cameras. In order to achieve a high resolution, this plural image sensor type image pickup apparatus adopts an image pickup method so called a space pixel offset method.

The known image pickup apparatus using the space pixel offset method, which was disclosed in Report by Television Technology Society, 17[51], pp. 1–6, 1993, will be described with reference to FIG. 39 and FIGS. 40A to 40G.

Referring to FIG. 39, a dichroic prism A52 is arranged on an optical axis of an taking lens A51, and the dichroic prism A52 separates an incidence light from the taking lens A51 into a mixed light of R and B components (magenta component) and a light of two G components. The color separation for the G component is a separation by a half mirror, and performed irrespective of a wavelength of the incidence light.

A RB image pickup device A53a is arranged in a travelling direction of the mixed light. A color filter array A52a in which red and blue color filters are arranged in a stripe fashion or checkerwise is applied to a image pickup surface of the RB image pickup device A53a. In the RB image pickup device A53a, the R and B components of an optical image are subjected to a photoelectric conversion.

On the other hand, G image pickup devices A53b and A 53c are individually arranged in a travelling direction of the lights of the two G components, and the two G components of an optical image are subjected to a photoelectric conversion in the respective devices.

Each of pixel outputs of the G image pickup device A53b is indicated by a symbol ○ of FIG. 40A, and each of pixel outputs of the G image pickup device A53c is indicated by a symbol ● of FIG. 40B. It should be noted that the G image pickup devices A53b and A53c are arranged so as to be offset in vertical and horizontal directions by ½ pixel from each other.

A signal processing circuit A54 rearranges the pixel outputs of the G image pickup device A53b (indicated by the symbol ○ in FIG. 40A) and the pixel outputs of the G image pickup device A53c (indicated by the symbol ● in FIG. 40B) alternately on corresponding superposition lattice points, thus forming a synthesized image as shown in FIG. 40D. It should be noted that symbols × indicate positions that have no corresponding pixels.

Moreover, the signal processing circuit A54 performs an interpolating processing for vacant lattice points having no corresponding pixels (symbols × in FIG. 40D). As the interpolation method, there have been a upper and lower average interpolation in which the average of outputs of the pixels adjacent to each other in the vertical direction is calculated (see FIG. 40E), a prior value interpolation method in which the interpolation is carried out using the output of the pixel disposed in the immediately prior or left-adjacent position (see FIG. 40F), and a left and right average interpolation method in which the interpolation is carried out by calculating the average of the outputs between the left and right pixels (see FIG. 40G).

By carrying out such an image processing, the image pickup apparatus using the space pixel offset method can achieve a resolution twice that of an image obtained by a single image sensor type image pickup apparatus.

FIG. 41 and FIGS. 42A to 42D are figures for explaining the problems of the prior art by using concrete numerical values for the above described image processing.

As shown in (A) of FIG. 41, assuming that a vertically-striped lattice image is photographed, the vertically-striped image is formed on image pickup planes of the G image pickup devices A53b and A53c. Light receiving cell constituting the G image pickup device A53b correspond to any of bright and dark portions of the stripe, so that the light receiving cell have a quantity of received light amounting to "0" or "4". Furthermore, light receiving cells constituting the G image pickup device A53c corresponds to a boundary portion between the bright and dark portions of the stripe, so that all of the light receiving cells have a quantity of received light amounting to "2".

The signal processing circuit A54 replaces the pixel output, which has been subjected to the photoelectric conversion by the G image pickup device A53b, with a position on a synthesized lattice point, thus forming an image shown in (B) of FIG. 41. Moreover, the pixel output of the image pickup device A53c is replaced with a position on the synthesized lattice point, thus forming an image shown in (C) of FIG. 41.

The signal processing circuit A54 synthesizes these two images, thus forming a synthesized image shown in (D) of FIG. 41. The superposition of the two images is conducted by rearranging each of the pixels of (C) in FIG. 41 on corresponding one of the vacant lattice points of (B) in FIG. 41. For example, the pixel "a" is rearranged on the position of the lattice point "a".

Next, the signal processing circuit A54 performs an interpolation processing for vacant lattice points of the synthesized image. For the vacant lattice points of the synthesized image, instead of the interpolation processing mentioned above, an adjacent evenness interpolation processing is sometimes performed. The adjacent evenness interpolation processing is the one in which a weighted sum of the matrix is calculated relative to each of the pixels adjacent to the vacant lattice points to be interpolated and the obtained value is used as the interpolation value. The interpolation results are shown in FIGS. 42A to 42D. It should be noted that FIG. 42A is a figure showing the vertical average interpolation, FIG. 42B is a figure showing the prior value interpolation, FIG. 42C is a figure showing the horizontal average interpolation, and FIG. 42D is the adjacent evenness interpolation. For example, when the interpolation matrix as shown in FIG. 42D is used, each of the pixels located in the positions adjacent to the vacant lattice points vertically and horizontally is multiplied by ¼, and the sum of the multiplied values is used as the interpolation value.

Hereupon, when the edge portions of FIGS. 42A to 42D are paid attention to, in all of the interpolation methods other than the vertical interpolation method, image degrading artifacts are generated in the edge portion, and a distortion of the image, which is mosaic-like, occurs. This is because pixel outputs of the G image pickup device A53c that are other image information contribute to the interpolation in addition to the pixel output of the G image pickup device A53b, so that the image degrading artifacts are generated.

Since when a horizontal stripe lattice image is photographed, the horizontal stripe lattice image is obtained by rotating the vertical lattice image by 90 degrees, image degrading artifacts are not generated in the horizontal average interpolation. However, the image degrading artifacts are generated in the vertical average interpolation, so that a distortion of an image, which is mosaic-like, occurs in the edge portion.

Specifically, when the interpolation processing is performed for the image including the vertical stripe lattice image and the horizontal stripe lattice image, or the image containing the edge portion, the conventional image pickup apparatus has posed a problem that the image degrading artifacts are always generated in the edge portion.

In the conventional image pickup apparatus, the image degrading artifacts are removed by performing a smoothening processing for the image using a linear filter. However, the image degrading artifacts cannot be removed perfectly, and in an image pickup apparatus for which a finer and higher image quality is demanded, the generation of the image degrading artifacts in the edge portion cause deterioration in the image quality.

Hereupon, although a low cost camera can be obtained as the image pickup device becomes smaller, an increase in the number of pixels entails increases in individual pixel sizes, and a dynamic range of the image pickup device that has been rather lacking is apt to be more lacking. As a countermeasure for this, a method for using a plurality of image pickup results obtained by varying light exposure has been known.

In Japanese Patent Application Laid-open No. 8-223491, as shown in FIG. 43, a quantity of incidence light onto an image pickup device B01 is made to be different from that onto an image pickup device B02 by a light splitting mirror B05, and an output from one of the image pickup devices B01 and B02 which receives less quantity of the incidence light is amplified. Then, the output of the other image pickup device which receives much quantity of the incidence light is joined with the output of the image pickup device which receives less quantity of the incidence light, thus enlarging the dynamic range.

As another method, a method in which an image is consecutively taken in with different storage time using one image pickup device CCDB001 as shown in FIG. 44 has been known. An operation of this method will be described concretely. An image is taken in with a long exposure time, and the image taken in is temporarily stored in a memory. An image is taken in with a short time, and this image is synthesized on the image that has previously been taken in and stored in the memory, thus forming a synthesized image with a enlarge dynamic range. For example, this method is disclosed in the literature "Dynamic Range Enlarging Method for Car Loading", Electronic Information Communication Society, pp. 1439, October, 1995.

A principle of the dynamic range enlargement is shown in FIG. 45. Two images in which light exposure is changed against a certain object are taken in. At this time, although one of the two images with a larger light exposure is saturated in the high luminance portion (or high brightness portion) portion, the other image with a smaller light exposure is not saturated yet, and it is saturated when the luminance becomes considerably high. Considering the difference between the light exposures of the two images, the image with a large light exposure is used in the low luminance portion, and the image with a small light exposure is used in the high luminance portion, thus superposing the two images. As a result, an image with an equivalently enlarged dynamic range can be obtained.

The luminance difference (or brightness difference) of the object differs depending on a scene. There are a cases where the luminance difference can be covered with a dynamic range of one image pickup device, for example, about 400 times or less, and the luminance difference can not be covered with the dynamic range, for example, several thousand times.

With small luminance difference of the object, if photography is performed at a range where the light exposure of the pair of image pickup devices does not vary so much, a good image with a more inconspicuous boundary of the synthesize can be obtained. On the other hand, with a large luminance difference of the object, if the photography is performed at a range where the light exposure of the pair of image pickup devices greatly vary, a good image with a wide dynamic range can be obtained.

However, in the prior art shown in FIG. 43, since a ratio of the light exposure of the pair of image pickup devices is steady, an image at a steady range of the luminance of the object is always taken in irrespective of the difference of the luminance of the object. For this reason, a good image coping with the variation of the difference of the luminance of the object cannot be obtained.

Moreover, in the prior art shown in FIG. 44, an image is consecutively taken in, so that in photographing a moving object, a deviation of the image or an image-ghosting occurs in the high and low luminance portions.

SUMMARY OF THE INVENTION

To solve the above-described problems, the object of the present invention is to provide an image pickup apparatus using a space pixel offset method which is capable of preventing a generation of an image degrading artifacts in an edge portion.

Moreover, the object of the present invention is to always obtain a good image irrespective of a luminance difference of an object.

An image pickup apparatus of the present invention which performs a photoelectric conversion for each of optical images which are individually formed on corresponding one of light receiving planes via an image pickup optical system and light splitting means, thereby generating image information, and performs an image pickup by a space pixel offset method by a plurality of image pickup means which are arranged while offsetting along the light receiving planes, wherein further provided is interpolating means for performing a pixel interpolation for the image information generated by each of the image pickup means and joining space phase of each of the image information, and image synthesizing means for adding pixel outputs corresponding to the image information which are subjected to the pixel interpolation by the interpolating means, thereby forming a synthesized image.

In the foregoing image pickup apparatus, the pixel information are subjected to the interpolation processing only by the pixels of that image information. Therefore, since the pixel interpolation is performed without using the pixel outputs of other image pickup devices, a generation of image degrading artifacts in an edge portion can be prevented, so that a mosaic-like image having no distortion can be obtained.

Moreover, all of the pixels constituting the synthesized image is produced as a result of the addition processing, so that random noises such as thermal noises can be more surely reduced at the time of the pixel addition.

In the image pickup apparatus to which the present invention is applied as described above, since the generation itself of the image degrading artifacts in the edge portion can be prevented, a constitution for removing the image degrading artifacts can be simplified, thus obtaining an image pickup apparatus with a high image quality and resolution.

Moreover, an image taking-in apparatus of the present invention comprises a splitting optical system arranged on an incidence optical axis from an object, the splitting optical system separating an optical path into two directions; first and second image pickup means, the first image pickup means being arranged on an optical axis of one optical path separated by the splitting optical system and the second image pickup means being arranged on an optical axis of the other optical path separated by the splitting optical system; a first selecting means for selectively switching between an automatic mode in which the apparatus automatically sets a dynamic range of a picked-up image to a predetermined range and a manual mode in which a photographer manually sets the dynamic range to a desired range; object luminance (or brightness) range detecting means for detecting an object luminance range that is a luminance range of an object; an AD converting means for performing an AD conversion for outputs of the first and second image pickup means; synthesizing means for synthesizing the outputs of the foregoing first and second image pickup means, which have been subjected to the AD conversion, to output the synthesized output; and control means for setting a storage time of image information of said first image pickup means and a storage time of image information of said second image pickup means in response to the object luminance range detected by the object luminance range detecting means when the automatic mode is selected by the first selecting means.

With such constitution of the image taking-in apparatus of the present invention, in the automatic mode for controlling the dynamic range automatically, an image with a suitable dynamic range can be taken in by setting the storage time for each of the first and second image pickup means in response to a luminance difference of the object, so that a good image in response to the luminance difference of the object can be obtained.

Another image taking-in apparatus of the present invention comprises a splitting optical system arranged on an incidence optical axis of an object, the splitting optical system separating an optical path into two directions and keeping a light quantity separation ratio at a predetermined value; first and second image pickup means, the first image pickup means being arranged on an optical axis of one optical path separated by the splitting optical system and the second image pickup means being arranged on an optical axis of the other optical path separated by the splitting optical system; object luminance range detecting means for detecting an object luminance range that is a luminance range of an object; AD converting means for performing an AD conversion for outputs of the first and second image pickup means; synthesizing means for synthesizing the outputs of the first and second image pickup means, which have been subjected to the AD conversion, to output the synthesized output; and control means for setting a storage time of image information of the first image pickup means and a storage time of image information of the second image pickup means in response to the object luminance range detected by the object luminance range detecting means.

With such constitution of the image taking-in apparatus of the present invention, an image with a suitable dynamic range can be taken in by setting the storage time for each of the first and second image pickup means in response to a luminance difference of the object, so that a good image in response to the luminance difference of the object can be obtained.

Another image taking-in apparatus of the present invention comprises a splitting optical system arranged on an incidence optical axis of an object, the splitting optical system separating an optical path into two directions; first and second image pickup means, the first image pickup means being arranged on an optical axis of one optical path separated by the splitting optical system and the second image pickup means being arranged on an optical axis of the other optical path separated by the splitting optical system; adjusting means for manually setting a dynamic range of a picked-up image to a desired range by a photographer; AD converting means for performing an AD conversion for outputs of the first and second image pickup means; synthesizing means for synthesizing the outputs of the first and second image pickup means, which have been subjected to the AD conversion, to output the synthesized output; and control means for setting a storage time of image information of said first image pickup means and a storage time of image information of said second image pickup means in response to the desired range set by said adjusting means.

With such constitution of the image taking-in apparatus of the present invention, an image with a suitable dynamic range can be taken in by setting the storage time for each of the first and second image pickup means in response to a desired range set by the adjusting means, so that a good image having a desired dynamic range can be obtained.

According to a preferable aspect of the present invention, when the first selecting means selects the foregoing automatic mode, the foregoing control means selects a ratio (T1/T2) of the storage time T1 of the first image pickup means to the storage time T2 of the second image pickup means is selected in response to the object luminance range detected by the object luminance range detecting means.

Moreover, according to a preferable aspect of the present invention, further provided is second selecting means which, in the case where the photographer set the dynamic range of the pickup image to a desired range manually, is capable of selectively switching an extent of the dynamic range.

According to a preferable aspect of the present invention, in the case where the photographer set the dynamic range of the pickup image to a desired range manually, the ratio (T1/T2) of the storage time T1 of the first image pickup means to the storage time (T2) of the second image pickup means is selected in accordance with the extent of the dynamic range selected by the second selecting means.

Moreover, according to a preferable aspect of the present invention, when a rate of a light quantity separated into the first image pickup means is indicated by r1 and a rate of a light quantity separated into the second image pickup means is indicated by r2, the ratio (r1/r2) is assumed to be a value other than 1. For example, the ratio (r1/r2) is a fixed value ranging from 2 to 20. Thus, a deterioration in an image quality due to a very large difference between the storage times of the first and second image pickup means can be prevented while securing the dynamic range of the image taking-in apparatus.

According to a preferred aspect of the present invention, the ratio (r1/r2) is a fixed value ranging from 4 to 10.

According to a preferred aspect of the present invention, further provided is third selecting means which selects a relative relation between the timing of the storage time T1 of the first image pickup means and the timing of the storage time T2 of the second image pickup means at the time of a release operation, and the foregoing control means controls the first and second image pickup means in accordance with the relative relation between the timings selected by the third selecting means. Thus, an image of a moving object with least blur can be obtained, or an image using blur or image-ghosting as expression means can be obtained.

In a preferable aspect of the present invention, when a difference between completion times when the storage times of the first and second image pickup devices terminate is equal to a predetermined value or more, image information outputted from one image pickup means with a shorter storage time is first read out, and held in memory means temporarily. Image information outputted from the other image pickup means with a longer storage time is subsequently read out. The synthesize of the image is performed by the synthesizing means based on the image information stored in the memory means and the image information of the other image pickup means. Thus, a problem of signal deterioration at the time when the image information is kept or hold at the first and second image pickup devices.

In a preferable aspect of the present invention, further provided are processing means for transforming grayscale (or compressing a gradation) of each of image information outputted from the first and second image pickup means, and an image synthesize is performed by the synthesizing means based on the image information that has been subjected to the grayscale transformation by the processing means. Thus, a dynamic range with more large extent can be secured.

According to a preferable aspect of the present invention, the foregoing object luminance range detection means is realized by using the foregoing first and second image pickup devices, and the foregoing storage times T1 and T2 are changed in a state where a ratio (T1/T2) of the storage time T1 of the first image pickup device to the storage time T2 of the second image pickup device is kept at a predetermined value or more, thereby detecting an object luminance range. Thus, a structure of the image taking-in apparatus can be simplified and economical.

According to a preferred aspect of the present invention, the foregoing synthesizing means performs the synthesis at a luminance over-lapping portion where a luminance of image information outputted from the foregoing first and second image pickup devices overlaps, by using a weight function which value changes in accordance with the luminance continuously, and in the case where the foregoing first selecting means selects the foregoing automatic mode, the weight function changes its shape and parameter in accordance with the foregoing object luminance range. Thus, a discontinuity at a boundary produced at the time when images outputted from the foregoing first and second image pickup devices are synthesized at the automatic mode can be lessened.

According to a preferred aspect of the present invention, the foregoing synthesizing means performs the synthesis at a luminance over-lapping portion where a luminance of image information outputted from the first and second image pickup devices overlaps, by using a weight function which changes in accordance with the luminance continuously, and in the case where a photographer a dynamic range of a photographed image set to a desired range manually, the weight function changes its shape and parameter in accordance with the desired range set. Thus, a discontinuity at a boundary produced at the time when images outputted from the foregoing first and second image pickup devices are synthesized at the manual mode can be lessened.

In a preferred aspect of the present invention, the foregoing synthesizing means performs a synthesis by adding image information outputted from the first and second image pickup means forcibly. In this case, since a calculation processing of the weight function can be omitted, a processing for the synthesis can be performed at a high speed. Moreover, since noises are averaged by output images of the first and second image pickup means, the noises are decreased, thus improving an image quality. When a ratio of a light exposure of the first image pickup device to that of the second image pickup device is larger or smaller than 1, a discontinuity of a gradient of the output occurs at a portion where the image pickup device with a larger light exposure is saturated. If the ratio of the light exposure is set selectively to a suitable value, the region can be used as a knee characteristic region, so that an influence of the discontinuity on a final image can be almost removed.

A preferred aspect of the present invention, further comprises a strobe(, or flash or speed light), fourth selecting means for selecting a flash made of the strobe, and strobe light reaching region discriminating means for detecting the region where the strobe light reaches in the image. The foregoing synthesizing means performs a synthesis at a luminance overlapping portion where image outputs outputted from the foregoing first and second image pickup devices by using a weight function which value changes in accordance with a luminance continuously, and the weight function changes its shape and parameter in accordance with results discriminated by the strobe reaching region discriminating means. Thus, an image with a wide dynamic range can be obtained at the time of use of the strobe.

A preferred aspect of the present invention, further comprises a strobe(or flash) and fourth selecting means for selecting a flash mode of the strobe. The foregoing control means controls the first and second image pickup devices so that storage times of the first and second image pickup devices become equal to each other automatically at the time of use of the strobe. The foregoing synthesizing means performs a synthesis by forcibly adding image information outputted from the first and second image pickup devices. Accordingly, a S/N ratio is increased, thus obtaining a good image.

According to the preferred aspect of the present invention, the first and second image pickup devices are respectively color image pickup means capable of taking in a full color image independently.

According to the preferred aspect of the present invention, the color image pickup means has an on-chip color filter. Pixels are arranged in the relatively same position, and colors of the on-chip color filter are arranged in relatively shifted positions.

According to the preferred aspect of the present invention, in the case where the first selecting means selects the automatic mode, an algorithm of the synthesis by the synthesizing means is switched depending on whether or not the object luminance range is broader than a predetermined value.

According to the preferred aspect of the present invention, in the case where a photographer sets a dynamic range of a photographed image to a desired range, the synthesizing means switches an algorithm of the synthesis by the synthesizing means depending on a broadness of the dynamic range selected by the second selecting means.

According to the preferred aspect of the present invention, the foregoing first and second image pickup means are respectively color image pickup means capable of taking a full color image independently. In the case where the first selecting means selects the automatic mode, the synthesizing means synthesizes images using an algorithm which prefers a prevention of a false color and an enhancement of a resolution, at the time when the foregoing object luminance range is narrow. The foregoing synthesizing means synthesizes images by using an algorithm which prefers a dynamic range extension, at the time when the foregoing object luminance range is broad.

According to the preferred aspect of the present invention, the first and second image pickup means are respectively color image pickup means capable of taking a full color image independently. In the case where a photographer sets a dynamic range of a photographed image to a desired range manually, the synthesizing means synthesizes images by using an algorithm which prefers a prevention of a false color and an enhancement of a resolution at the time when a narrow dynamic range is selected by the second selecting means. When a wide dynamic range is selected by the second selecting means, the synthesizing means synthesizes images by using an algorithm which prefers a dynamic range extension. Thus, a discontinuity at a boundary at the time when the images outputted from the first and second image pickup means are synthesized can be lessened.

In the preferred aspect of the present invention, a strobe and fourth selecting means for selecting a state of use or not (a flash mode) of the strobe are further provided. When the strobe is used, timing of the flash of the strobe is allowed to match with the timing selected by the foregoing third selecting means. When the strobe is made to flash in accordance with the exposing time of the foregoing first and second image pickup means, effects such as a front-curtain synchro-photography and a rear-curtain synchro-photography are obtained.

In another image taking-in apparatus of the present invention, the first and second image pickup means are arranged on an optical axis of one optical path split by the splitting optical system and an optical axis of the other optical path split by the splitting optical system, and color filters with a Bayer array are provided at positions which are relatively shifted from the corresponding position by one pixel, so that colors of two sets of the color filters will be arranged at an interpolation relation, thereby reducing the false color.

A principle of the present invention will be described briefly.

In the image taking-in apparatus of the present invention, the two image pickup means (first and second image pickup devices) are used, and a ratio of a storage time of the first image pickup means to that of the second image pickup is made to be variable, whereby a good image in accordance with a luminance difference of an object and an image according to an intention of a photographer can be obtained.

An apportionment of a quantity of light for the second image pickup device should be small, for example, less than $1/3$, and an apportionment of a quantity of light for the first image pickup device should be large, for example, more than $2/3$, as long as a decrease in a quantity of light due to splitting of the light into the two image pickup device can be prevented and a difference between storage times (exposure times) T1 and T2 of the first and second image pickup devices is not extremely large. In this case, a ratio of the apportionment of the quantity of the light for the first and second image pickup devices is 2 or more.

When an ordinary use state is selected, that is, when an automatic mode for controlling a dynamic range automatically is selected, a camera selects a ratio of the optimized storage times (T1/T2) automatically in accordance with an object luminance detected by object luminance range detecting means. An image with a wide dynamic range is photographed for an image or object with a wide luminance range, and an image with a high quality is photographed for a narrow luminance range.

Since a case where an intention of a photographer is not reflected may occur in the foregoing automatic mode, a manual mode for manually adjusting the dynamic range can be set. When such manual mode is selected, a wide dynamic range preference mode or a narrow dynamic range mode (image quality preference mode) can be selected.

In the wide dynamic range preference mode, an image with a wide dynamic range and less black and white blur (the black blur means a phenomena in which the tone of dark portion is lost, and the white blur means a phenomena in which the tone of the information beyond 100% is lost or extreme highlight details lost) can be always obtained by suitably synthesizing image information. On the other hand, in the image quality preference mode, trough the dynamic range is equal to that in the case of the single image sensor type image pickup device, an image with a good resolution and less false color can be obtained by suitably synthesizing image information.

For reference, a concrete example of an algorithm for synthesizing the image information outputted from the first and second image pickup devices will be described below.

Assuming that an output value corresponding to the pixel position (x, y) of the image photographed under the exposure condition Ei is Li(x, y) (i=1, 2), the image Lwid(x, y) with a broadened dynamic range is obtained as follows.
for i=1 to i=2 do
    for (x, y)=(0, 0) to (X−1, Y−1) do
        if i=1 then
            Lwid (x, y)=L1(x, y) (E2/E1) γ
        else
            if L2(x, y)<Lsat
            then Lwid (x, y)=L2(x, y)
where E2/E1 is a ratio of the light exposure of the first image pickup device to that of the second image pickup device, γ is a parameter of the γ correction, and Lsat is a saturation value of the output of the second image pickup device.

Next, a synthesis method to which another algorithm is applied will be described. In the foregoing method, there is a possibility that a discontinuity occurs in the boundary portion between the regions photographed under different exposure conditions. Therefore, in the overlapping region of the luminance, a method for synthesizing by using a weight function which value continuously changes in accordance with the luminance is adopted. In this case, the image Lwid (x, y) is obtained as follows.
for i=1 to i=2 do
    for (x, y)=(0, 0) to (X−1, Y−1) do
        if i=1 then
            Lwid (x, y)=L1 (x, y) (E2/E1) γ
        else Lwid (x, y)=f(L2(x, y)) L2(x, y) (E2/E1) γ+{1−f(L2 (x, y))} Lwid γ where f is a weight function at the time of the image synthesis.

BRIEF DESCRIPTION OF THE DRAWINGS

For a more complete understanding of the present invention and the advantages thereof, reference is now made to the following description taken in conjunction with the accompanying drawings.

FIG. 10 is a figure for explaining an image processing in the image pickup apparatus of the third embodiment.

FIG. 20 is a block diagram showing a constitution of an image taking-in apparatus according to a sixth embodiment.

FIGS. 34A to 34B are figures showing an example of a color filter arrangement in the apparatus of FIG. 33.

FIGS. 35A to 35B are figures showing another example of a color filter arrangement in the apparatus of FIG. 33.

FIGS. 36A to 36B are figures showing still another example of a color filter arrangement in the apparatus of FIG. 33.

FIGS. 40A to 40G are figures for explaining a space pixel offsetting method.

FIG. 43 shows another type of conventional image pickup apparatus.

DESCRIPTION OF THE PREFERRED EMBODIMENTS (First Embodiment)

Figure 1:
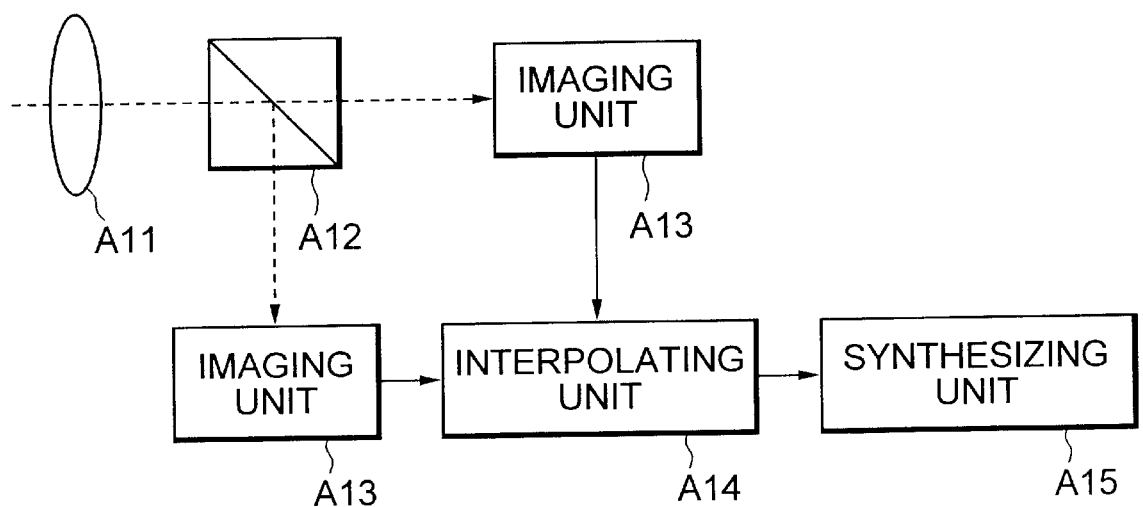
FIG. 1 is a block diagram showing an image pickup apparatus of a first embodiment.

FIG. 1 is a block diagram of an image pickup apparatus of a first embodiment. This image pickup apparatus generates image information by performing a photoelectric conversion for optical images formed on respective light receiving planes via a pickup optical system A11 and a light splitting unit A12, and performs a pickup operation by a space pixel offsetting method with a plurality of pickup units A13 and A13 which are arranged along the light receiving planes while shifting from each other. The pickup apparatus comprises an interpolation unit A14 for performing a pixel interpolation for both of the image information data generated by the pickup units A13 and A13 and matching a spatial phase of the image information data; and an image synthesizing unit A15 for adding pixel outputs corresponding to the image information data that have been subjected to the pixel interpolation by the interpolation unit A14 and forming a synthesis image.

Figure 2:
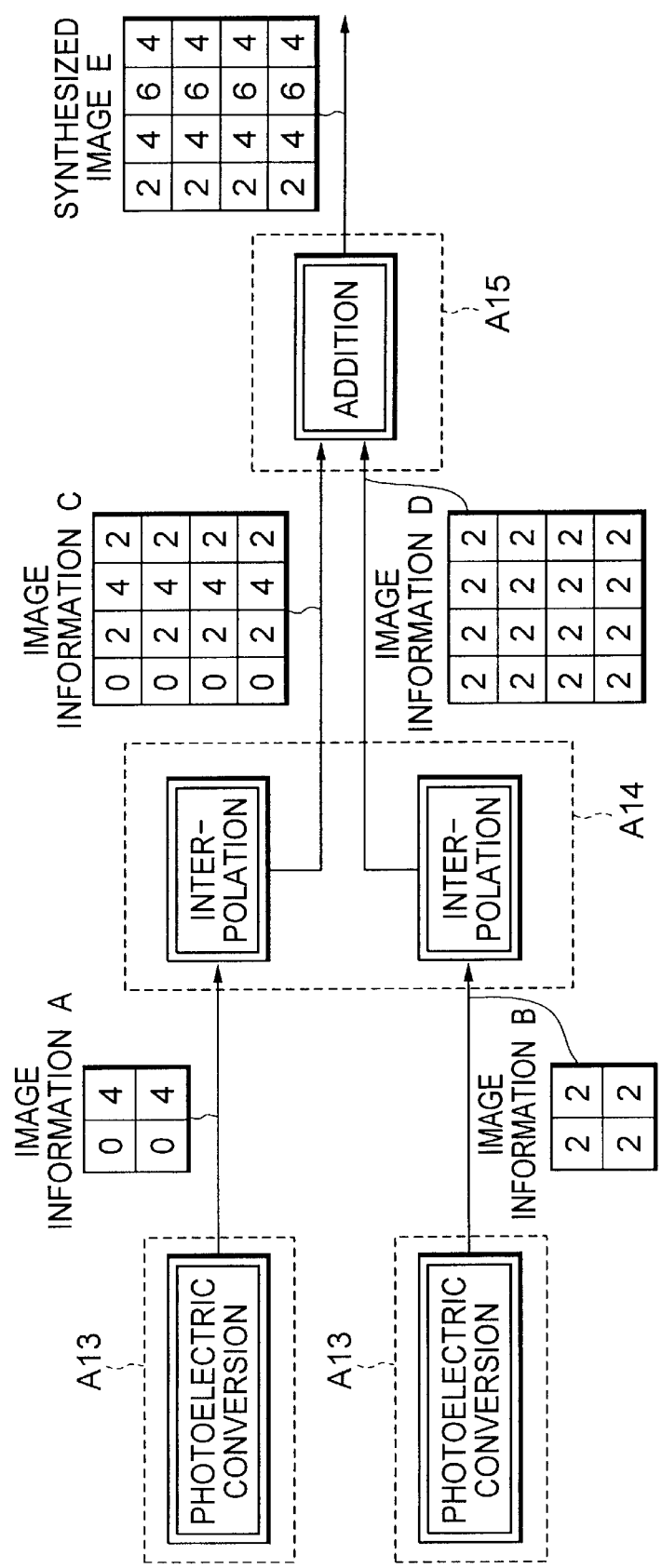
FIG. 2 is a figure for explaining an operation of the image pickup apparatus of the first embodiment.

FIG. 2 is a figure for explaining an operation of the pickup apparatus of FIG. 1. It is assumed that the pickup apparatus performs a pickup operation for an image having an edge portion (hereinafter, referred to as an edge image) using the space pixel offsetting method.

One pickup unit A13 generates image information A by performing a photoelectric conversion for the edge image. The other pickup unit A13 generates image information B by performing a photoelectric conversion for the edge image. It is assumed that in one pickup unit A13 each light receiving cell receives a light receiving amount of, for example, "0" or "4" and in the other pickup unit A13 each light receiving cell receives a light receiving amount of, for example, "2". Next, the interpolation unit A14 performs an interpolation processing for the image information A and creates image information C. Moreover, the interpolation unit A14 performs the interpolation processing for the image information B and creates image information D. It should be noted that the image information C and D that are the result of the interpolation processing are mere examples. The image synthesis unit A15 adds the pixel outputs corresponding to the respective information C and D, and forms a synthesis image E.

As described above, the interpolation unit A14 creates the image information C only from the pixel outputs of the image information A, and creates the image information D only from the pixel outputs of the image information B. Therefore, since the interpolation processing can be performed without using the pixel outputs of another pickup unit A13, image degrading artifacts are not generated in the edge portion of the synthesis image E.

(Second Embodiment)

Figure 3:
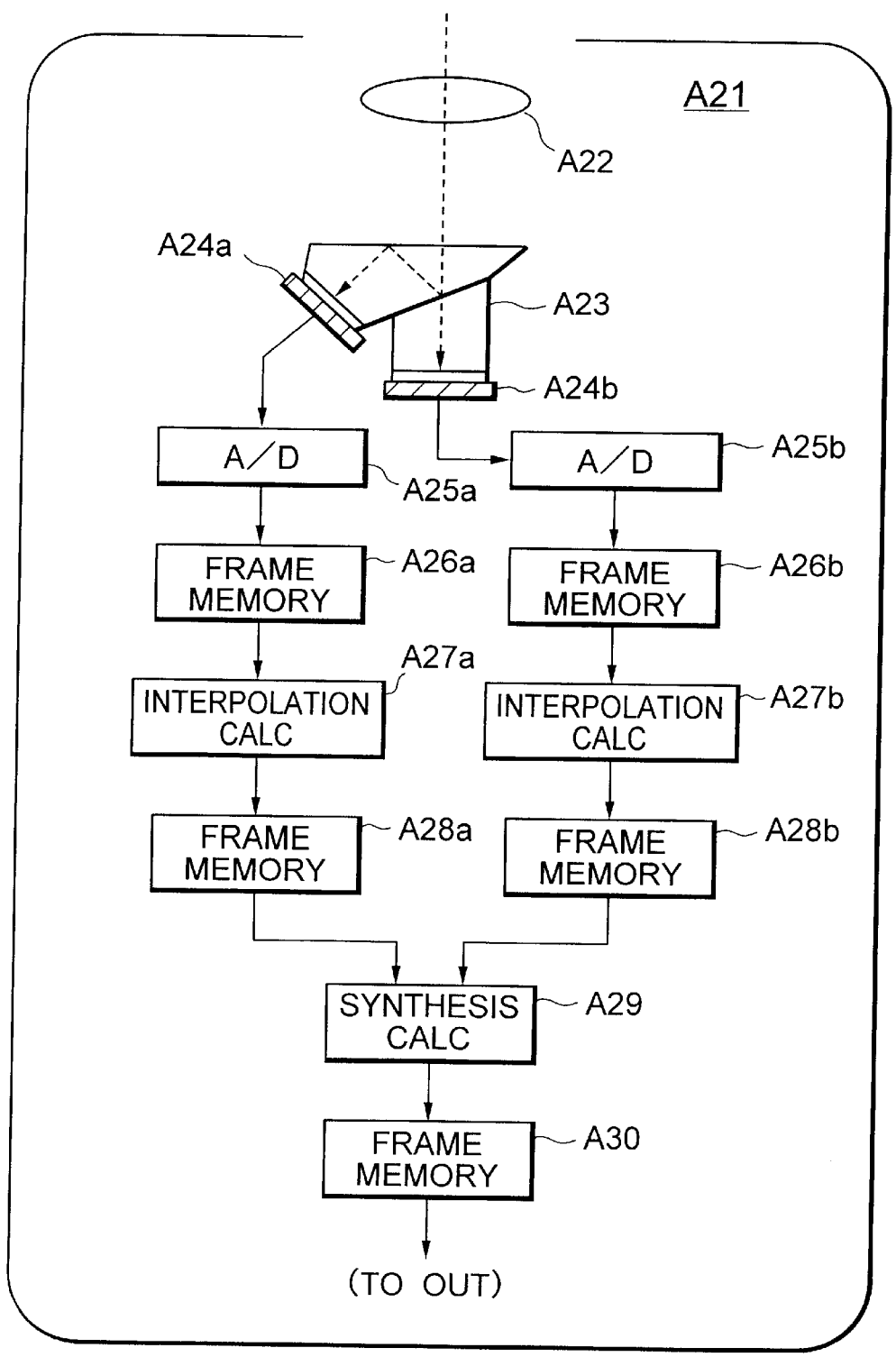
FIG. 3 is a figure showing a constitution of an image pickup apparatus of a second embodiment.

FIG. 3 is a figure showing a constitution of a second embodiment. Referring to FIG. 3, a taking lens A22 is disposed within a pickup unit A21, and a prism A23 is disposed on an optical axis of the taking lens A22. It should be noted that the taking lens A22 corresponds to the pickup optical system A11 of the first embodiment and the prism A23 corresponds to the light splitting unit A12.

A half mirror is formed on a adhered plane within the prism A23, and an optical image is split into two directions that are a reflection direction and a transmission direction. Pickup devices A24a and A24b are disposed at positions where the optical images are received, respectively. The pickup devices A24a and A24b are disposed while offsetting by ½ pixel from each other in vertical and horizontal directions. Moreover, a green color filter is adhered to a pickup plane of each of the pickup devices A24a and A24b, and an image of only G component is extracted.

An output of the pickup device A24a is inputted to a frame memory A26a via an A/D converter A25a. An output of the frame memory A26a is inputted to a frame memory A28a via an interpolation computing section A27a.

On the other hand, an output of the pickup device A24b is inputted to a frame memory A26b via an A/D converter A25b. An output of the frame memory A26b is inputted to a frame memory A28b via an interpolation computing section A27b.

Outputs of the frame memories A28a and A28b are inputted to a synthesis computing section A29, and an output of the synthesis computing section A29 is inputted to a frame memory A30. An output of the frame memory A30 is inputted to an external unit such as a monitor.

It should be noted that functions of the interpolation computing sections A27a, A27b and the synthesis computing section A29 are realized by as a single microprocessor, a DSP(digital signal processor) and hardware exhibiting an equivalent function to them.

As to a correspondence relation between the first and second embodiments, the pickup unit A13 and A13 of FIG. 1 correspond to the pickup devices A24a and A24b and the A/D converter A25a and A25b, the interpolation unit A14 correspond to the interpolation computing sections A27a and A27b, and the image synthesizing unit A15 corresponds to the synthesis computing section A29.

Figure 4:
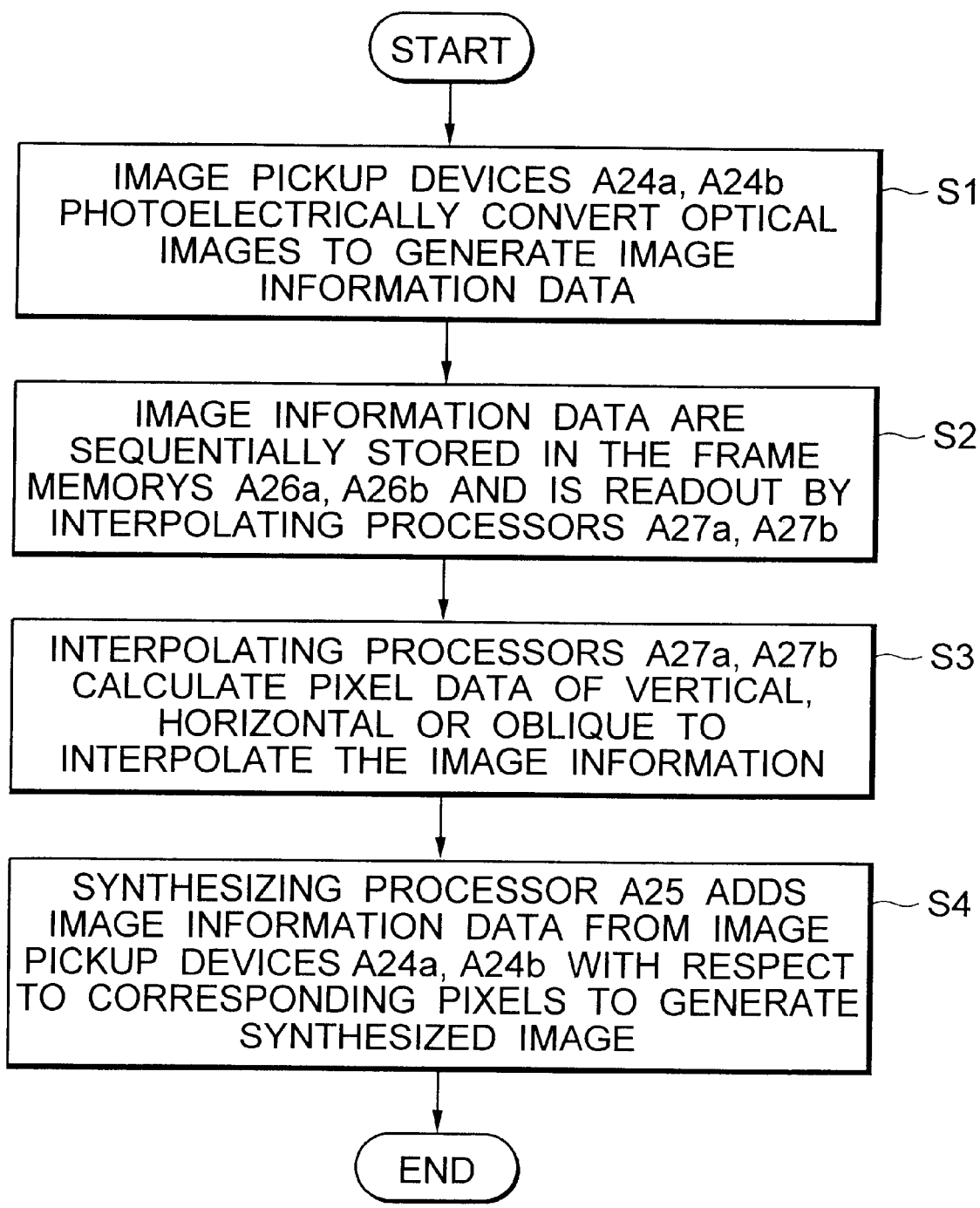
FIG. 4 is a flow chart for explaining an operation of the image pickup apparatus of the second embodiment.
Figure 5:
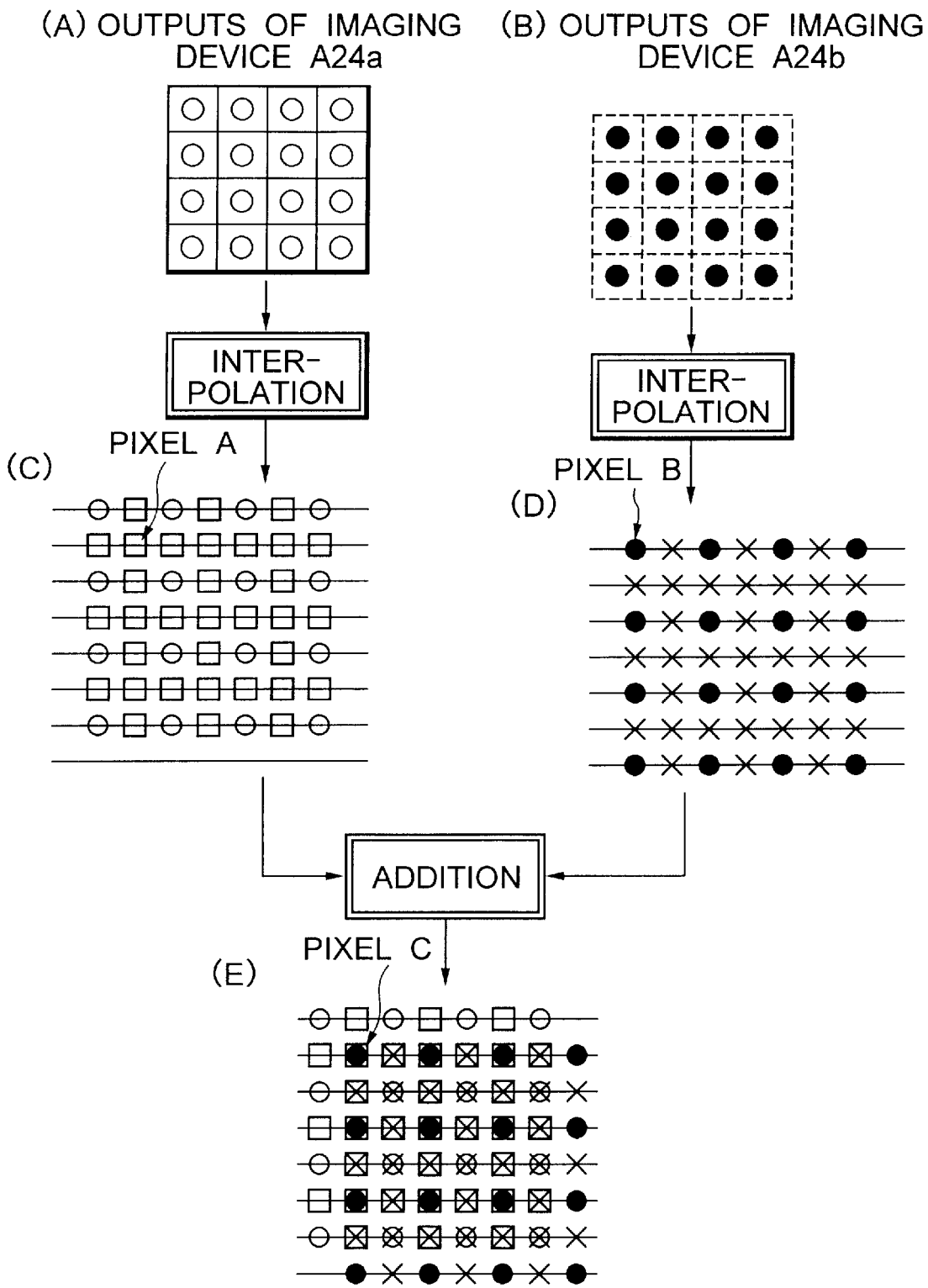
FIG. 5 is a figure for explaining an image processing in the image pickup apparatus of the second embodiment.
Figure 6:
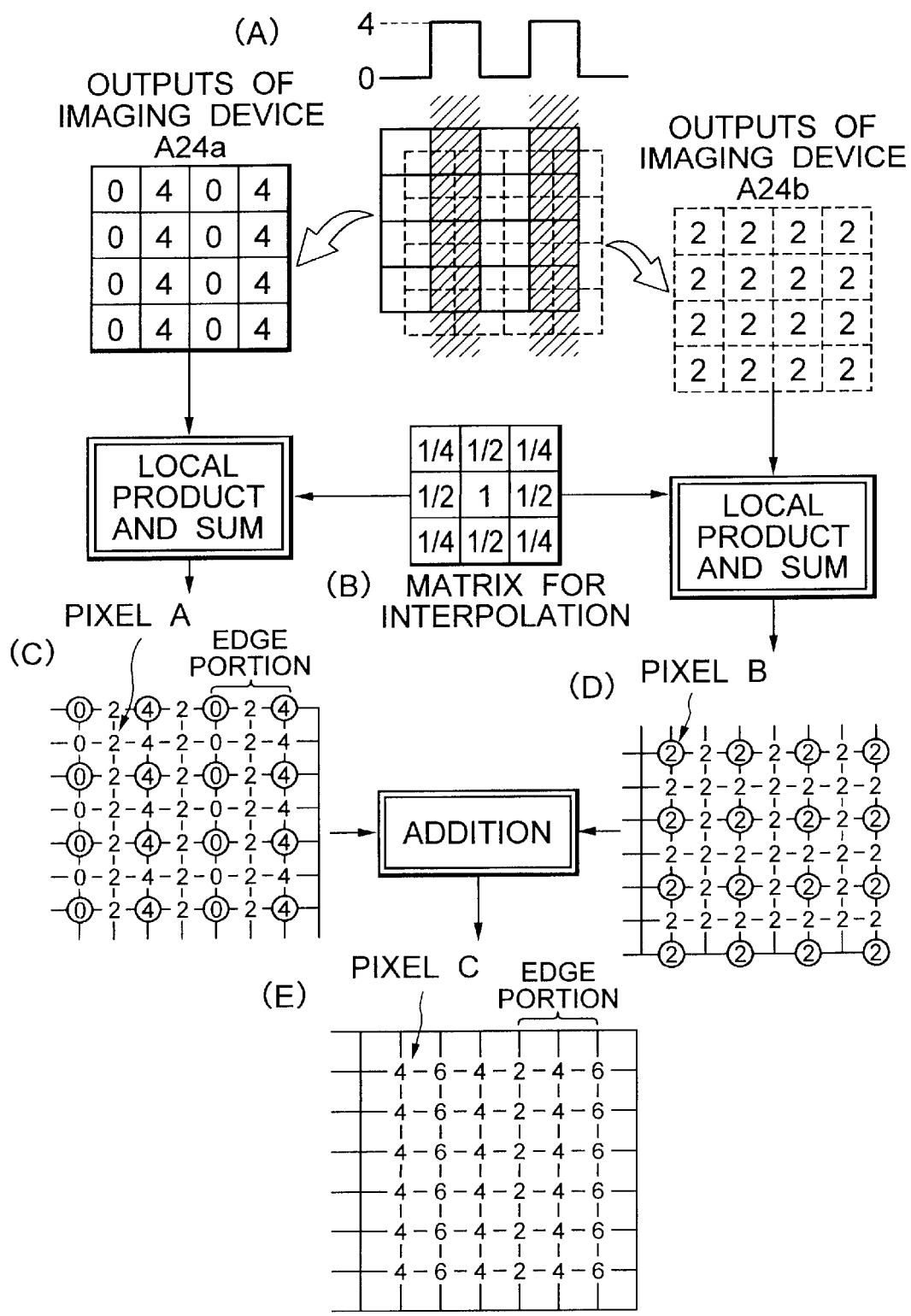
FIG. 6 is a figure for explaining an image processing in the image pickup apparatus of the second embodiment.

FIG. 4 is a flowchart for explaining an operation of the second embodiment. FIGS. 5 and 6 are figures for explaining an image processing of the second embodiment.

An operation of the second embodiment will be described with reference to FIGS. 3 to 7A and 7B. An optical image transmitting through the taking lens A22 is incident onto the prism A23, and split into a reflection light and a transmission light by a reflection/transmission layer within the prism A23. Although the pickup device A24a receives the reflection light, the device A24a performs the photography through a color filter, so that the optical image only with the G component is subjected to a photoelectric conversion. A pixel output at the time of the photoelectric conversion is indicated by the symbol ○ of FIG. 5.

The A/D converter section A25a performs an A/D conversion for the photoelectric signal, and generates the image information (step S1). The image information is sequentially stored in the frame memory A26a, and read out into the interpolation computing section A27a in parallel with a writing operation (step S2). The interpolation computing section A27a interpolates the pixels (indicated by the symbol □) into the vacant lattice points using each of the pixel outputs (indicated by the symbol ○) (step S3). Details of the pixel interpolation will be described later. The interpolated image information is sequentially stored in a frame memory A28a.

On the other hand, as to the pixel outputs of the pickup device A24b (indicated by the symbol ● of FIG. 5), the pixel outputs are subjected to the A/D conversion by the A/D conversion section A25b, and image information is generated (step S1). The image information is sequentially stored in the frame memory A26b (step S2), and the pixels (indicated by the symbol × in (D) of FIG. 5) are interpolated into the vacant lattice points using each of the pixel outputs (indicated by the symbol ● in (D) of FIG. 5) (step S3). The interpolated image information is sequentially stored in a frame memory A28b.

In the synthesis computing section 29, the corresponding pixels of the image information of the pickup devices A24a and A24b, for example, the pixel A in (C) of FIG. 5 and the pixel B in (D) of FIG. 5, are sequentially added, and a synthesis image in (E) of FIG. 5 is formed (step S4). The synthesis image is stored in a frame memory A30.

Next, the above described procedures will be described using concrete numerical values for explaining advantage of this embodiment.

As shown in (A) of FIG. 6, when it is assumed that, for example, a vertical stripe lattice image is photographed, the vertical stripe image is formed on the pickup planes of the pickup devices A24a and A24b. The light receiving cells constituting the pickup device A24a correspond to any of the bright and dark portions of the stripe, so that the light receiving cells receive the light quantity of "0" or "4". Moreover, the light receiving cells of the pickup device A24b correspond to the boundary portion between the bright and dark portions of the stripe, so that all of the light receiving cells receive the light quantity of "2".

The interpolation computing section A27a performs the pixel interpolation for the vacant lattice points of the image information generated by the pickup device A24a and the A/D converter A25a, using the interpolation matrix shown in (B) of FIG. 6.

Figure 7A:
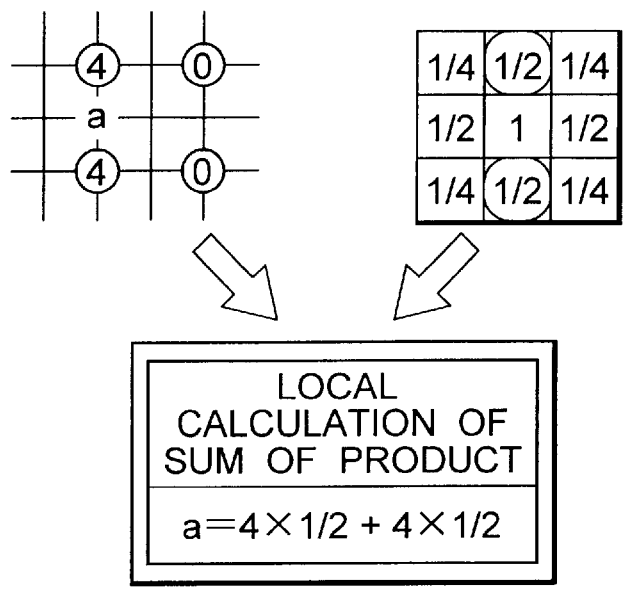
FIGS. 7A and 7B are figures for explaining an interpolation processing.
Figure 7B:
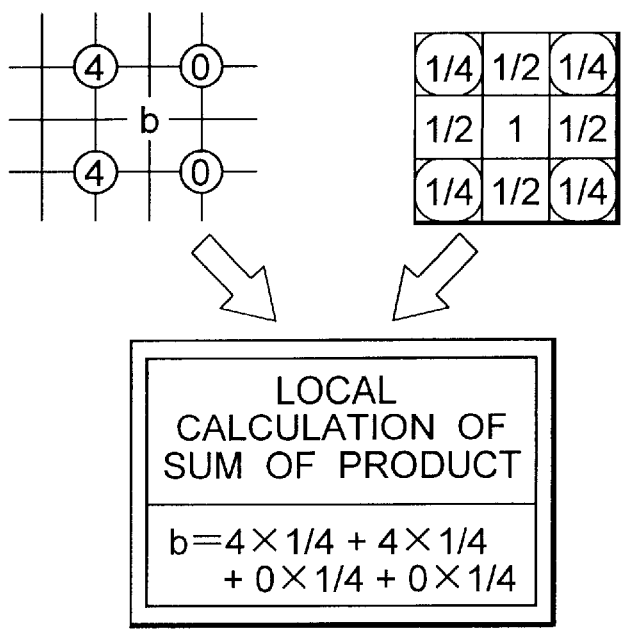

Descriptions for this interpolation processing will be done as shown in FIGS. 7A and 7B. The interpolation processing is carried out in such manner that using two pixels of "0" or "4" positioned respectively below and above the vacant lattice point or four pixels of "0" and "4" positioned obliquely below and obliquely above the vacant lattice point, these pixels are weighed by the corresponding components of the interpolation matrix, and the sum of the weighed values are calculated, that is, a local sum of products is calculated, thus completing the interpolation processing.

The results of the interpolation are shown in (C) of FIG. 6. On the other hand, the similar pixel interpolation processing is performed as to the pixel outputs of the interpolation computing section A27b, thus forming the image information shown in (D) of FIG. 6. Since the image information (see (C) and (D) of FIG. 6) that has been subjected to the pixel interpolation has the same spatial phase, the pixels corresponding to each other are sequentially added, to be specific, for example, the pixel C is generated by adding the pixels A and B, thus forming the synthesis image (see (E) of FIG. 6).

As shown in (E) of FIG. 6, image degrading artifacts are not generated in the edge portion of the synthesis image, and a distortion of the mosaic-like image does not occur. This is because the interpolation of the pixels is performed without using the pixel of other pickup device. Therefore, in the image pickup apparatus of the present embodiment, the generation of the image degrading artifacts in the edge portion can be prevented.

Furthermore, in the image pickup apparatus of this embodiment, all of the pixels constituting the synthesis image are produced as a result of the addition processing. Accordingly, random noises such as thermal noises can be surely reduced at the time of addition of the pixels, resulting in an increase in S/N.

(Third Embodiment)

The second embodiment concerns the image pickup apparatus for photographing only the image containing G components, and a third embodiment concerns an image pickup apparatus which photographs a color image.

Figure 8:
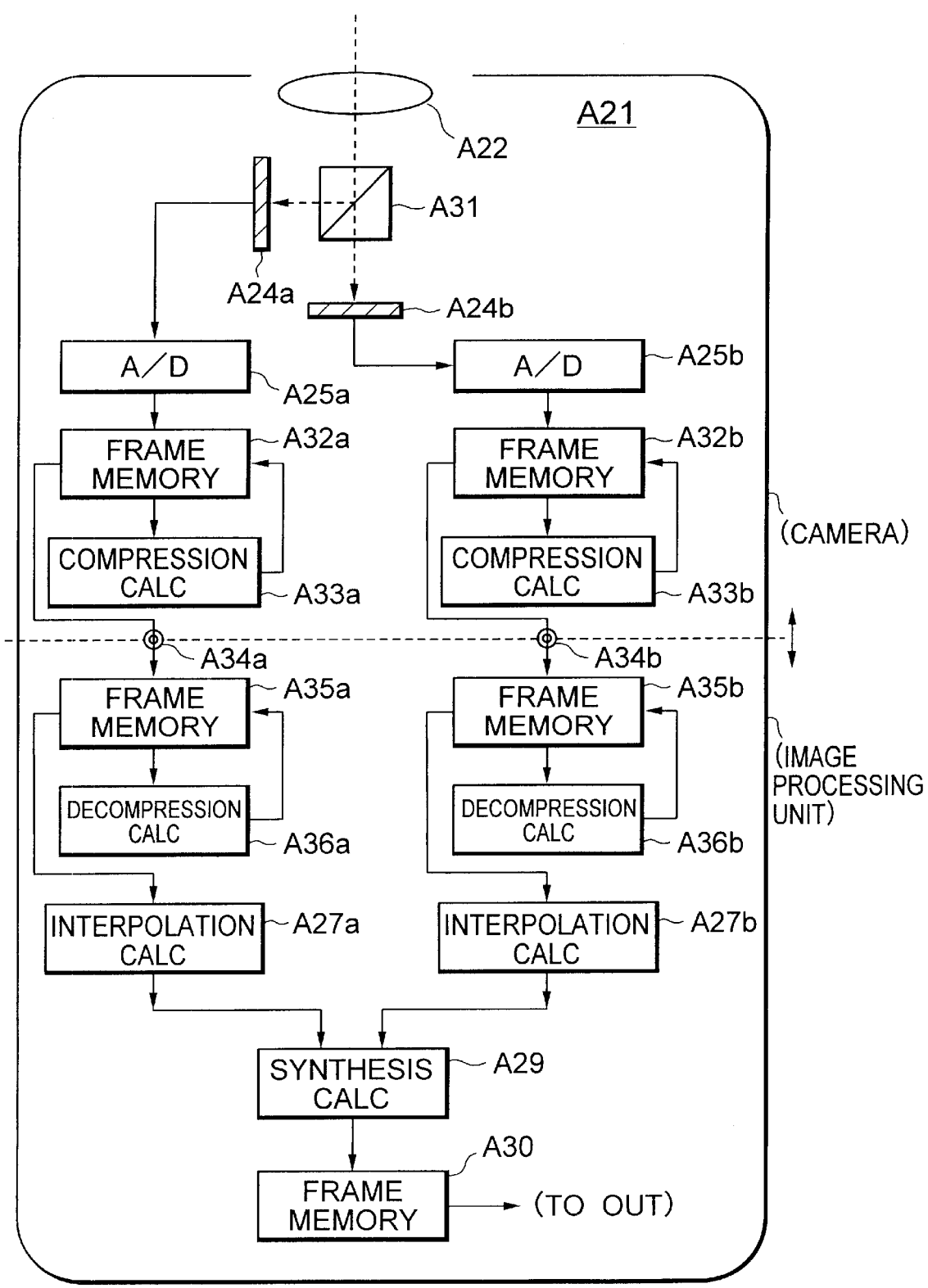
FIG. 8 is a figure showing a constitution of an image pickup apparatus of a third embodiment.

FIG. 8 is a figure showing a constitution of the third embodiment. Referring to FIG. 8, a taking lens A22 is disposed within an image pickup apparatus A21, and a prism A31 is disposed on an optical axis of the taking lens A22. A half mirror is formed on an adhered plane within the prism A31, and the optical image is split into two directions, that is, the reflection and transmission directions. Pickup devices A24a and A24b are disposed at the positions in which the optical image is received. These pickup devices A24a and A24b are disposed so as to offset from each other by ½ pixel in the vertical and horizontal directions. Since a color filter array of Bayer array is adhered to the pickup plane of the image pickup devices A24a and A24b, a R, G and B color signal can be taken in each of the image pickup devices A24a and A24b.

An output of the image pickup device A24a is inputted to the frame memory A32a via the A/D converter A25a. An output of the frame memory A32a is inputted to a compression computing section A33a, and an output of the compression computing section A33a once returns to the frame memory A32a and is inputted to a frame memory A35a via a connection terminal A34a. An output of the frame memory A35a once returns to the frame memory A35a through a decompression computing section A36a and is inputted to an interpolation computing section A27a.

On the other hand, an output of the image pickup device A24b is inputted to a frame memory A32b via an A/D conversion section A25b. An output of the frame memory A32b is inputted to a compression computing section A33b, and an output of the compression computing section A33b once returns to the frame memory A32b and then is inputted to a frame memory A35b via a connection terminal A34b. An output of the frame memory A35b once returns to the frame memory A35b via the decompression computing section A36b and then is inputted to an interpolation computing section A27b.

Outputs of the interpolation computing sections A27a and A27b are inputted to a frame memory A30 via a synthesis computing section A29.

It should be noted that each of functions of the interpolation computing sections A27a and A27b, the synthesis computing section A29, the compression computing section A33a and A33b, and the decompression computing section A36a and A36b can be realized by a single microprocessor, a DSP or hardware having the equivalent function to them.

Next, an operation of the third embodiment will be described with reference to FIGS. 8 to 10. FIG. 10 is a figure for explaining an image processing of the third embodiment.

An optical image transmitting through an taking lens A22 is incident onto a prism A31. The optical image is split into two directions, that is, a reflection light and a transmission light, by a reflection/transmission film within the prism A31.

Figure 9:
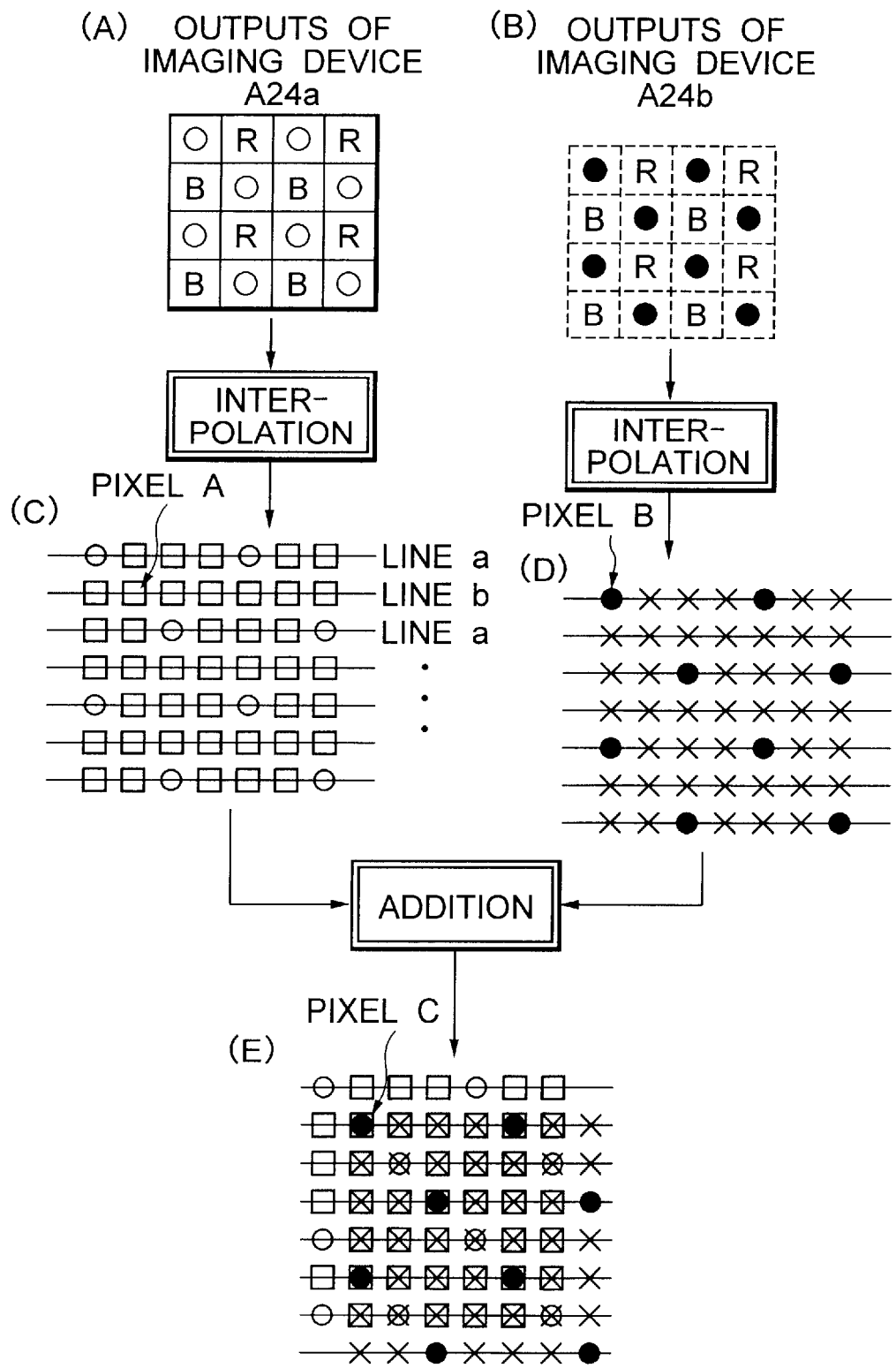
FIG. 9 is a figure for explaining an image processing in the image pickup apparatus of the third embodiment.

Since a color filters of Bayer array are provided on the image pickup device A24a, the output of the image pickup device A24a is expressed by a figure in which G signals (symbols ○ in (A) of FIG. 9) are arranged in a check fashion and R and B signals are arranged in the check fashion in the remaining portions.

R or B signals is obtained from outputs of the image pickup device A24a for each scanning line. Accordingly, in the A/D conversion section A25a, sampling is performed for one pixel while discriminating the R and B signals from each other for each scanning line, whereby the outputs from the image pickup device A24a are separated into each of the R, G and B signals. Eachof the R, G and B signals is stored individually in the frame memory A32a, and a R image produced from the R signal, a G image produced from the G signal and a B image produced from the B signal are generated. Each of the R, G and B images are subjected to a compression encoding in the compression computing section A33a, and is stored in the frame memory A32a as compression image data again. Moreover, the compression image data originating from the R, G and B images are transferred to the decompression computing section A36a through connector A34a and the frame memory A35a, and are subjected to an decompression decoding by the recompression computing section A36a.

Each of the decompressed image data undergoes the pixel interpolation in the interpolation computing section A27a. Results of the pixel interpolation are shown in (C) of FIG. 9. In (C) of FIG. 9, the symbol ○ indicates the pixel output of the G signal from the image pickup device A24a, and the symbol □ indicates the interpolated based on this pixel output. The interpolation is performed in such manner that for example, the pixel interpolation is performed for a line "a" including the pixel output indicated by the symbol ○ and subsequently the pixel interpolation is performed for a line "b" including no pixel output. To be specific, the pixel outputs indicated by the symbol ○ are internally divided, and the pixels indicated by the symbol □ included on the same line are obtained. Thus, the pixel interpolation for the line "a" is performed. Next, a vertically average interpolation is performed between each of the pixels arranged on the two lines "a", which have been subjected to the pixel interpolation, thus obtaining each of the pixels on the line "b".

On the other hand, the same processing as that for the pixel output of the G signal of the image pickup device A24a is performed as for the pixel output of the G signal from the image pickup device A24b, which is indicated by the symbol ●, and the pixel indicated by the symbol × is obtained by utilizing the pixel output indicated by the symbol ●, and the interpolation image shown in (D) of FIG. 9 is formed.

Since the two images shown in (C) and (D) of FIG. 9, which have been subjected to the pixel interpolation, have the same spatial phase, the synthesis computing section A29 adds the pixels corresponding to each other, for example, the pixel A in (C) of FIG. 9 and the pixel B in (D) of FIG. 9 are added to each other. Thus, the synthesis image in (E) of FIG. 9 of the G signal is formed. The synthesis image of the G signal is sequentially stored in the frame memory A30.

The above described interpolation processing and addition processing are performed not only for the pixels of the G signal but for pixels of the R and B signals. The interpolation processing and the addition processing for the pixels of the R signal will be described with reference to FIG. 10.

An A/D converter A25a separates the pixel outputs of the R signals from the pixel outputs (see (A) of FIG. 10) of the image pickup device A24a, and generates the R image. An interpolation computing section A27a performs the pixel interpolation for the R image. The results of the pixel interpolation are shown in (C) of FIG. 10. The symbol "R" in (C) of FIG. 10 denotes the pixel outputs of the R signal and the symbol □ denotes the pixels interpolated based on the pixel outputs thereof.

The interpolation is performed in such manner that the line (line "a") having the pixel output of "R" is subjected to the pixel interpolation and subsequently the line (line "b") having no the pixel output of "R" is subjected to the pixel interpolation. Specifically, the pixel output of "R" of the line "a" is internally divided, and the pixels indicated by the symbol □, which are arranged on the same line, are interpolated, thus performing the pixel interpolation for the line "a". Next, the interpolation for the line "b" that is delayed by 1 to 3 scanning periods against the interpolated line "a" is performed utilizing the pixels of the line "a".

On the other hand, the interpolation computing section A27b performs the interpolation processing for the pixel outputs of the image pickup device A24b shown in (B) of FIG. 10, similarly. The interpolation results are shown in (D) of FIG. 10. "R" in (D) of FIG. 10 indicates the pixel output of the R signal from the image pickup device A24b, and the symbol × indicates the pixel interpolated based on the pixel output of the R signal.

Since two images of (C) and (D) of FIG. 10 that have been subjected to the pixel interpolation have the same spatial phase, the synthesis computing section A29 sequentially adds the pixels corresponding to each other, for example, the pixel D in (C) of FIG. 10 and the pixel E in (D) of FIG. 10 are added, thus forming the synthesis image of the R signal. The synthesis image of the R signal is sequentially stored in the frame memory A30.

It should be noted that also as to the B signal, the interpolation processing and the synthesis processing are performed, and the synthesis image of the B image is performed.

As described above, in the image pickup apparatus of the third embodiment, the interpolation processing is performed before the synthesis images of the R, G and B signals are formed. At this time, the interpolation processing is performed only with the pixel output from one image pickup device, and the pixel outputs from other image pickup devices are not used. Therefore, in all of the images of the R, G and B signals, the generation of the image degrading artifacts in the edge portion can be prevented, so that the image pickup apparatus of this embodiment is more suitable for the photography of the color image for forming the R, G and B images.

Moreover, in the third embodiment, since the compression computing sections A33a and A33b and the decompression computing sections A36a and A36b are provided, the image can be effectively stored in the frame memory. It should be noted that the constitution in which the interpolation computation and the synthesis computation are performed after the compression processing and the decompression processing are performed as in the third embodiment can be applied to the image pickup apparatus for forming the single color image as in the second embodiment as a matter of course.

Moreover, since the connectors A34a and A34b are provided in the third embodiment, the camera section and the image processing section are separated from each other. Particularly, the image processing may be performed in an external unit such as a personal computer.

(Fourth Embodiment)

Figure 11:
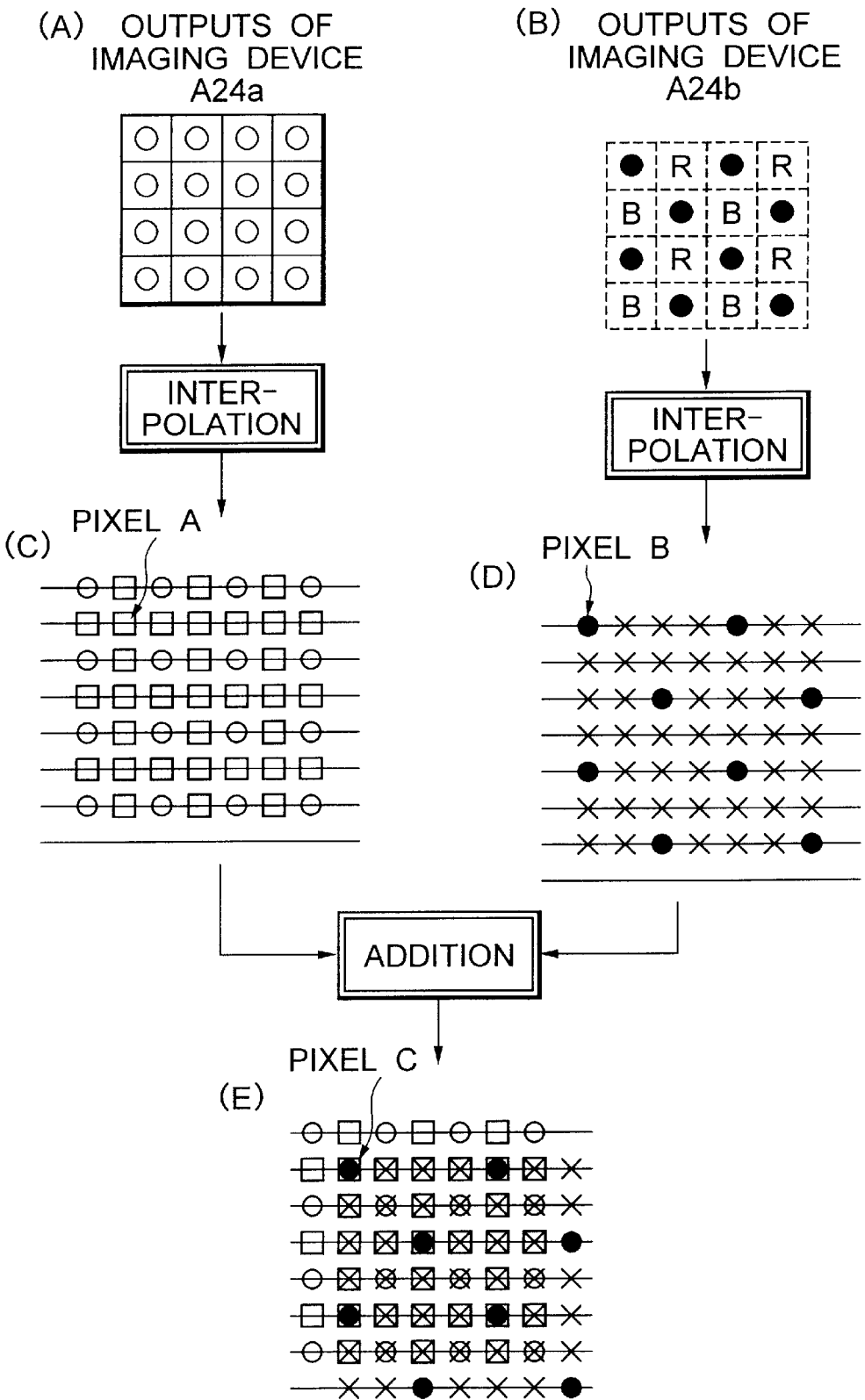
FIG. 11 is a figure for explaining an image processing in an image pickup apparatus of a fourth embodiment.

A fourth embodiment concerns an image pickup apparatus having a structure composed of two image pickup devices, each of which outputs the pixel outputs arranged in different configuration as shown in (A) and (B) of FIG. 11. The image pickup apparatus has a feature in that a color filter adhered to the image pickup device A24a of FIG. 11 are different from those of FIG. 8, and other constitutional components are the same as those of the third embodiment.

A green color filters are adhered to the image pickup plane of the image pickup device A24a. The pixel outputs are shown in (A) of FIG. 11. It should be noted that the symbol ○ indicates the pixel outputs of G signals.

A interpolation computing section 27a performs an interpolation processing for this image, and the description concerning this interpolation processing was already made in the second embodiment, thus omitting the description for it. Results of the interpolation processing are shown in (C) of FIG. 11. It should be noted that the symbol □ indicates the pixels interpolated based on the pixel outputs indicated by the symbol ○.

On the other hand, a color filter array with a Bayer array is provided on the image pickup device A24b. In (B) of FIG. 11, the pixel outputs at this time are shown. It should be noted that the symbol ● indicates the pixel outputs of the G signal. The G image is generated by separating only the G signal in the A/D converting section A25b, and the pixel interpolation is performed in the interpolation computing section A27b. It should be noted that the description for the interpolation processing was already made in the third embodiment and the description for it is omitted. Results of the interpolation processing are shown in (D) of FIG. 11. It should be noted that the symbol × in the figure indicates the pixels interpolated based on the pixel outputs of the symbol ●.

Two G images of (C) and (D) FIG. 11, which are interpolated, have the same spatial phase, so that the synthesis computing section A29 sequentially adds the corresponding pixels, for example, the pixel A and the pixel B are added to each other, thus generating the pixel C. Hence, the synthesis image of (E) in FIG. 11 is formed.

Advantages of this fourth embodiment are similar to those of the second and third embodiments.

It should be noted that in the second to fourth embodiments, though the image pickup devices are offset by ½ pixel vertically and horizontally, it is not limited to a strict ½ pixel offset as long as the ½ pixel offset can be within a range where an error correction can be performed.

Moreover, in the second to fourth embodiments, although the description for the image pickup apparatus with the two image pickup devices was made, the present invention is not limited to this, and the present invention can be applied to an image pickup apparatus with three image pickup devices, which performs a photography by a ⅓ pixel offsetting.

The interpolation processing which was performed in the second to fourth embodiments is merely an exemplification, and the interpolation processing is not limited to this.

Moreover, although the pixel offsetting was done in the two directions, that is, vertical and horizontal directions, the direction of the pixel offsetting is not limited to these, the direction of the pixel offsetting may be one direction of lateral (horizontal) and longitudinal (vertical) directions.

The light splitting unit is not limited to the prism of the second to fourth embodiments, and any shape and structure may be arbitrarily available as long as the light splitting unit has characteristics of a half mirror.

Furthermore, in the third and fourth embodiments, though the color filter array of the Bayer array was used to perform the picking-up for the color image by the image pickup apparatus with the single image pickup device, the present invention is not limited to this, and a color filter array with a stripe array(for example G-stripe RB-checked pattern) may be used.

[Fifth Embodiment]

Figure 12:
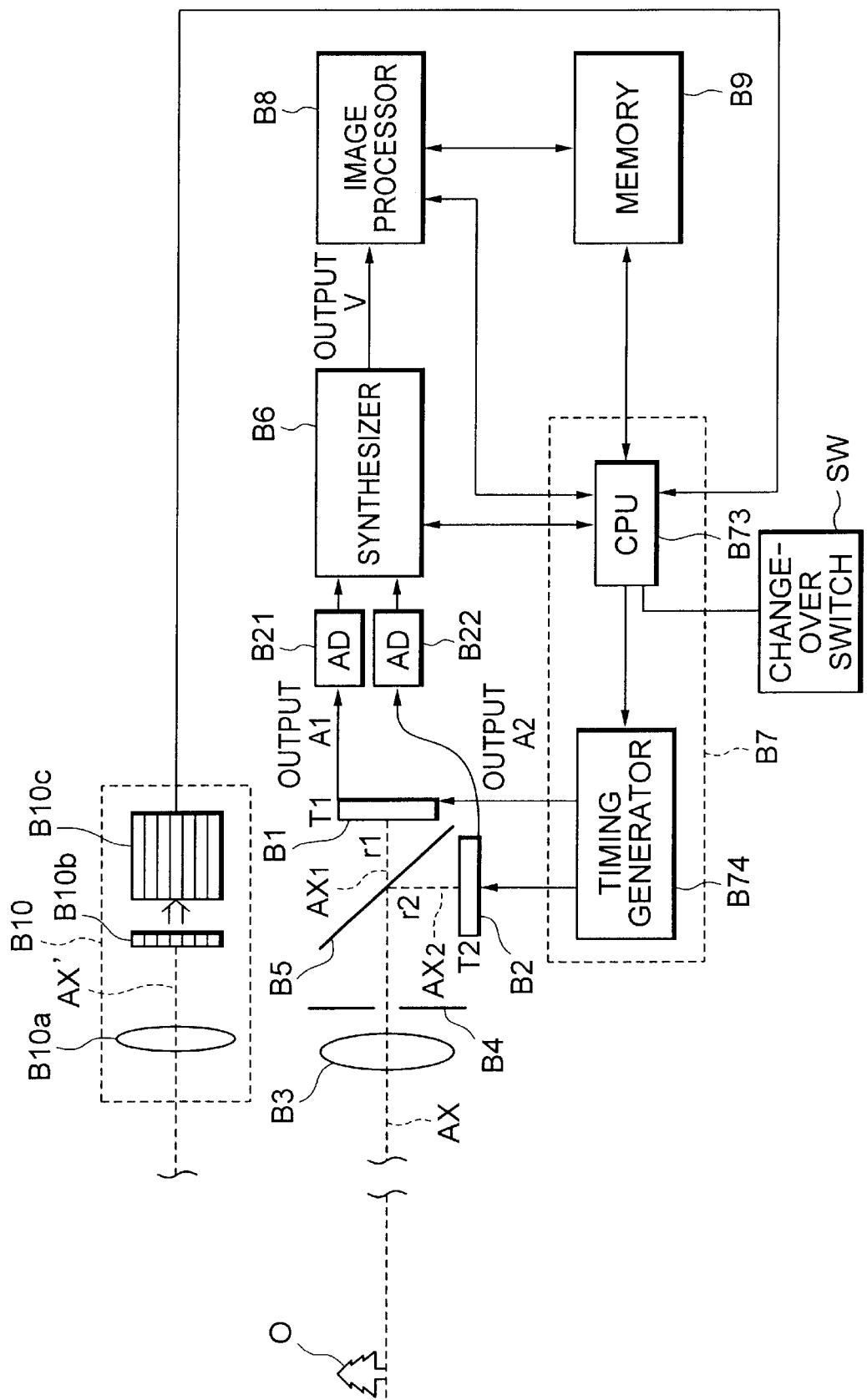
FIG. 12 is a block diagram showing a constitution of an image taking-in apparatus according to a fifth embodiment.

FIG. 12 is a figure for explaining an image taking-in apparatus according to a fifth embodiment. This image taking-in apparatus comprises a taking lens B3 for photographing an image of an object O; a stop B4 arranged just behind the taking lens B3, the stop B4 adjusting a light quantity; a light splitting mirror B5 arranged on an optical axis AX, the light splitting mirror B5 separating an optical path into two directions; a first image pickup device B1 arranged on an optical axis AX1 on one light beam side separated by the light splitting mirror B5; a second image pickup device B2 arranged on the other light beam side separated by the light splitting mirror B5; AD converters B21 and B22 for performing an AD conversion for outputs A1 and A2 of the corresponding image pickup devices B1 and B2; a synthesizer B6 for synthesizing the outputs of the AD converters B21 and B22 that have been subjected to the AD conversion to output a synthesized output; a control unit B7 for controlling operations of the image pickup devices B1 and B2 and the synthesizer B6; and a change-over switch SW that is selecting means for setting an operation state of the control unit B7 by a photographer.

This image taking-in apparatus further comprises a luminance range detecting section B10 for detecting an object luminance range that is a luminance range of the object O, which is provided independently from an optical system for performing a picking-up for the object O. This luminance rage detecting section B10 includes a second lens B10a for forming an image of the object O independently from the taking lens B3; a multi-splitting SPD (silicon photo-diode) B10b arranged on an optical axis AX' of the second lens B10a substantially in parallel with the optical axis AX, on which the image of the object O is projected; and a logarithmic amplifier B10c connected in parallel to each element constituting the multi-splitting SPD B10b. The luminance range detecting section B10 has the same structure as that of a multi-element photometric sensor for detecting a light exposure of a film camera, and exhibits a wide detection range. The luminance range detection section B10 is capable of measuring the luminance range of the object with one-time photometry. Based on an output from the luminance rage detecting section B10, that is, an object luminance range, a storage time (exposure time) in each of the image pickup devices B1 and B2 and a stop value of the stop B4 can be determined, and these can be used for setting parameters necessary for the synthesis processing in the synthesizer B6.

The control unit B7 serves to control an operation of the image taking-in apparatus comprehensively, and the control unit B7 comprises a CPU (Central Processing Unit) B73 having a function to control the operation of the synthesizer B6 based on the output of the luminance range detecting section B10 and a setting of the change-over switch SW; and a timing generator B74 for controlling the storage time at the time when the image pickup devices B1 and B2 perform a pickup image in response to the instruction from the CPU B73.

An output V that is image information after the synthesis, which is outputted from the synthesizer B6 under the control by the control unit B7, is inputted to the image processing unit B8, subjected to various kinds of signal processings and compression processings. Data from the image processing unit B8, which has been subjected to the image processing, is inputted to the memory unit B9, and stored therein. The control unit B7 controls not only the operation of the synthesizer B6 but also the operation of the image processing unit B8 and the memory unit B9, and allows the image pickup devices B1 and B2 to take necessary images in each of the image pickup images B1 and B2 at a suitable timing based on the instruction of the release operation. At the same time, the control unit B7 performs a proper processing such as a synthesis, and appropriately stores the obtained image.

Figure 13:
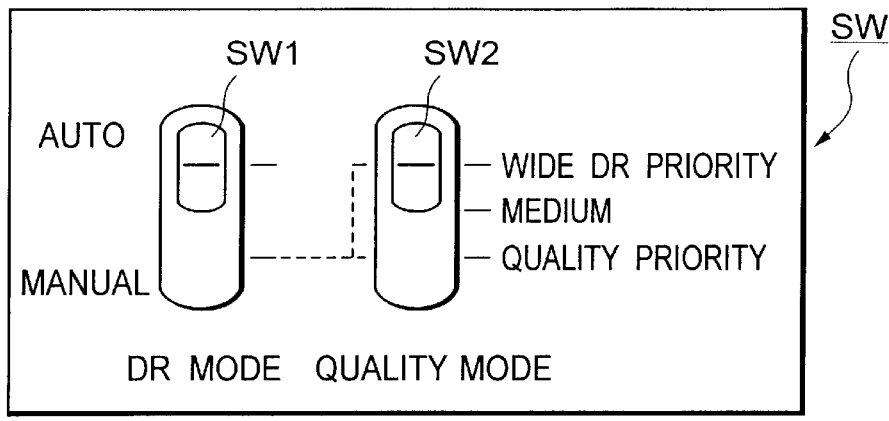
FIGS. 13 to 15 are a figure showing a switch for switching between a dynamic range mode and a photography mode.
Figure 14:
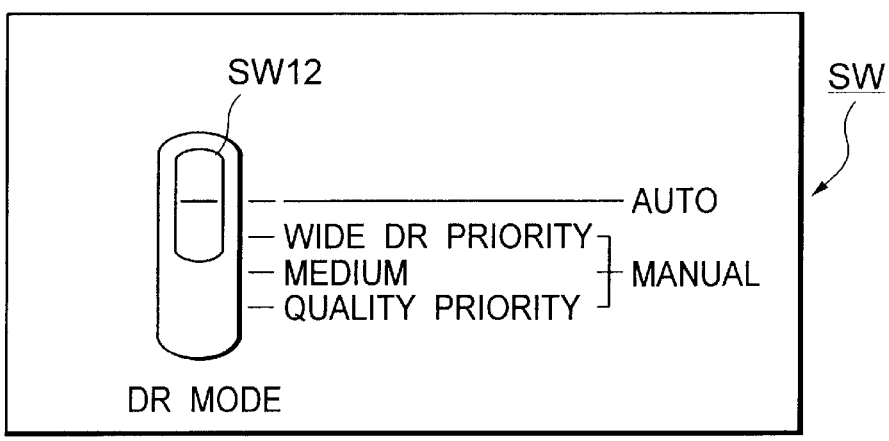
Figure 15:
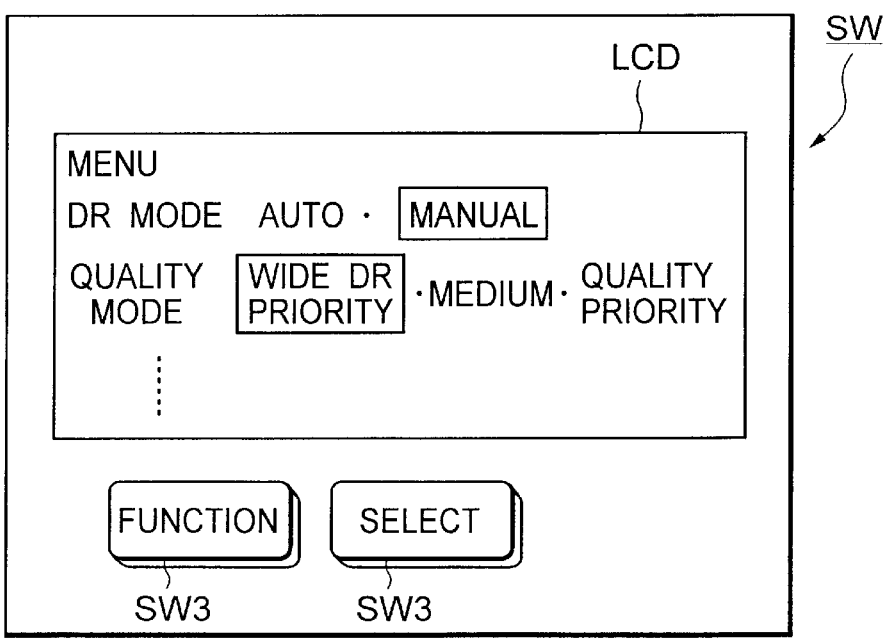

FIGS. 13 to 15 are a figure exemplifying a concrete example of the changing-over switch SW. The illustrated changing-over switch SW serves to select one of an automatic mode and a manual mode for setting the dynamic range of the picked-up image and to select one of two image pickup styles in the manual mode. In one image pickup style, a wide dynamic range is preferred to an image quality and, in the other image pickup style, the image quality is preferred to the dynamic range. It should be noted that the automatic mode is an operation mode for automatically setting a dynamic range of the picked-up image to be adjusted within a predetermined range, and the manual mode is an operation mode in which a photographer manually sets the dynamic range within a desired range.

FIG. 13 shows an example in which individually provided are switches SW1 and SW2. The switch SW1 serves as first selecting means for selecting one of a manual mode and an automatic mode for setting a dynamic range; and second selecting means SW2 for selectively setting a photograph mode to one of a wide dynamic range preference, an image quality preference and an intermediate between them in the manual mode. FIG. 14 is an example of a switch SW12, which collectively performs the operations for selecting one of the manual mode and the automatic mode for setting the dynamic range, and for selectively setting the photograph mode to one of the wide dynamic range preference, the image quality preference and the intermediate between them in the manual mode. FIG. 15 is an example in which the operation for selecting one of the manual mode and the automatic mode for setting the dynamic range, and for selectively setting the photograph mode to one of the wide dynamic range preference, the image quality preference and the intermediate between them in the manual mode are performed by a pair of command buttons SW3 while viewing a menu displayed on a screen of a liquid crystal displaying device LCD.

When the dynamic range automatic mode is set by the change over switch SW as shown in FIGS. 13 to 15, the setting by the change over switch SW as to the manual mode is ineffective. When an image taking-in apparatus is released at a situation where the automatic mode is set, a camera selects a suitable value of a storage time and a ratio (T1/T2) in accordance with an object luminance range detected by the luminance range detecting section B10 shown in FIG. 12, and photographs an image with a wide dynamic range for an image with a wide luminance range and an image with a good quality for an image with a narrow luminance range.

On the other hand, when the dynamic range manual mode is selected by the change over switch SW shown in FIGS. 13 to 15, it is possible to select one of the wide dynamic range preference mode, the image quality preference mode and the intermediate mode by the photograph mode changing switch SW. At this time, the objective luminance range detecting section B10 operates as an AE sensor for determining an exposure of the image taking-in apparatus. Hereupon, when the wide dynamic range preference mode is selected, an image with a wide dynamic range is always obtained, and an image with less black and white blur can be obtained. On the other hand, in the image quality preference mode, though the dynamic range is almost equal to that in the case of the image taking-in apparatus with a single image pickup device, an image with a good quality can be obtained.

An operation of the apparatus of FIG. 12 will be described below. A light passing through the taking lens B3 is split by the light splitting mirror B5, and the split lights are projected onto the first and second image pickup devices B1 and B2, respectively. At this time, it is assumed that a rate r1 of the light quantity supplied to the first image pickup device B1 and a rate r2 of the light quantity supplied to the second image pickup device B2 are in a relationship of r1>r2 and the splitting ratio r1/r2 is a value other than one, for example, the splitting value is a specified fixed value ranging from 2 to 20. Moreover, the splitting ratio r1/r2 should be a specified fixed value ranging from 4 to 10. It should be noted that the splitting mirror B5 may be an optical device in which a ratio of a transmittance to a reflectance is originally different or alternatively the splitting mirror may be divided into two of 50% and 50% using a half mirror in which a transmittance and a reflectance are equal to each other, thus a light quantity may be attenuated by a necessary quantity by using an ND filter with respect to one. It is preferable that a single splitting mirror B5 should be used without using the ND filter because a loss of light quantity is less and a high efficient can be achieved.

When an image taking-in instruction is issued, the image taking-in apparatus shown in the figure performs a release operation. To be specific, the control unit B7 drives the stop B4 by a stop driving unit (not shown), thereby set a most suitable illumination light quantity. Next, the control unit B7 performs a photoelectric conversion for the projected image by operating the first and second image pickup devices B1 and B2, so as to perform an exposing for outputting an image signal obtained. At this time, the control unit B7 can control the storage times T1 and T2 of the first and second image pickup devices B1 and B2 to the most suitable value by independently controlling the storage times T1 and T2 thereof through the timing generator B74. Outputs from the first and second image pickup devices B1 and B2 are subjected to an A/D conversion for a digital data processing, and thereafter a synthesis of the luminance is performed by the synthesizer B6. Thereafter, various kinds of signal processings and signal compressions are performed by the image processing apparatus B8, and image data that has been subjected to the image processing is stored by the memory unit B9. Although an image of the object O is ordinarily focused on the first and second image pickup devices by adjusting the position of the taking lens B3, by using a focusing unit (not shown) or manually prior to the photography, the detailed description is omitted.

Hereupon, a description for setting a ratio of the storage times of the first and second image pickup devices B1 and B2 will be made. In the case where the automatic mode is selected, a ratio of the storage times of the first and second image pickup devices is set so that a synthesis image with a suitable dynamic range is obtained in accordance with the object luminance range detected by the luminance range detecting section B10 (the luminance difference of the object O in this case). On the other hand, in the case where the manual mode is selected, the ratio of the storage times of the first and second image pickup devices B1 and B2 is set so that a synthesis image desired by the photographer is obtained in accordance with which mode among the wide dynamic range preference mode, the image quality preference mode and the intermediate mode is set. When the ratio (T1/T2) of the storage times T1 and T2 of the first and second image pickup devices B1 is suitably changed in accordance with a set value, a ratio R of the exposure quantity is given by (r1×T1)/(r2×T2).

FIGS. 16A to 16C, FIGS. 17A to 17C and FIGS. 18A to 18C are figures for explaining a concrete technique in the case where a luminance synthesis is performed by the synthesizer B6 in consideration of the ratio R of the light exposure.

Figure 16A:
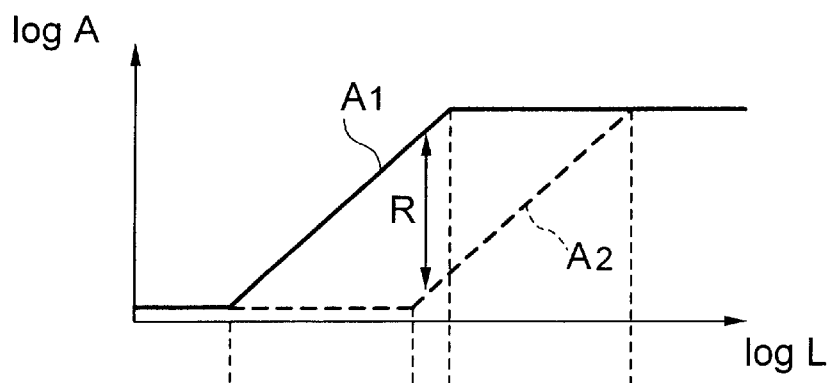
FIGS. 16A to 16C are a figure showing a synthesis in the apparatus of FIG. 12 in the case where an object luminance range is large.
Figure 16B:
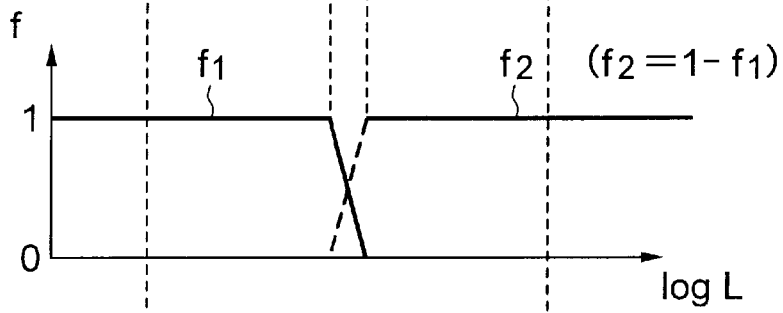
Figure 16C:
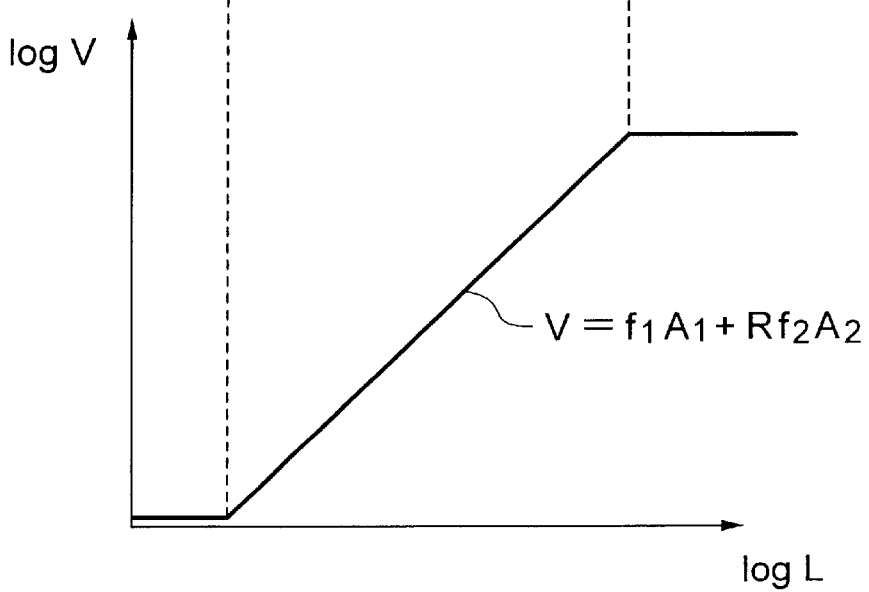

FIGS. 16A to 16C are graphs for explaining the luminance synthesis when as to the dynamic range the automatic mode is set and the luminance difference of the object is large or when as to the dynamic range the manual mode is set and the wide dynamic range preference mode is selected. FIG. 16A shows the luminance output before the synthesis, FIG. 16B shows a weight function used at the time of the synthesis, and FIG. 16C shows the luminance output after the synthesis. It should be noted that in FIG. 16A the abscissa indicates the luminance of the object O and the ordinate indicates the outputs A1 and A2 of the image pickup devices B1 and B2. In FIG. 16B, the ordinate indicates values of weight functions f1 and f2 for synthesizing the output values A1 and A2 of the image pickup devices B1 and B2, and in FIG. 16C the ordinate indicates the output V of the synthesizer B6. In this case, a ratio of the storage times T1 and T2 is made to be large, and an overlapping region of the straight line portion in the photoelectric conversion characteristic of the two image pickup devices B1 and B2 is made to be small so that information in a wide luminance range can be taken in. When the luminance range of the object O is broad, a wide dynamic range is secured by the synthesis as described above.

Figure 17A:
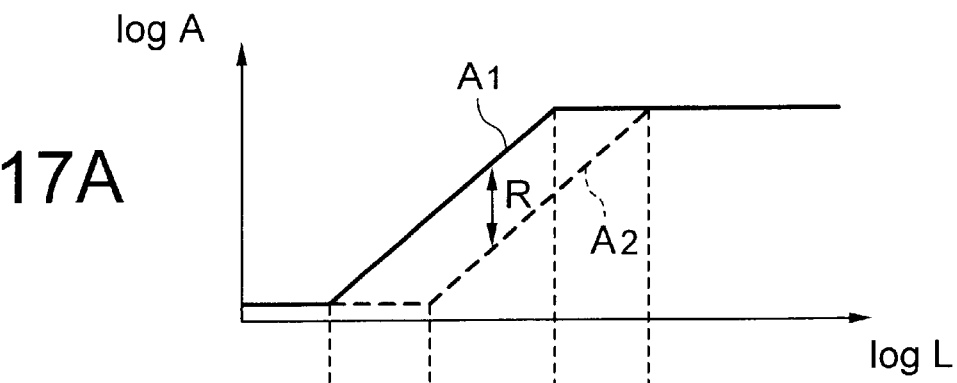
FIGS. 17A to 17C are a figure showing a synthesis in the apparatus of FIG. 12 in the case where an object luminance range is middle.
Figure 17B:
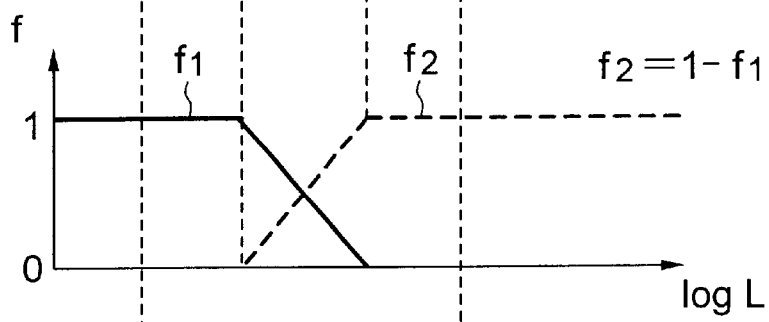
Figure 17C:
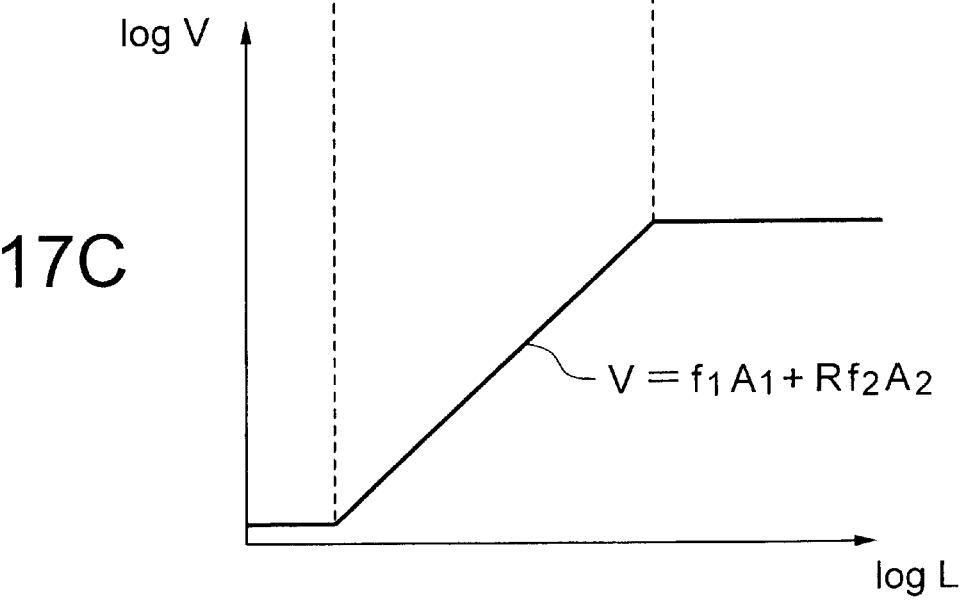

FIGS. 17A to 17C are graphs for explaining the synthesis in the case where the luminance difference of the object is intermediate at the manual mode or when the intermediate mode is selected at the manual mode. FIG. 17A shows a luminance output before the synthesis, and FIG. 17B shows a weight function used in the synthesis. FIG. 17C shows a luminance output after the synthesis. In this case, a ratio of the storage times T1 and T2 is made to be small, and the overlapping of the straight line portion in the photoelectric conversion characteristic of the two image pickup devices B1 and B2 is made to be large. If the region where the straight portions overlap is large, a phenomenon in which discontinuity occurs at the time of the synthesis can be effectively prevented. By the synthesis as shown in the figure, a wide dynamic range can be secured and the discontinuity at the jointing portion of the synthesis can be made to be less prone to occur (image and DR preference). It should be noted that if the region where the straight line portions overlap is large, the phenomenon in which the discontinuity occurs at the time of the synthesis can be effectively prevented.

Figure 18A:
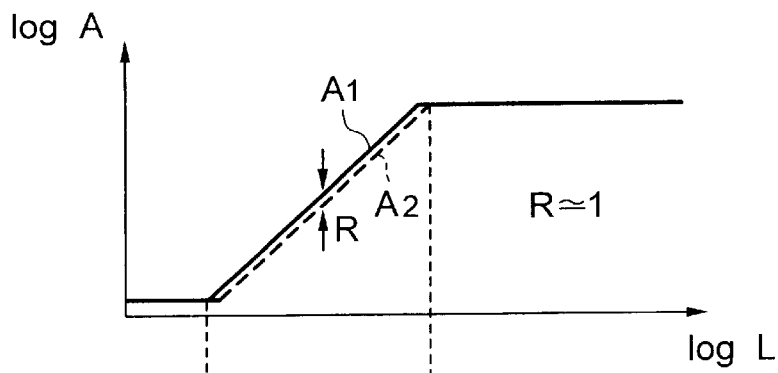
FIGS. 18A to 18C are a figure showing a synthesis in the apparatus of FIG. 12 in the case where an object luminance range is narrow.
Figure 18B:
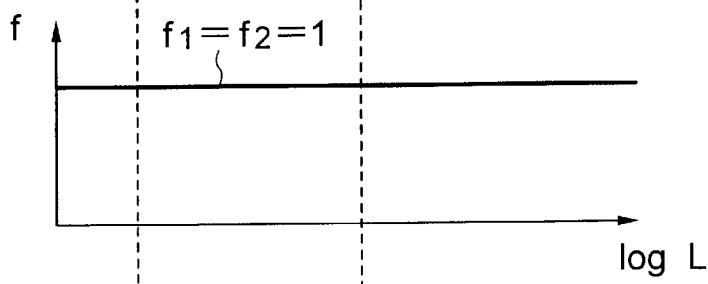
Figure 18C:
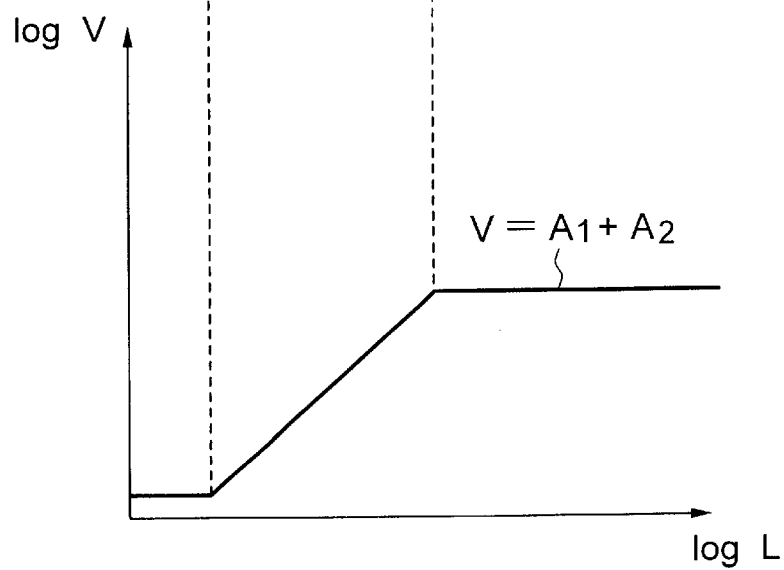

FIGS. 18A to 18C are graphs for explaining the synthesis when the luminance difference of the object is small in the automatic mode or when the image quality preference mode is selected in the manual mode. FIG. 18A is shows a luminance before the synthesis, and FIG. 18B shows a weight function at the time of the synthesis. FIG. 18C shows a luminance after the synthesis. In this case, the storage times T1 and T2 are made to be equal to each other, or the storage time T2 is made to be longer than the storage time T1 (T1<T2), whereby a light exposure ratio R, that is, a ratio of r1×T1 to r2×T2 is made to be approximately equal to 1, or just equal to 1. Moreover, the weight function is simply made to be equal to 1, and outputs of the two image pickup devices are simply added. As a result, the discontinuity due to the synthesis does not occur, and random noises cancel each other, so that an image quality is enhanced (image quality preference).

Figure 19A:
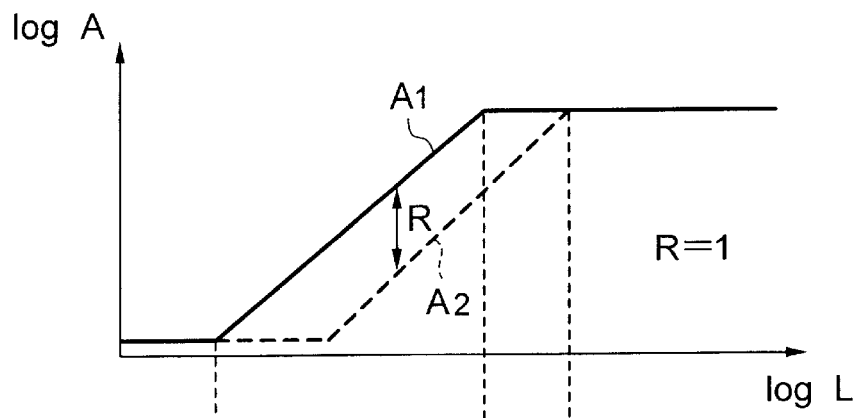
FIGS. 19A to 19C are a figures showing another synthesis in the apparatus of FIG. 12.
Figure 19B:
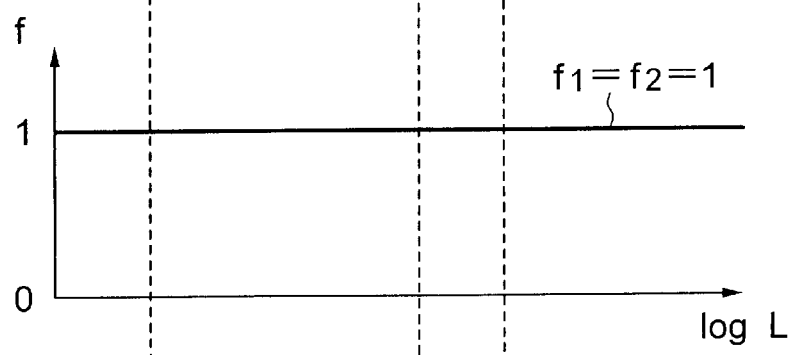
Figure 19C:
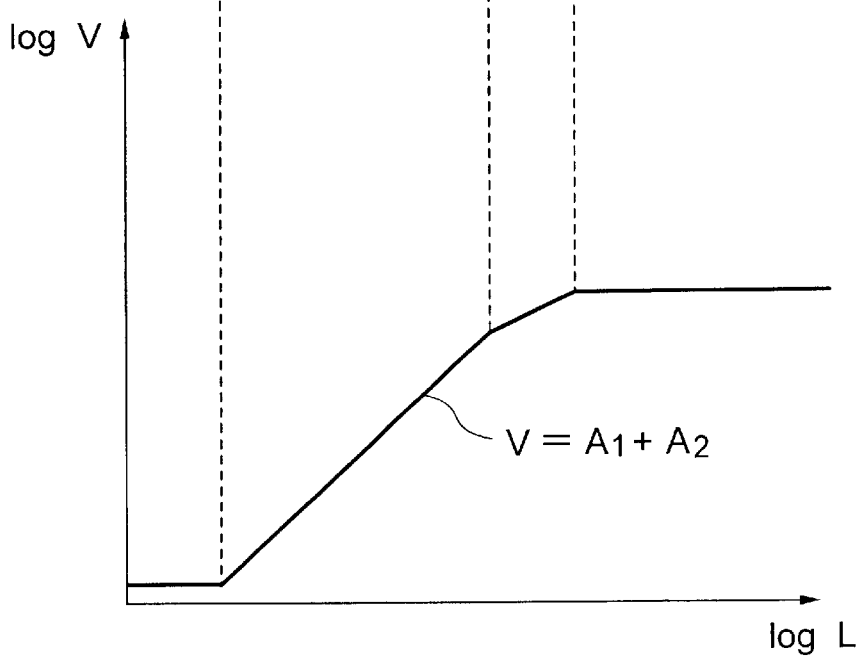

Another synthesis method is shown in FIGS. 19A to 19C. Hereupon, FIG. 19A shows a luminance before the synthesis, and FIG. 19B shows a weight function. FIG. 19C shows a luminance after the synthesis. Even when a light exposure ratio R, that is, a ratio of r1×T1 to r2×T2 is a value other than about one, outputs from the two image pickup devices B1 and B2 can be added while setting the weight function to one, similarly to the case where the luminance difference is small shown in FIGS. 18A to 18C. Since random noises of the outputs of the two image pickup devices B1 and B2 act in a direction so as to cancel, an image quality is enhanced. In this case, as shown in the figures, a differential discontinuity between the outputs after the synthesis occurs at the portion where the output of one of the two image pickup devices exhibiting a larger light exposure and a saturation as shown in the figures. It should be noted that in order to suppress a white blur or white saturation, a final outputted image is generally allowed to have knee characteristic. If the light exposure ratio is suitably selected, the differential discontinuity of the outputs after the synthesis can be set to be equivalent to the bending portion of knee characteristic region, so that it is also possible to almost remove influences on the final image.

By allowing the synthesizer B6 to have the weight function as a look-up table (LUT), the synthesizer B6 can performs a high speed synthesis processing. In this case, a plurality of LUTs in accordance with the luminance difference and a setting in the manual mode are prepared in the synthesizer B6, and the plurality of LUTs are switched according to demand, so that the synthesis is performed.

Moreover, instead of the LUTs, a computing circuit composed of a multiplication circuit and an addition circuit can be incorporated in the circuit constituting the synthesizer B6. In this case, by varying the parameter of the weight function in accordance with the ratio of the storage times T1 and T2, the synthesis processing can also be performed.

Moreover, without the synthesis circuit for performing the synthesis processing especially, the synthesis processing by software using a computation function of a CPU B73 can be performed by software.

In the case where a CCD is used as the first and second image pickup devices B1 and B2, use of a CCD with a mirror image mode or exclusively used for a mirror image is conceived as the second image pickup device B2 (an image pickup device for photographing the mirror image reflected by the splitting optical system). If such CCD is used, when the spritting mirror show in FIG. 12 is used and one of the spritted images becomes a mirror image, image outputs at the same spatial position can be read out in the same timing. Alternatively, by providing a frame memory, information read out using a ordinary CCD is recorded in the foregoing frame memory, and the information is sequentially read out in the order of correcting the mirror image, thus enabling to constitute an apparatus for synthesizing the images.

[Sixth Embodiment]

FIG. 20 is a figure for explaining a structure of an image taking-in apparatus of a sixth embodiment. This image taking-in apparatus is a modification of the apparatus of the fifth embodiment. In describing this embodiment, constituent components exhibiting functions essentially identical to those used in the fifth embodiment will be denoted using the same reference numerals, and duplicated descriptions for them are omitted. The apparatus of this embodiment comprises a change-over switch TSW as third selecting means for switching the mode of the exposing timing, and a CPU B73 controls the timing for transferring the image signal from the first and second image pickup devices B1 and B2 to the synthesizer B6, based on the setting by the change-over switch TSW. Moreover, this apparatus comprises a pair of frame memories B121 and B122 for temporarily storing the image signal from the first and second image pickup devices B1 and B2.

Figure 21:
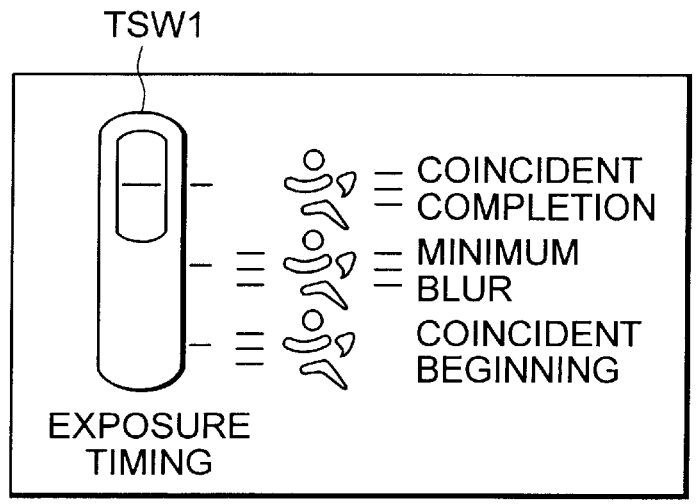
FIGS. 21 and 22 are figures showing an example of a switch for switching an image storage timing.
Figure 22:
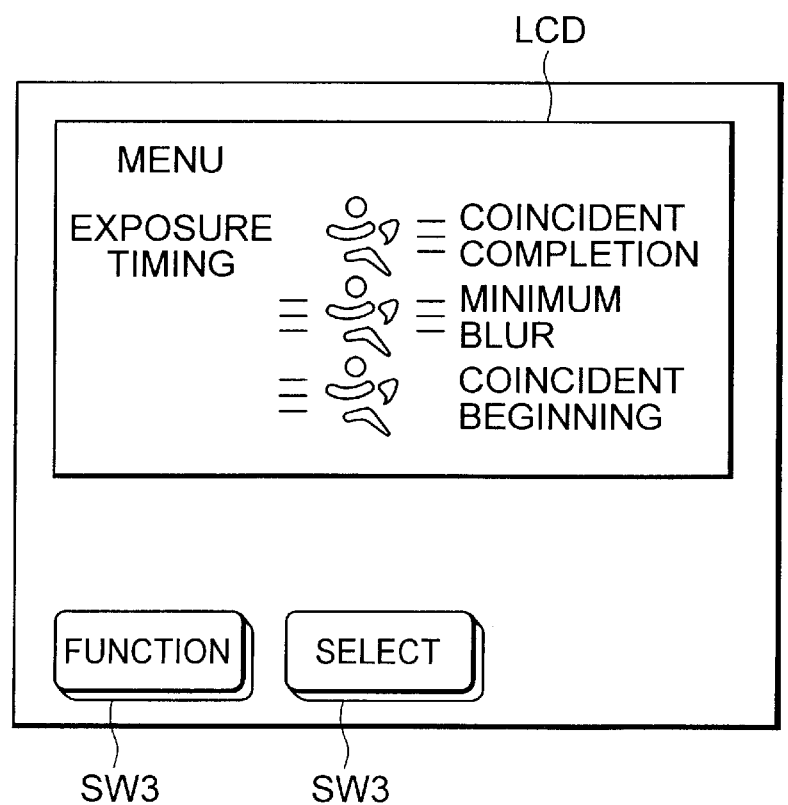

FIGS. 21 and 22 exemplify a concrete constitution of the change-over switch TSW for the exposing timing. FIG. 21 is an example in which a switch TSW1 exclusively used for setting the mode of the exposing timing, and FIG. 22 is an example in which a pair of command buttons TSW3 select the mode setting for the exposing timing while looking a menu displayed on a screen of a liquid crystal display LCD. It should be noted that, in the examples shown in the figures, the modes of the exposing timing can be set in three styles such as a coincidence with completion, a coincidence with beginning and a minimum blur.

FIGS. 23A and 23B, FIGS. 24A and 24B and FIGS. 25A and 25B are figures for explaining the exposing timing of the first and second image pickup devices B1 and B2. In this embodiment, the storage timing by the first and second image pickup devices B1 and B2 is controlled at three stages such as a first mode in which a difference between central values of the storage times T1 and T2 is made to be a predetermined value or less, a second mode in which storage start times are made to be coincident with each other, and a third mode in which storage completion times are made to be coincident to each other. The photographer can perform a photography meeting his requirements by selecting a desired mode among these three modes.

Figure 23A:
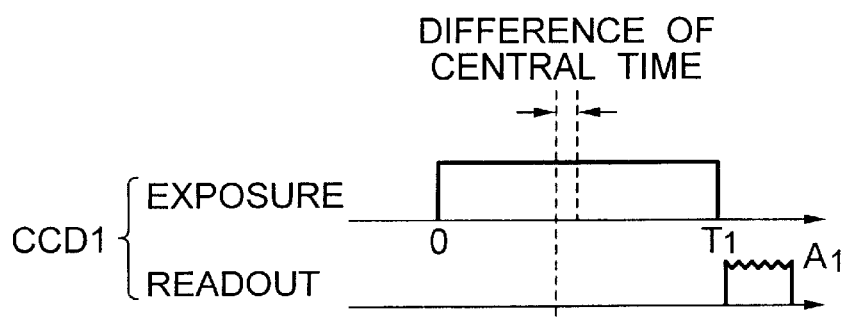
FIGS. 23A and 23B are figures for explaining exposing and reading-out timings in the case where a difference between central times of exposing in the apparatus of FIG. 20 is kept in a predetermined time.
Figure 23B:
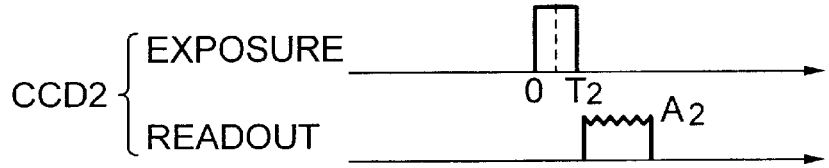

FIGS. 23A and 23B are figures for explaining a standard exposing timing which minimizes blur of the image, and FIGS. 23A and 23B correspond to the case where the foregoing first mode is selected by the changing-over switch TSW. FIG. 23A shows an exposing timing (storage timing) and signal reading-out timing of the first image pickup device B1, and FIG. 23B shows an exposing timing (storage timing) and signal reading-out timing of the second image pickup device B2. In the exposing timing of the first mode, a difference between the central values of the storage times T1 and T2 of the first and second image pickup devices B1 and B2 is controlled so as to be within a predetermined time. This predetermined time is set to an arbitrary value, and it is preferable that this predetermined time is set to a range from ¹⁄₁₀₀ to ¹⁄₁₀ sec. Ordinarily, in the case where a focal length of the taking lens B3 is short, the blur is less conspicuous, so that the foregoing predetermined time (difference between the central values of the storage times) may be somewhat long. However, in the case where the focal length of the taking lens B3 is long, the blur will be conspicuous, so that the foregoing predetermined time should be set to be short. By performing such controlling method, it is possible to obtain an image in which the blur is less conspicuous.

Figure 24A:
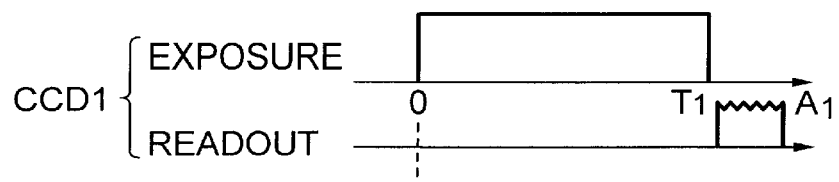
FIGS. 24A and 24B are figures for explaining exposing and reading-out timings in the case where beginnings of exposings in the apparatus of FIG. 20 are made to be agreed with each other.
Figure 24B:
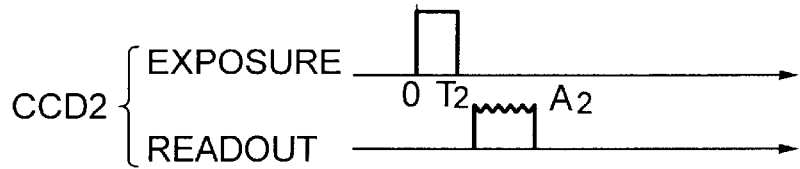
Figure 25A:
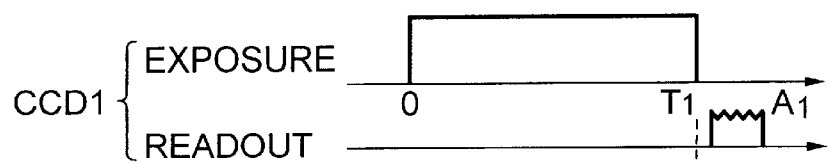
FIGS. 25A and 25B are figures for explaining exposing and reading-out timings in the case where completions of exposings in the apparatus of FIG. 20 are made to be agreed with each other.
Figure 25B:

FIGS. 24A and 24B and FIGS. 25A and 25B correspond to the case where the second or third mode is selected by the change-over switch TSW, and FIGS. 24A and 24B and FIGS. 25A and 25B are figures for explaining the case where the exposing starts of the first and second image pickup devices B1 and B2 are made to be coincident and the exposing completion of the first and second image pickup devices B1 and B2 are made to be coincident. FIGS. 24A and 24B are figures for explaining the exposing timing for allowing the exposing starts to be coincident, and FIG. 24A shows the exposing timing and the signal reading-out timing of the first image pickup device B1. FIG. 24B shows the exposing timing and the signal reading-out timing of the second image pickup device B2. On the other hand, FIGS. 25A and 25B are figures for explaining another exposing timing for allowing the exposing completions to be coincident, and FIG. 25A shows the exposing timing and the signal reading-out timing of the first image pickup device B1. FIG. 25B shows the exposing timing and the signal reading-out timing of the second image pickup device B2.

In the case of FIGS. 24A and 24B, similar effects to that obtained when a rear-curtain synchro-photography (a mode in which a strobe is flashed immediately before a shutter is closed) by a single-lens reflex camera using a strobe is performed can be obtained. In the case of FIGS. 25A and 25B, similar effects to that obtained when a front-curtain synchro-photography (a mode in which a strobe is flashed immediately after a shutter is opened) is performed can be obtained.

Hereupon, as shown in FIGS. 23A and 23B and FIGS. 24A and 24B, in the case where the exposing completion timings of the storage times T1 and T2 are different, for example, if the exposing completion timing of the storage time T2 is prior to that of the storage time T1, when it is intended to output the images simultaneously, a time interval from the completion of the exposing of the second image pickup device B2 to the completion of the exposing of the first image pickup device B1 will be produced. Assuming that a CCD is used as the first and second image pickup devices B1 and B2, signal charges of the second image pickup device B2 is stored in a vertical transferring CCD during the time interval. In general, the vertical transferring CCD is much influenced by dark current compared to photodiodes. As a result, influences by noises originating from the dark current will be remarkable. For this reason, in this embodiment, regardless whether or not the time difference between the exposing completion timings of the first and second image pickup devices B1 and B2 is large, the image signal is read out at the time when the exposing of the second image pickup device B2 is completed, and the image signal is temporarily stored in the frame memory B122. Next, at the time when the exposing of the first image pickup device B1 is completed, the image signal is read out from the first image pickup device B1, and the image signal read out is stored in the frame memory B121. Thereafter, the image signals from the first and second image pickup devices B1 and B2, which have been stored in the frame memories B121 and B122, are simultaneously read out, and the image signals read out are subjected to the synthesis processing by the synthesizer B6. As a result, the dark current less influences.

[Seventh Embodiment]

Figure 26:
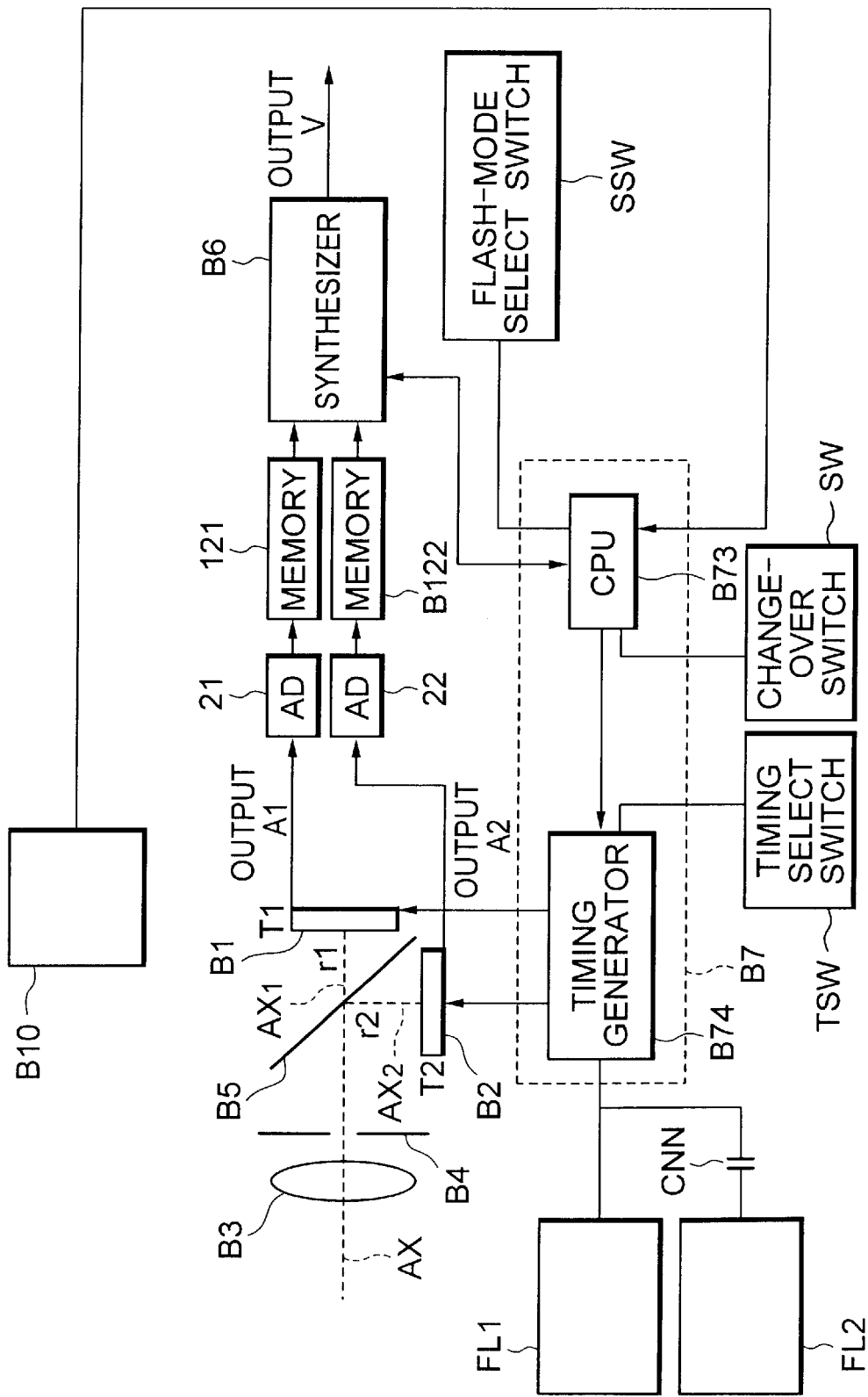
FIG. 26 is a block diagram showing a constitution of an image taking-in apparatus of a seventh embodiment.

FIG. 26 is a figure for explaining an image taking-in apparatus according to a seventh embodiment. The image taking-in apparatus of this embodiment is a modification of the apparatus of the sixth embodiment. In describing this embodiment, constituent components exhibiting functions essentially identical to those used in the sixth embodiment will be denoted using the same reference numerals, and duplicated descriptions for them are omitted. The apparatus of this embodiment comprises a built-in strobe (or flash) FL1 and a connector CNN for connecting an attached strobe (or flash) FL2 which is fitted detachably. The apparatus of this embodiment comprises a selecting switch SSW for selecting a usage state of the strobes FL1 and FL2 among strobe modes such as a forcible light emission, an automatic light emission and a light emission inhibition.

When the forcible light emission mode is selected by the selecting switch SSW, or when it is decided that a strobe light is necessary for a camera in the automatic light emission mode, the strobe light is produced. At this time, operation timings of the light emission strobes FL1 and FL2 are linked with the change-over switch TSW for the exposing timing described in the sixth embodiment. Specifically, in the exposing timing showing in FIGS. 23A and 23B, 24A and 24B and 25B and 25B, during the period when the first and second image pickup devices B1 and B2 perform the exposings, the strobes FL1 and FL2 are made to emit light in synchronization with these exposings.

In the region where illumination lights (strobe light) from the strobes FL1 and FL2 do not reaches, the ratio of the light exposure of the first image pickup device B1 to that of the second image pickup device B2 is (r1×T1)/(r2×T2) as is described in the fifth embodiment. Contrary to this, in the region where the exposing is performed only by the strobe light, since the emission period of the strobe light is normally shorter than the storage times T1 and T2, the ratio of the light exposure of the first image pickup device B1 to that of the second image pickup device B2 is simply r1/r2. In the region where both of the strobe light and natural light contribute the exposing, the ratio of the light exposure of the first image pickup device B1 to that of the second image pickup device B2 is an intermediate value between (r1×T1)/(r2×T2) and r1/r2. For this reason, a disadvantage occurs with a mere luminance synthesis.

Accordingly, the apparatus of this embodiment comprises discriminating means for detecting the region where the strobe light reaches in the image and discriminating it from the others. As a method to realize such discriminating means, there is a method in which the strobes FL1 and FL2 are allowed to emit light immediately before a real photography, an image is taken in by the first and second image pickup devices B1 and B2, and the region where the light of the strobes FL1 and FL2 reaches in the image is discriminated on the basis of the luminance of the image taken in. Thereafter, before the real photography is performed, the discrimination result of the foregoing discriminating means concerning the region where the light of the strobes FL1 and FL2 reaches is referenced, and by referencing the luminance difference in each point of the image obtained by the real photography, the synthesis is performed while adjusting the form of the weight function and other parameters. By doing so, an image with a wide dynamic range can be obtained also at the time of the use of the strobes FL1 and FL2.

Another control method, regardless of the dynamic range mode and the image quality mode, the exposing times of the first and second image pickup devices B1 and B2 can be set to be equal at the time of the use of the strobes FL1 and FL2. Specifically, at the time of the use of the strobes FL1 and FL2, the exposing times T1 and T2 are set so as to satisfy an equation "T1=T2". By setting the exposing times T1 and T2 so as to satisfy such equation, the ratio of the light exposure of the first image pickup device B1 to that of the second image pickup device B2 is always r1/r2 irrespective of whether or no the strobe light reaches. In this case, the foregoing discriminating means for discriminating the region where the strobe light reaches is not needed. By synthesizing the picked-up image, since noise components of the image signals from the two image pickup devices B1 and B2 are averaged, a S/N is enhanced, so that an image quality is enhanced.

[Eighth Embodiment]

Figure 27:
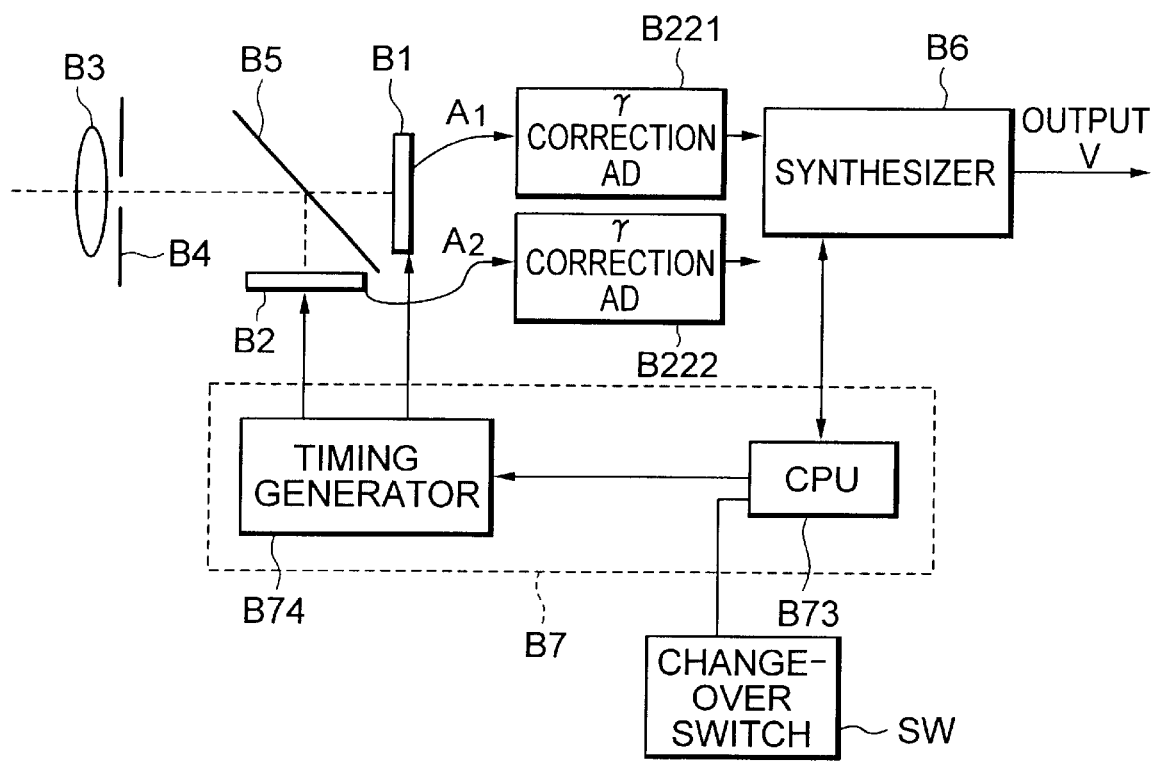
FIG. 27 is a block diagram showing a constitution of an image taking-in apparatus of an eighth embodiment.

FIG. 27 is a figure for explaining an image taking-in apparatus according to an eighth embodiment. The image taking-in apparatus of this embodiment is a modification of the apparatus of the fifth embodiment.

The image taking-in apparatus of this embodiment comprises gamma processing circuits B221 and B222 as processing means for the corresponding first and second image pickup devices B1 and B2, each of the gamma processing circuits B221 and B222 being a gamma correction type AD converter. A gamma processing in which a grayscale transformation is performed for outputs of the image pickup devices B1 and B2 is executed by the gamma processing circuit B221 and B222, and thereafter based on setting by the change-over switch SW, a synthesis processing for a luminance of the synthesizer B6 is performed.

As manners of the gamma processing performed by the gamma processing circuits B221 and B222, there may be a manner in which the output signals of the image pickup devices B1 and B2 are subjected to a gamma correction by an analog gamma circuit, and converted to digital signals by, for example, an 8-bits AD converter. Alternatively, there may also be a manner in which the outputs of the image pickup devices B1 and B2 are converted to digital signals by, for example, a 12-bits AD converter, and converted to 8-bits signals by a digital gamma circuit.

Figure 28:
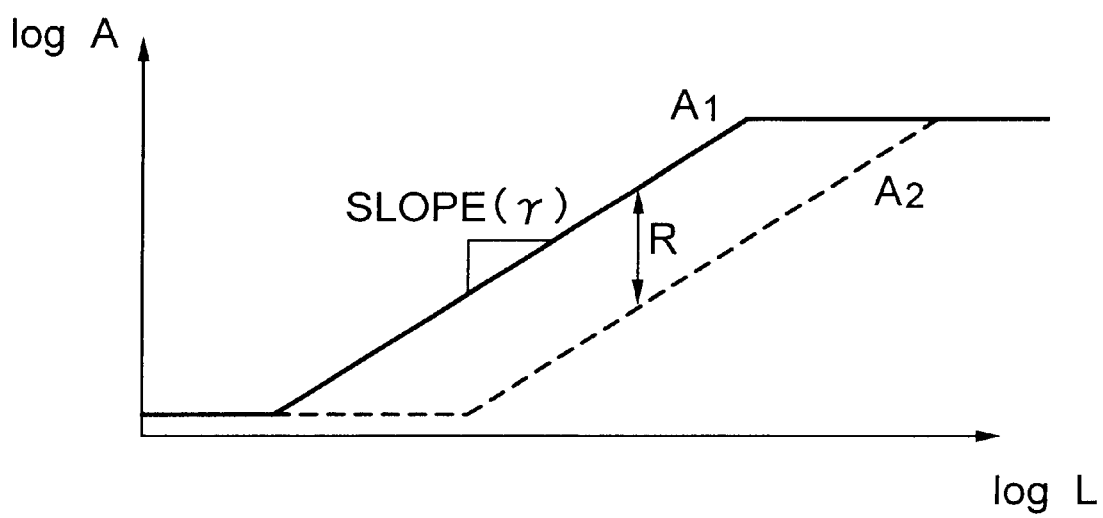
FIG. 28 is a figure showing a photoelectric conversion characteristic after a gamma correction in the apparatus of FIG. 27.

An example of a photoelectric conversion characteristic after the gamma correction is shown in FIG. 28. A slope of the graph indicates a value of the gamma. Since the straight line portion of the data obtained from the image pickup devices B1 and B2 extends over a broader luminance range, the white blur of the image is prevented, thus achieving a broader dynamic range. Moreover, since an overlapping region of the luminance of the first and second image pickup devices B1 and B2 becomes broader, the synthesis processing which produces a less conspicuous boundary portion can be performed.

[Ninth Embodiment]

Figure 29:
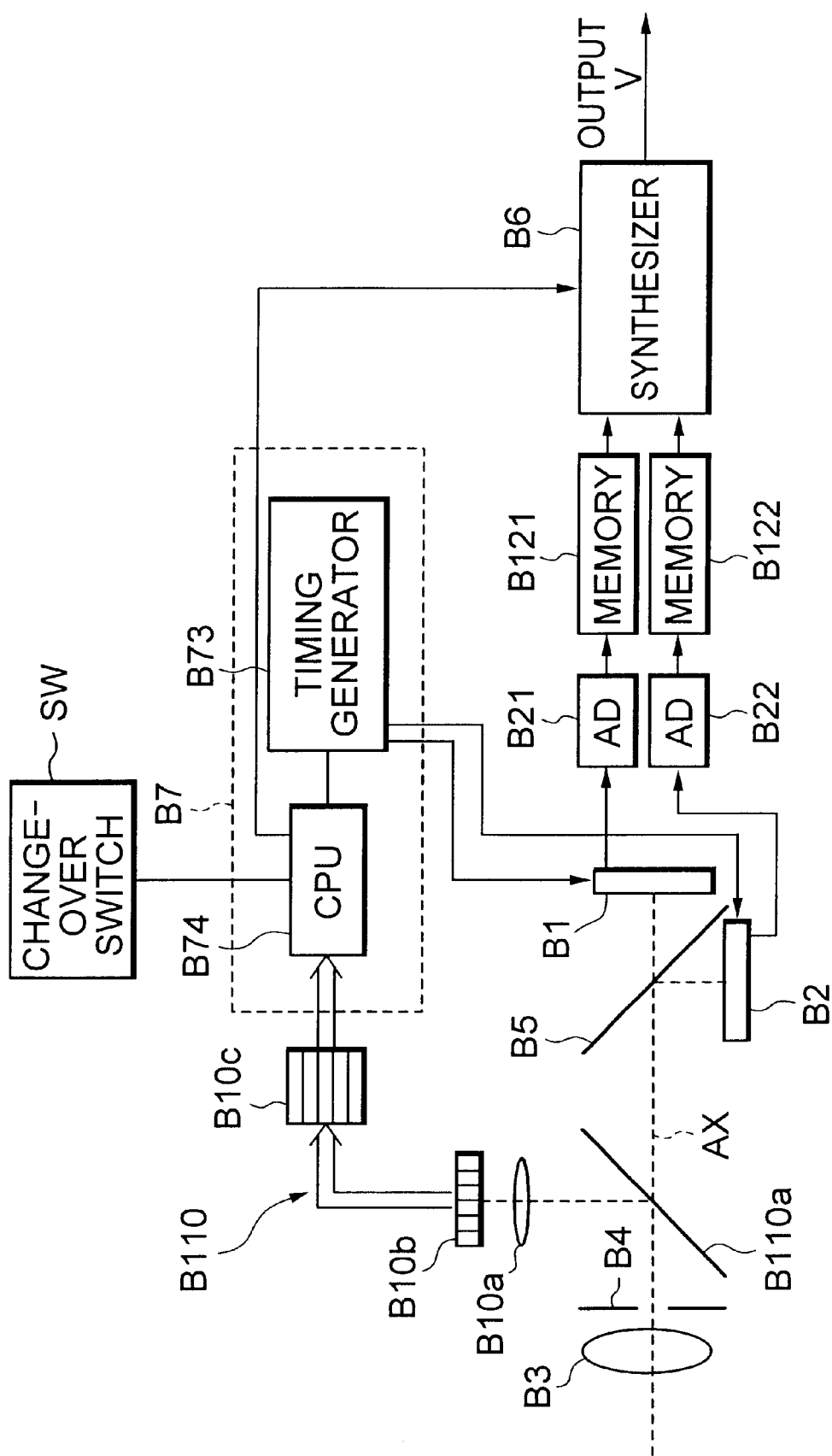
FIG. 29 is a block diagram showing a constitution of an image taking-in apparatus of a ninth embodiment.

FIG. 29 is a figure for explaining a structure of an image picking-up apparatus according to a ninth embodiment.

The image picking-up apparatus of this embodiment is a modification of the apparatus of the fifth embodiment, and the image picking-up apparatus of this embodiment comprises a luminance range detection section B110 for detecting an object luminance range by utilizing the taking lens B3. Moreover, the apparatus of this embodiment comprises a pair of frame memories B121 and B122 for temporarily storing image signals from the first and second image pickup devices B1 and B2.

The luminance range detection section B110 comprises a mirror B110a located on an optical axis AX, the mirror reflecting a part of incident light; a second lens B10a for collecting the light reflected by the mirror B110a; a multi-split SPD B110b onto which the light passing through the second lens B110a is projected; and logarithmic amplifiers B10c, each being connected to corresponding one of elements of the multi-split SPD B110b.

The luminance range detection section B110 has also a function as an AE sensor for determining the exposing time of the image pickup apparatus. Based on outputs from the elements of the luminance range detection section B110, the exposing time of the first and second image pickup devices B1 and B2 and the stop value of the stop B4 are determined.

In the case where the manual mode for setting the dynamic range to a desired range manually is selected by the change-over switch SW, information relating to the object luminance range obtained from the luminance range detection section B110 is unnecessary. Therefore, information as to the object luminance range among the information obtained from the luminance range detection section B110 is not used, and the luminance range detection section B110 is used only as an exposure sensor (AE sensor) of the image reading-out apparatus.

Moreover, it is unnecessary to use the first and second image pickup devices B1 and B2 exclusively for the image pickup (taking-in of the image), and the first and second image pickup devices B1 and B2 can also be utilized as focal point detection (AF) means. For example, when using CCD itself (blur detection AF and the like) is performed and when a liquid crystal finder is displayed, only one of the first and second image pickup devices B1 and B2 can be operated so that processing necessary for the control unit 7 is performed. The use of one of the first and second image pickup devices B1 and B2 can be switched depending on the current luminance of the object. In this case, the synthesizer B6 is not allowed to function, and an output of one of the image pickup devices B1 and B2 that is currently operating is made to simply pass through the synthesizer B6. As a result, a power consumption can be reduced.

[Tenth Embodiment]

Figure 30:
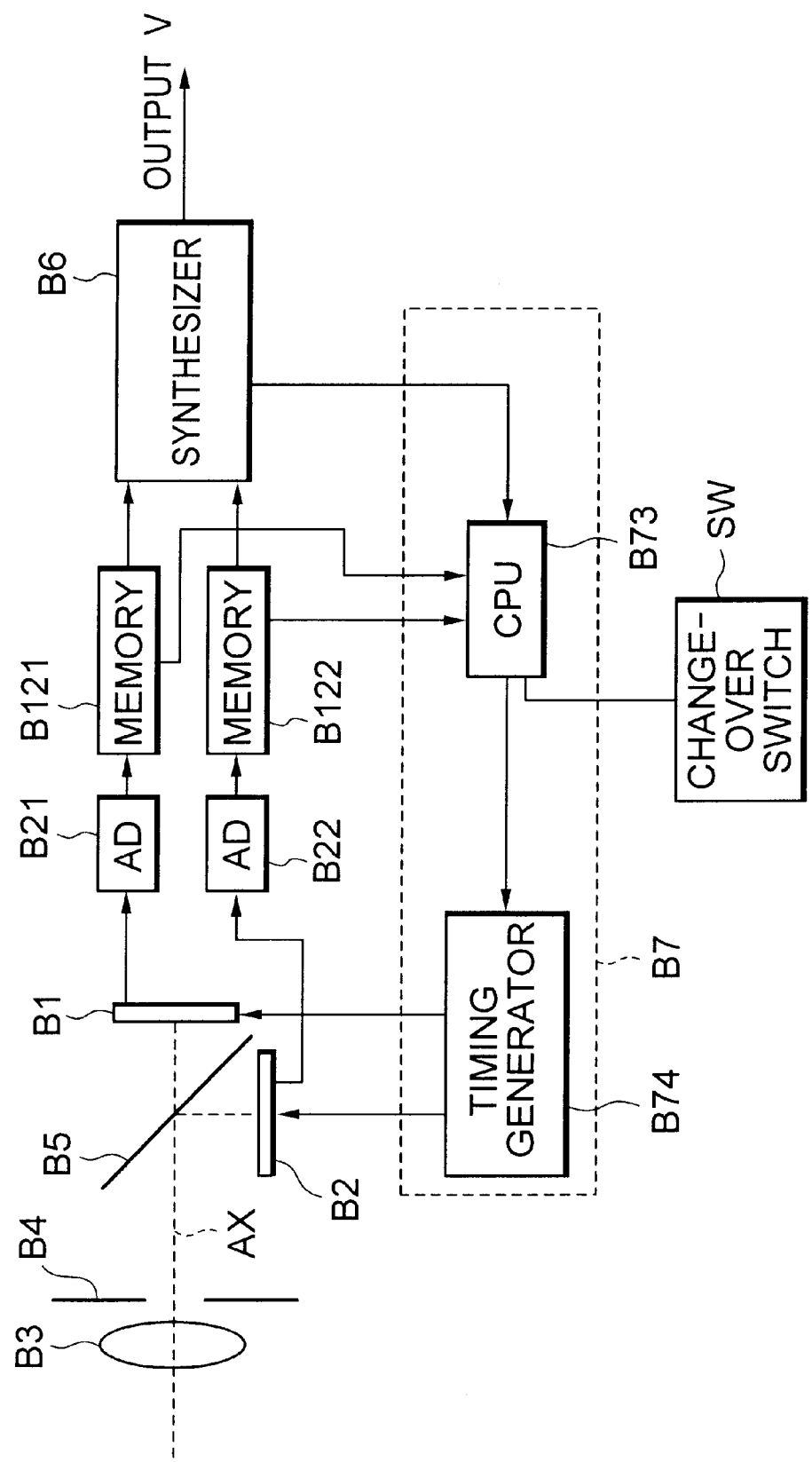
FIG. 30 is a block diagram showing a constitution of an image taking-in apparatus of a tenth embodiment.

FIG. 30 is a figure for explaining an image taking-in apparatus of a tenth embodiment. The image taking-in apparatus of this embodiment performs a luminance range detection by utilizing the image pickup devices (CCD) B1 and B2 itself for taking in an image.

An operation of the apparatus of this embodiment will be described. First, an image pickup operation for an object luminance detection is performed by the first and second image pickup devices B1 and B2 with storage times which are sufficiently different from each other. For example, the storage time T1 is ten times the storage time T2. Next, a histogram of the first and second image pickup devices B1 and B2 is examined, and the upper and lower limitation values of the detected luminance range are obtained. The foregoing operation is repeated, thus optimizing the storage times.

Figure 31:
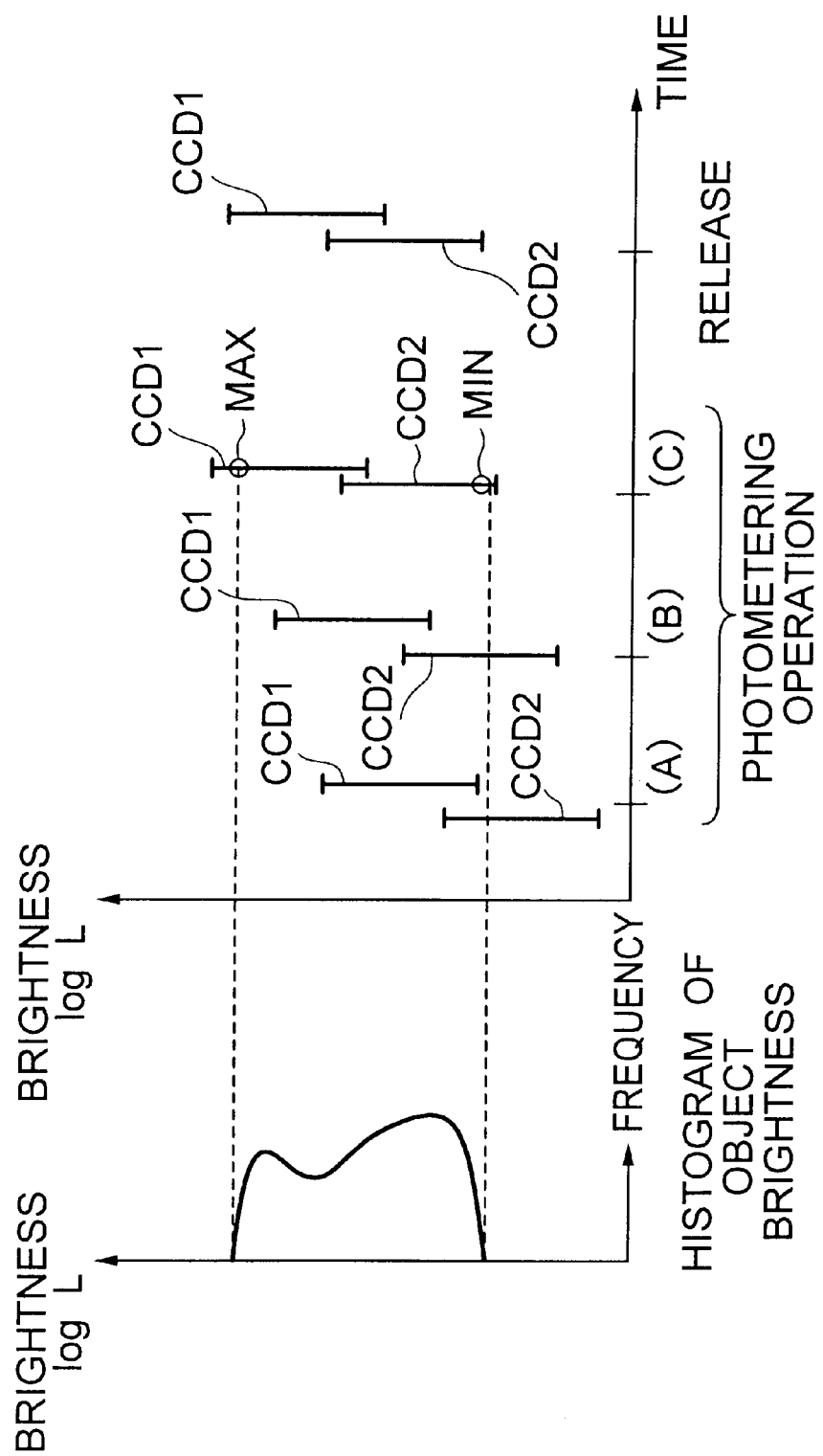
FIGS. 31A and 31B are figures for explaining an operation for detecting a luminance range in the apparatus of FIG. 30.

FIG. 31A shows a distribution of the real luminance range of the object, and FIG. 31B shows an example of modification concerning the luminance range of the object to be detected. In the state of a first stage time (A) shown in FIG. 31B, a region exhibiting a higher luminance than the luminance range which is being detected exists in the object. In order to feedback the detection result by the first and second image pickup devices B1 and B2, the values of the storage times T1 and T2 are increased by predetermined quantities while keeping the ratio T1/T2, and the upper and lower limitation values of the luminance range are obtained by examining the histogram again (state of a second stage time (B)). Such operation is repeated, and the luminance range (MAX and MIN) of the object is detected (see the state of a third stage time (C)). It should be noted that during these operations, all of the pixels are not read out from the CCD constituting the first and second image pickup devices B1 and B2, but the pixels of the CCD may be thinned out and the remaining pixels may be read out. In the release operation, when the automatic mode in which the dynamic range is automatically set to a desired range is selected by the change-over switch SW, the optimized storage times T1 and T2 are selected, and when the manual mode is selected by the change-over switch SW, the storage times T1 and T2 are determined according to the selected photography mode, and a static image is photographed. Specifically, when the automatic mode is selected, optimized values of the storage times T1 and T2 of the image pickup devices B1 and B2 and optimized values of the ratio T1/T2 are obtained in accordance with the detected object luminance range (MAX and MIN), the histogram of the object luminance and the distribution of the luminance, and the photography of the static image is performed with the obtained optimized storage times T1 and T2 at the time of the release operation.

[Eleventh Embodiment]

Figure 32:
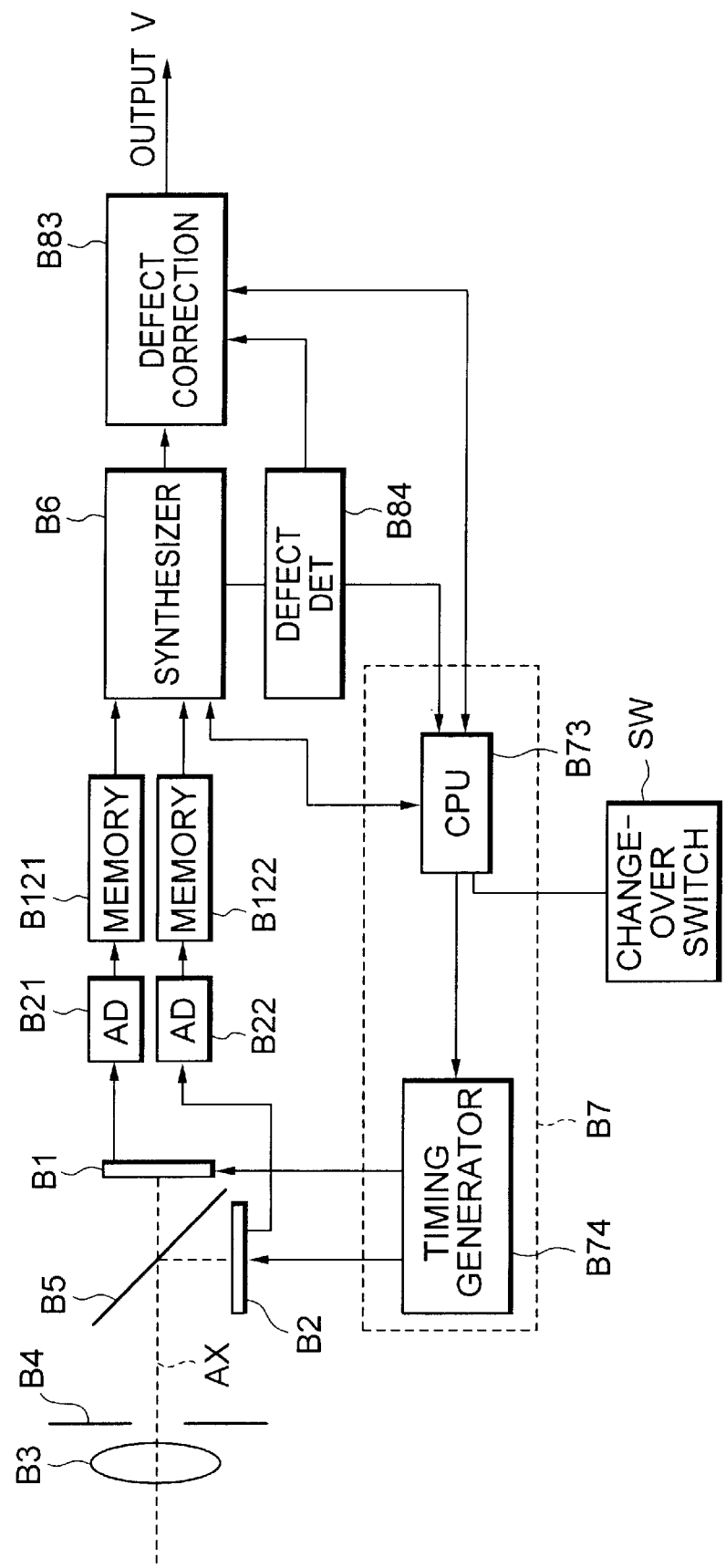
FIG. 32 is a block diagram showing a constitution of an image taking-in apparatus of an eleventh embodiment.

FIG. 32 is a figure for explaining an image taking-in apparatus of an eleventh embodiment.

The image taking-in apparatus of this embodiment comprises a defective pixel detector B83 connected in parallel to the synthesizer B6; and a defective pixel correction circuit B84 for correcting the defective pixel based on an output from the defective pixel detector B83. There is a possibility that defective pixels are included in the first and second image pickup devices B1 and B2. For example, the defective pixels are pixels that produce a white spot defect due to a very large dark current and pixels that produce a dark spot defect due to no transfer of charges of a photodiode to a vertical CCD. Moreover, these defective pixels may increase their numbers due to influences of cosmic rays and the like. When such defective pixels are included, the pixel outputs from the two first and second image pickup devices B1 and B2 have contradictive values. For example, when specified pixels that are located spatially at the same or conjugate position are paid attention to, there is possibility that an output of an image pickup device having a smaller light exposure becomes larger than that of an image pickup device having a larger light exposure. Moreover, there is a possibility that a ratio of the outputs is about 100 in spite of the fact that a ratio of the light exposure is 10. When such situation occurs isolatedly, the defective pixel detector B83 outputs a signal indicating that this pixel is defective. At this time, the defective pixel correction circuit B84 provided in a subsequent stage operates, and a defect correction is performed.

However, the storage times T1 and T2 of the two image pickup devices B1 and B2 are different. Therefore, when, for example, a high luminance object moving at a high speed is photographed, an image by an image pickup device having a longer storage time is much influenced by object blur, so that it is considered that a phenomenon in which outputs from the two image pickup devices B1 and B2 become contradictive vlaues occurs in a wide continuous region. In such case, the defect correction is not performed. Thus, an erroneous defect correction can be prevented.

It should be noted that as the defect correction method, there is a method using a pixel output outputted prior to the defective pixel by one and a method using an average of pixel outputs around the defective pixel as an output of the defective pixel.

[Twelfth Embodiment]

Figure 33:
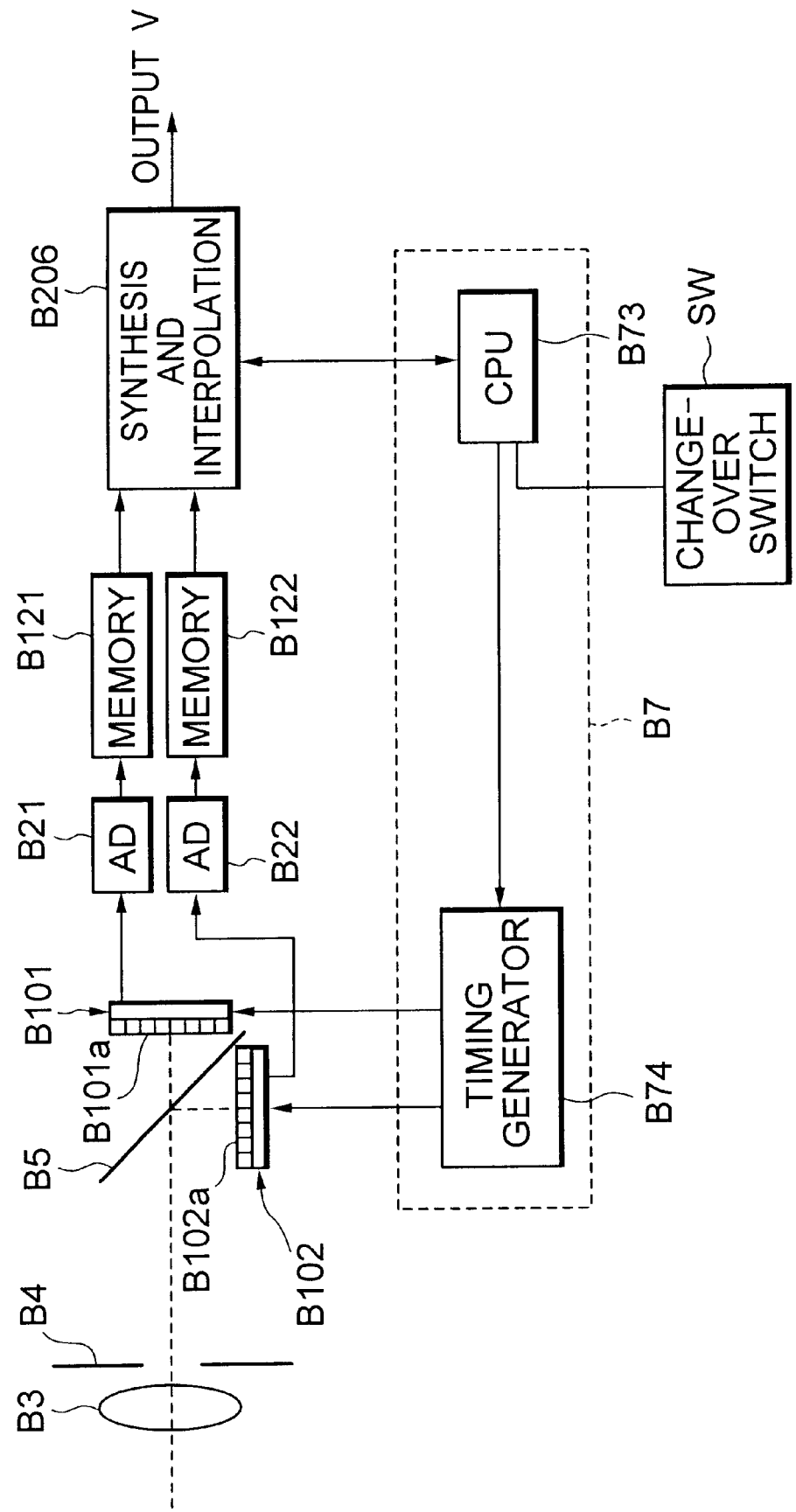
FIG. 33 is a block diagram showing a constitution of an image taking-in apparatus of a twelfth embodiment.

FIG. 33 is a figure for explaining an image taking-in apparatus of a twelfth embodiment.

The image taking-in apparatus of the twelfth embodiment uses image pickup devices B101 and B102 for taking in an image, which is formed of a color type CCD. Moreover, a synthesizer B206 for synthesizing image signals from the image pickup devices B101 and B102 has an interpolation function.

Pixels constituting the two image pickup devices (CCD) B101 and B102 are located relatively at the same position. Specifically, the method in which the pixel is shifted by ½ is not used, that is, the method which is so-called a pixel offset is not used. An on-chip type arrangement in which color filters B101$a$ and B102$a$ are provided on the image pickup devices B101 and B102 can locate the pixels at the relatively identical position or at the relatively shifted position.

FIGS. 34A and 34B, FIGS. 35A and 35B, and FIGS. 36A and 36B are figures for conceptionally explaining an arrangement example of the color filters B101$a$ and B102$a$. FIGS. 34A and 34B are examples in which all of R, G and B are arranged at the relatively same position. FIG. 34A shows an arrangement of the color filter B101$a$, and FIG. 34B shows an arrangement of the color filter B102$a$. FIGS. 35A and 35B are examples in which G is arranged at the same position and R and B are arranged at complementary positions. FIG. 35A shows an arrangement of the color filter B101$a$, and FIG. 35B shows an arrangement of the color filter B102$a$. FIGS. 36A and 36B are examples in which all of the R, G and B are arranged at relatively shifted positions. FIG. 36A shows an arrangement of the color filter B101$a$, and FIG. 36B shows an arrangement of the color filter B102$a$.

In any of the foregoing cases, though the image taking-in is realized by combining the image pickup devices B1 and B2 of Bayer array, another color filter arrangement and a complementary color filter array may be satisfactory.

For example, as shown in FIGS. 36A and 36B, when the two image pickup devices of the Bayer array are combined and used by shifting the relative position of the color filter, information as to G can be obtained for all of the pixels, and information as to R and B can be obtained at in the ratio of one pixel two one pixels.

Hereinafter, a synthesis of color image information with different light exposures, which are obtained from the two image pickup devices B1 and B2, will be described.

The synthesis in the case where all of R, G and B are arranged at the relatively same position as shown in FIGS. 34A and 34B may be performed only by superimposing corresponding pixels with a suitable weight function, similarly to the foregoing embodiment. When at least one of R, G and B is disposed at a relatively shifted position from others as shown in FIGS. 35A and 35B and FIGS. 36A and 36B, a contrivance is necessary for the synthesis and the interpolation.

To be concrete, using the outputs of the spatially adjacent pixels for each color, the synthesis of the gradation for each of R, G and B is performed (for example, in the case of the arrangement shown in FIGS. 36A and 36B, R11 and r21 are synthesized, G21 and g31 are synthesized, G12 and g22 are synthesized and B22 and b32 are synthesized), the interpolation of R, G and B is performed from the value after the synthesis thus obtained, and a full color image can be generated (first method). Alternatively, the RGB interpolation is performed for both of the images, and then the synthesis of the gradation of each component of R, G and B may be performed for each pixel (second method). Alternatively, for each pixel of the second image pickup device B102, the interpolation of each component of the corresponding pixels of the first image pickup device B101 is performed (for example, in the case of the arrangement shown in FIGS. 36A and 36B, r'11, g'21, g'12 and b'22 of the second image pickup device B102 arranged in the upper left area are generated by interpolating from the pixels around them), and the synthesis of the gradation of each component of R, G and B is performed as to the pixel position of the first image pickup device B101 and the corresponding position after the interpolation for the second image pickup device B101 (for example, in the case of the arrangement shown in FIGS. 36A and 36B, R11 and r'11 are synthesized, G21 and g'21 are synthesized, G12 and g'12 are synthesized, and B22 and b'22 are synthesized). Finally, the GBR interpolation can be performed (third method).

It should be noted that as the first method, a quantity of calculations is more decreased when the gradation synthesis processing for each of the R, G and B colors is first performed using the spatially adjacent pixels for each color, and thereafter the RGB interpolation processing is performed. On the contrary, in the case where the interpolation processing is first performed and then the gradation synthesis processing is performed as in the second method, though the quantities of calculations and memories which are needed become large, an advantage as to a false color and resolution is brought about. A method to perform an interpolation of one image, a synthesis of a gradation, and an interpolation of the synthesized image has an intermediate feature as the third method.

In this embodiment, that is, in the case of the arrangement shown in FIGS. 36A and 36B, when the bright range of the object is narrow, the storage times T1 and T2 are set so as to satisfy T1≈T2 or T1<T2, whereby it is possible to the light exposures of the two image pickup devices are allowed to be almost equal to each other. In this case, since information of G as to all of the pixels and can be obtained and information of R and B can be obtained in the ratio of one pixel to the two pixels, by performing a gain adjustment of the two image pickup devices B1 and B2 and an interpolation processing of R and B, an image with less false color and a high resolution can be obtained.

In the case where the luminance difference of the object is large in the dynamic range automatic mode and in the case where the wide dynamic range preference mode is selected in the dynamic range manual mode, a color image with a wide dynamic range can be obtained by these processings. On the other hand, in the case where the luminance difference of the object is small in the dynamic range automatic mode and in the case where the image quality preference mode is selected in the dynamic range manual mode when the luminance difference of the object is small, an image with less false color and a high resolution can be obtained.

As shown in the modification of the seventh embodiment, the strobes FL1 and FL2 are provided and a control is performed so that exposing times of the two image pickup devices B1 and B2 are equal to each other at the time of the use of the strobes FL1 and FL2, and an image preferring a quality can be obtained.

As a matter of course, though the embodiments were described independently, it is possible to combine the apparatuses of these embodiments arbitrarily. For example, the apparatus of the present invention can be constituted in such manner that a built-in strobe FL1 is provided, four selection switches (a switch SW1 for switching the dynamic range mode, a switch SW2 for switching the photography mode, a switch TSW for switching the timing mode and a switch SSW for switching the strobe mode) are provided, thus enabling to switch these, a multi-splitting SPD device is used as the object luminance detection section B10 and a synthesis of the image is performed by a software processing by the CPU B73, and the image pickup devices B1 and B2 are composed of color CCDs.

It is possible to create a combination by selecting the foregoing four switches arbitrarily. For example, the dynamic range is set only by the manual mode, and the dynamic range can be selected by the photography mode switch. In this case, the switch for switching the dynamic range automatically and manually is unnecessary, and the switch for selecting the photography mode is left. Moreover, as another example, when the mode as to the dynamic range is set only automatically, the switch for switching the automatic and manual modes of the dynamic range and the switch for switching the photography mode are unnecessary. In this case, the switch for switching the timing mode and the, switch for switching the strobe mode are provided. Moreover, a camera for setting all modes automatically in response to the conditions is possible. In this case, all of the foregoing four selection switches are unnecessary.

[Thirteenth Embodiment]

Figure 37:
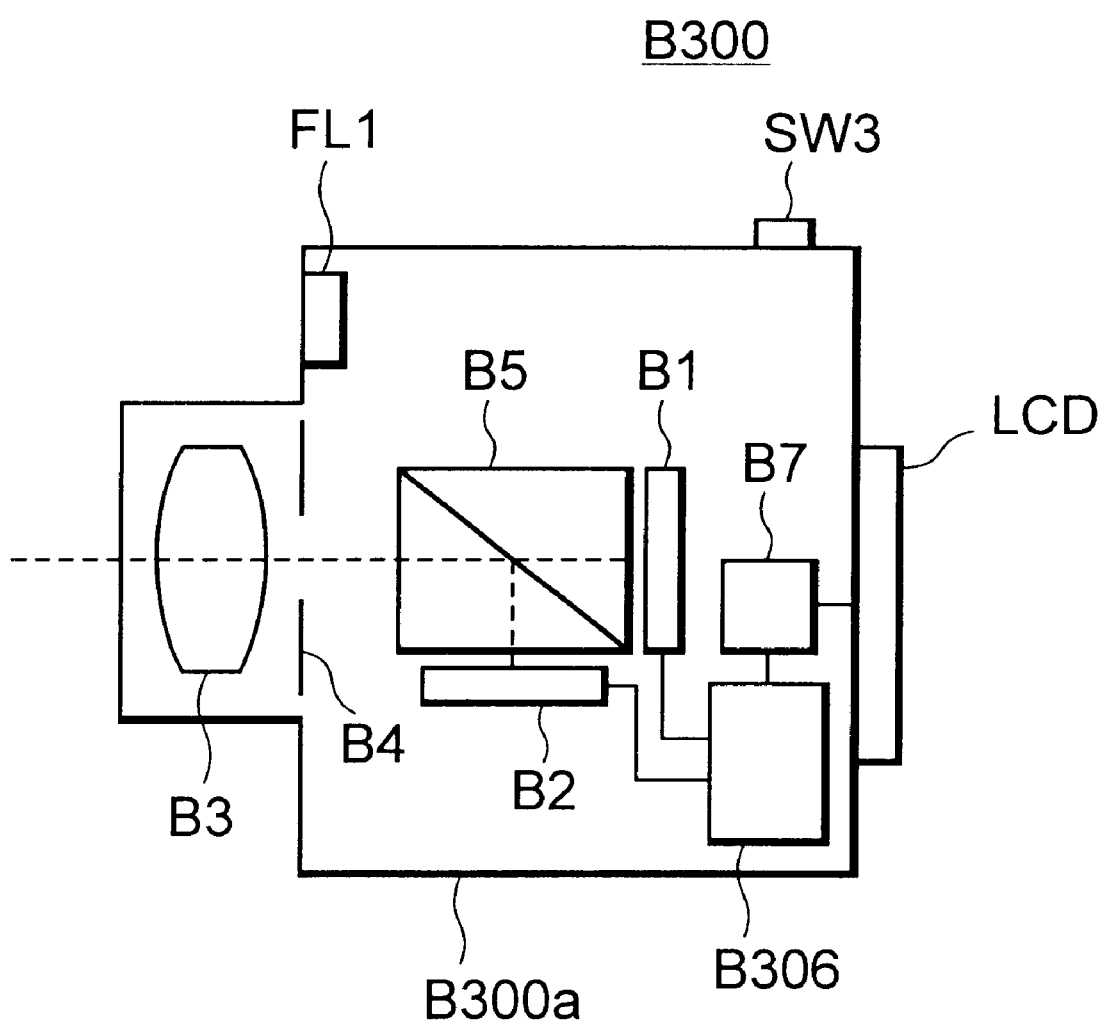
FIG. 37 is a figure for explaining a constitution of a digital still camera according to a thirteenth embodiment.

FIG. 37 shows an image taking-in apparatus of a thirteenth embodiment and shows an example in which the apparatus of this embodiment is applied to a camera.

In a box B300a fitting a taking lens B3, this camera B300 comprises a stop B4, a beam splitter B5 that is a splitting optical system, first and second CCD image pickup devices B1 and B2, an image detection synthesis circuit B306, and a control unit B7. Hereupon, the image detection synthesis circuit B306 includes AD converters B21 and B22, frame memories B121 and B122, and a synthesizer B6 for synthesizing outputs that have been subjected to the AD conversion by the AD converters B21 and B22 and outputting the synthesized output, if the image detection synthesis circuit B306 is explained by using the image taking-in apparatus of the seventh embodiment shown in FIG. 26. Moreover, a liquid crystal display LCD which functions as a finder for monitoring is fitted to a back plane of the box B300a. This liquid crystal display LCD is used also for selecting operation modes of the camera such as a dynamic range automatic mode, a dynamic range manual mode, a wide dynamic range preference mode and an image quality preference mode, and a photographer can set an operation state of the control unit B7 by means to the command button SW3 while viewing a menu displayed on the liquid crystal display LCD.

In this embodiment, a detection of the object luminance range and an AF detection are performed by the first and second image pickup devices B1 and B2 itself formed of a CCD, and outputs of the first and second image pickup devices B1 and B2 that have been subjected to a luminance synthesis are displayed on the liquid crystal display LCD. Thus, a camera which can obtain an image with a wide dynamic range can be realized. Furthermore, when the first and second image pickup devices B1 and B2 is formed of a color CCD, a camera which can obtain an image with less false color and a good resolution can be realized. Moreover, an image with a wide dynamic range for a moving picture and a static picture can be obtained. Alternatively, the apparatus of this embodiment may be constituted such that the apparatus uses the image information of one image pickup device at the time of the moving picture similarly to an ordinary video camera, and performs a luminance synthesis using the image information of both image pickup devices at the time of the static picture, thus obtaining the static picture with a wide dynamic range.

A technique of the image synthesis can be achieved by suitably combining the components described in the fifth to twelfth embodiments. As the method for detecting the object luminance range and controlling the storage time, it is satisfactory to perform almost the same processing shown in FIGS. 31A and 31B. In order to cope with the dynamic or moving picture, a feedback control is performed in accordance with a change of the object luminance range, and a processing following the change must be performed.

[Fourteenth Embodiment]

Figure 38:
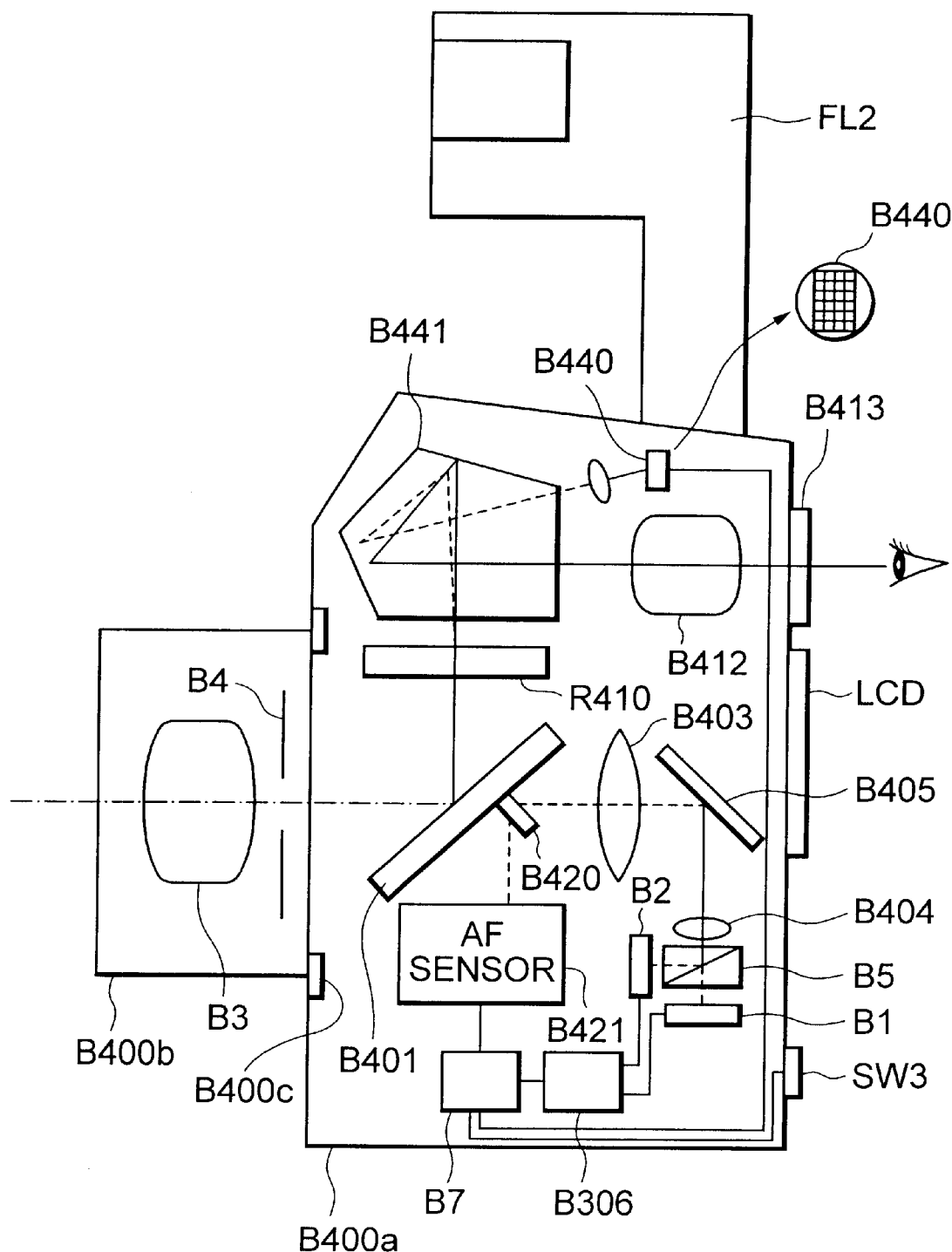
FIG. 38 is a figure for explaining a constitution of a digital still camera according to a fourteenth embodiment.
Figure 39:
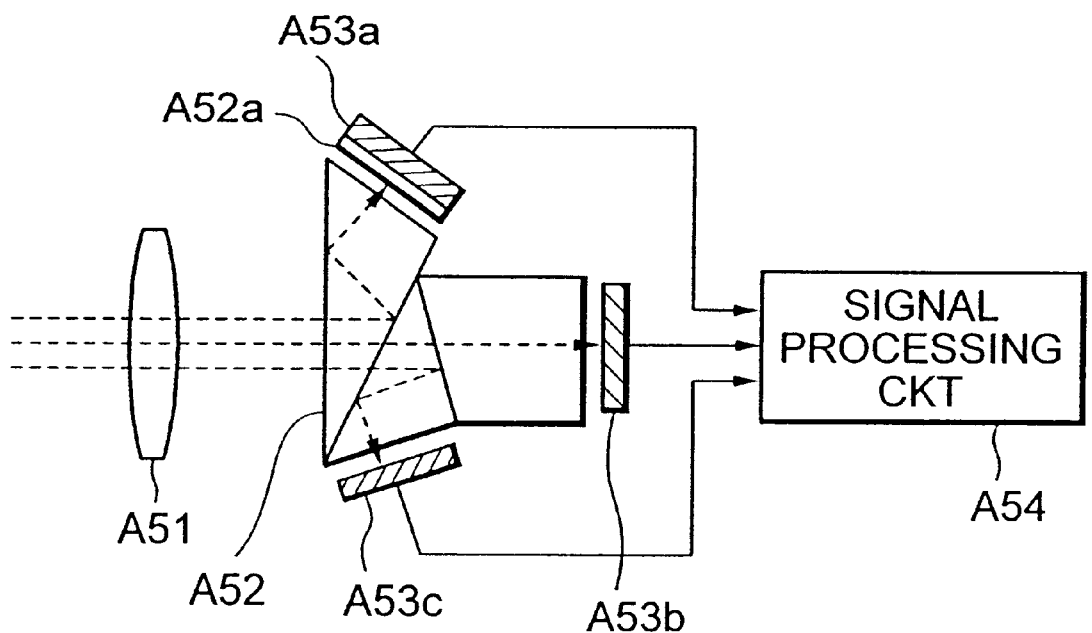
FIG. 39 is a figure for explaining a conventional image pickup apparatus.
Figure 41:
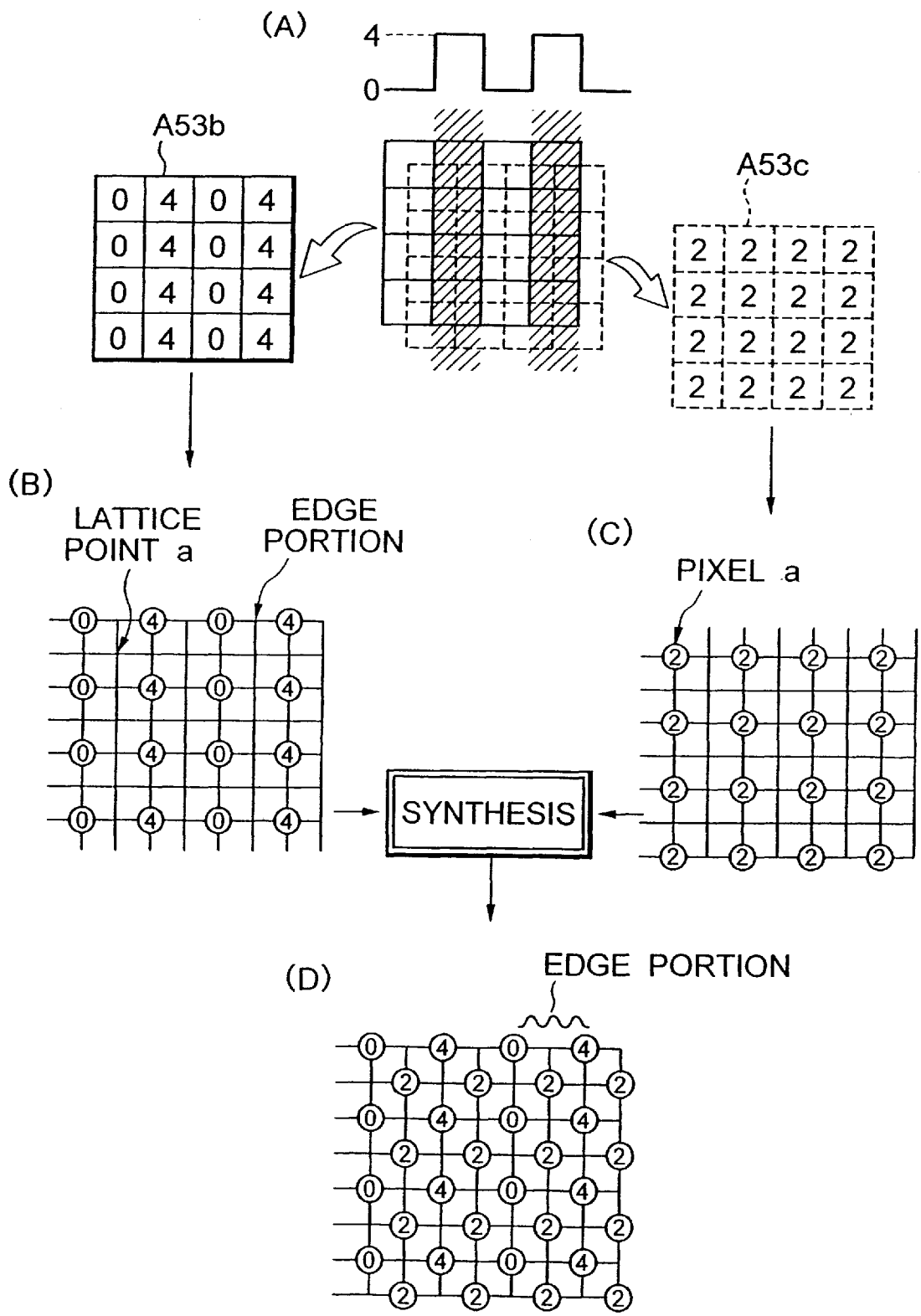
FIG. 41 is a figure for explaining a subject.
Figure 42A:
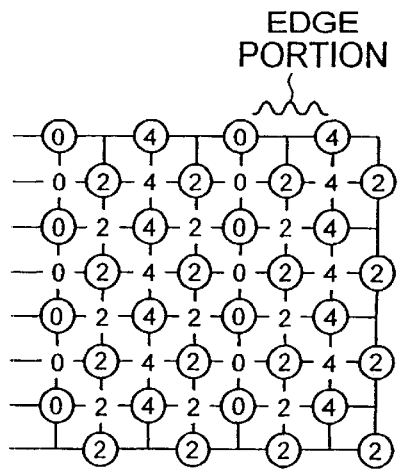
FIGS. 42A to 42D are figures for explaining a subject.
Figure 42B:
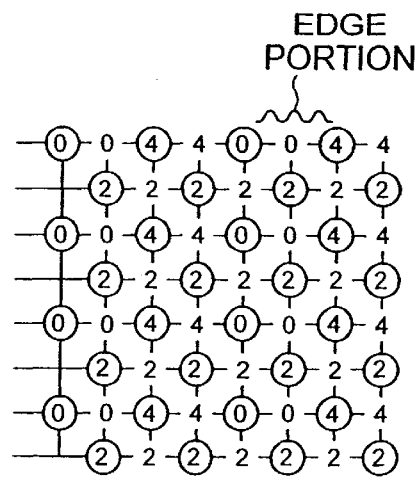
Figure 42C:
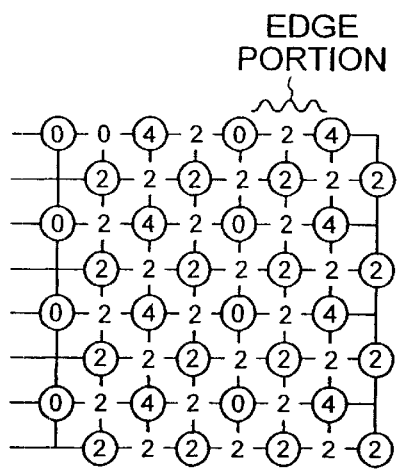
Figure 42D:
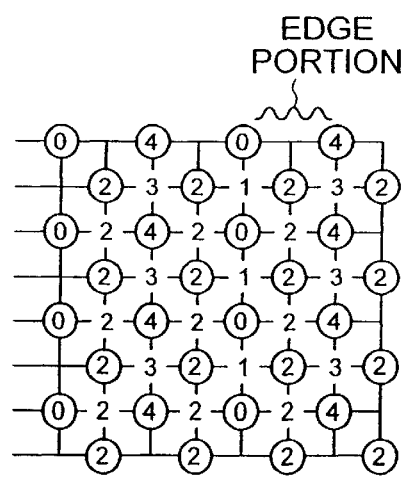
Figure 44:
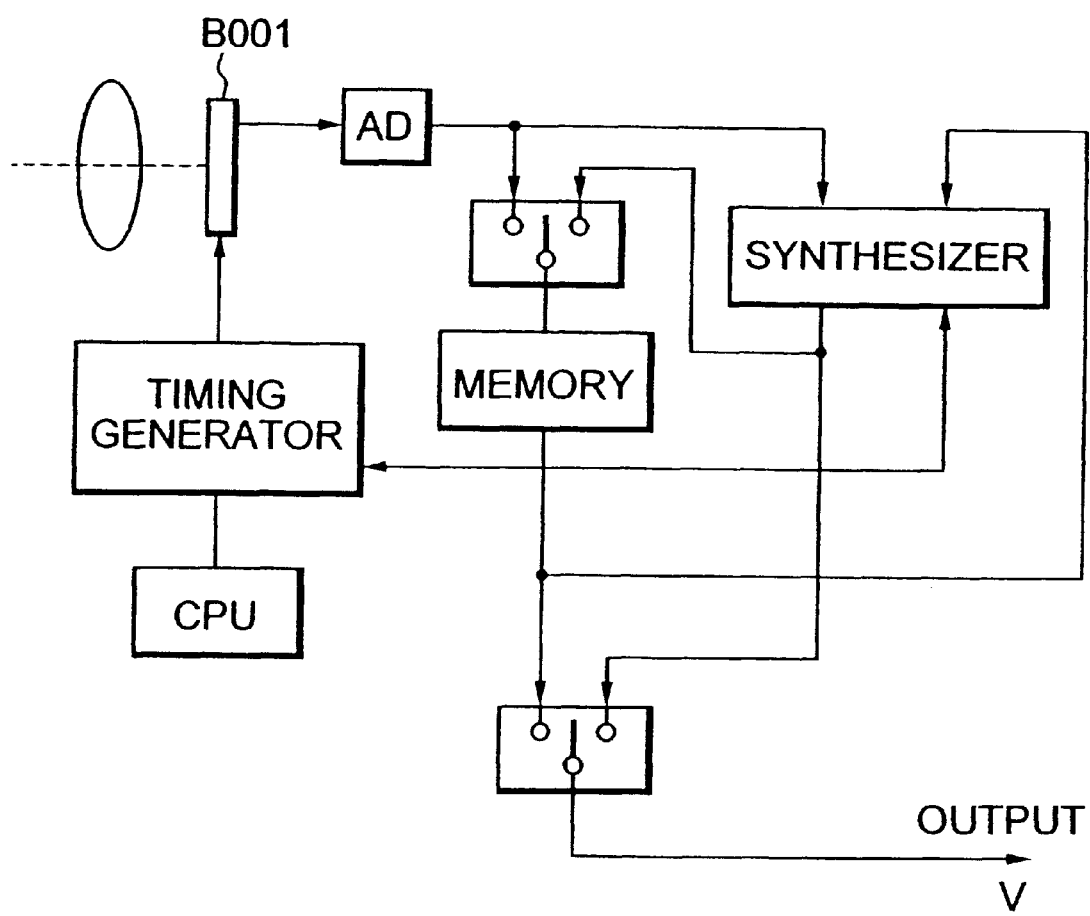
FIG. 44 shows a third type of conventional image pickup apparatus.
Figure 45:
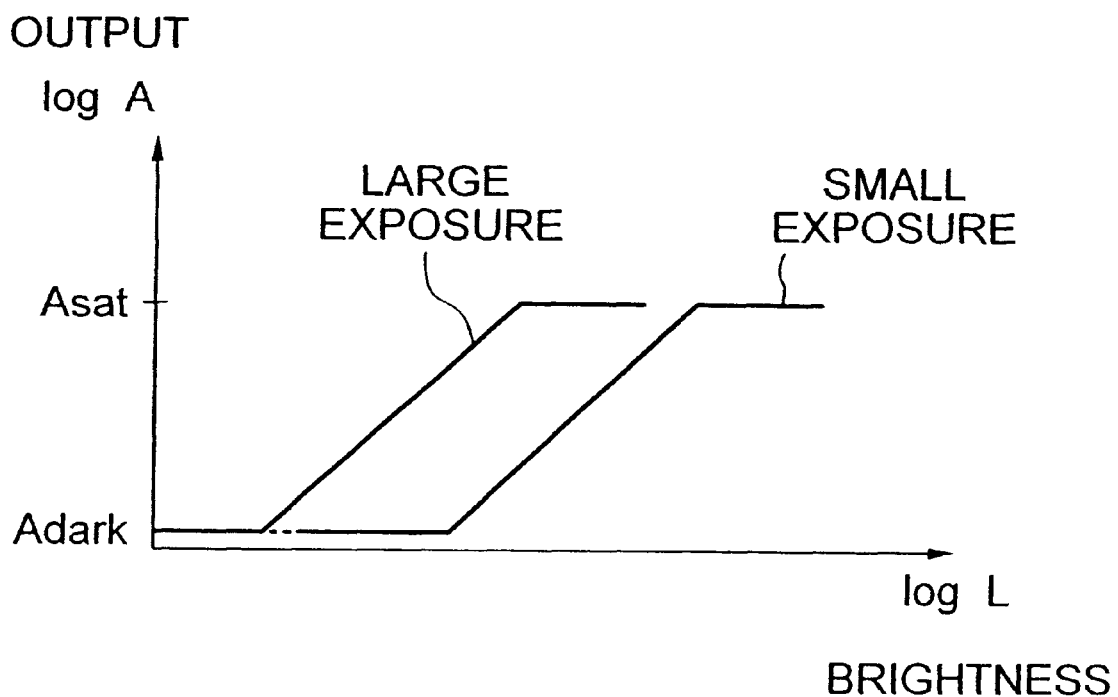
FIG. 45 shows a method of synthesis regarding the luminance.

FIG. 38 shows an image taking-in apparatus of a fourteenth embodiment, which shows an example in which the apparatus of this embodiment is applied to a digital still camera.

This camera B400 comprises a body B400a and an interchangeable lens B400b. The camera lens B400b is an interchangeable lens for use in an ordinary single-lens reflex camera, and fixed to the body B400a with a lens mount B400c for use in the single-lens reflex camera therebetween. Light passing through the camera lens B400b passes through a main mirror B401 and is guided into a beam splitter B5 via a re-imaging optical system composed of lenses B403 and B404 disposed on the plane corresponding to a portion behind a film plane and a fixed mirror B405. On the other hand, a light reflected by the main mirror passes through a focussing screen B410 and a penta-prism B411, and further travels through a lens B412. Then, the light travelling through the lens b412 is guided into an optical finder B413.

It should be noted that a sub mirror B420 is arranged on the back plane side of the main mirror B401, and a focal point detection is performed by an AF sensor B421. It should be noted that the AF sensor B421 is not limited to the one of this embodiment. For example, the AF sensor may be arranged in other positions, or the AF detection may be performed by the image pickup devices B1 and B2 themselves.

In this embodiment, in order to detect the object luminance range, an splitting sensor B440 for AE is used similarly to the ordinary single-lens reflex camera. It should be noted that the AF sensor B44 is not limited to the one of this embodiment. For example, a luminance range may be directed by the CCD imaging devise B1 and/or B2 themselves. Switching of the dynamic range between the automatic mode and the manual mode is performed by a button while looking the menu displayed on the liquid crystal display LCD. It should be noted that the liquid crystal display LCD may be a color matrix liquid crystal display capable of displaying a color image, or a black and white liquid crystal display exclusively for use in displaying the mode.

With such constitution, an interchangeable lens for use in a single-lens reflex camera can be utilized as a lens for use in the digital still camera, and by applying the inventions exemplified in the first to twelfth embodiments, an image with a wide dynamic range and an image with less false color or signal and a good resolution can be obtained. In addition, a manipulation method of the camera itself is the same as that of an ordinarily single-lens reflex camera, so that a manipulation without malaise is possible.

In the fifth to fourteenth embodiments, the method for performing the synthesis of the wide dynamic range without the pixel offset was described. However, the wide dynamic range synthesis may be actually performed by performing a ½ pixel offset or shift with the two image pickup devices.

Specifically, as shown in the first to fourth embodiments, the ½ pixel offset is performed as to the two image pickup devices, and then an image is taken in the with different light exposure. Next, the output from each image pickup device is individually subjected to the interpolation processing, thus forming images with different light exposures. Subsequently, the two images are synthesized while considering the ½ pixel offset and the exposure light difference.

Thus, an image with a wide dynamic range and an enhanced resolution can be obtained.

Although the preferred embodiments of the present invention have been described in detail, it should be understood that various changes, substitution and alternations can be made therein without departing from spirit and scope of the inventions as defined by the appended claims.

What is claimed is:

1. An image taking-in apparatus comprising:

a splitting optical system arranged on an axis incident light from an object, the splitting optical system separating an optical path into two directions;

first and second image pickup means, the first image pickup means being arranged on an optical axis of one optical path separated by said splitting optical system and the second image pickup means being arranged on an optical axis of the other optical path separated by said splitting optical system;

first selecting means for selectively switching between an automatic mode in which the apparatus automatically sets a dynamic range of a picked-up image to a predetermined range and a manual mode in which a photographer manually sets the dynamic range to a desired range;

object luminance range detecting means for detecting an object luminance range that is a luminance range of an object;

AD converting means for performing an AD conversion for outputs of said first and second image pickup means;

synthesizing means for synthesizing the outputs of said first and second image pickup means, which have been subjected to the AD conversion, to output the synthesized output; and control means for setting a storage time of image information from said first image pickup means and a storage time of image information from said second image pickup means in response to the object luminance range detected by said object luminance range detecting means when the automatic mode is selected by said first selecting means.

2. The image taking-in apparatus according to claim 1, wherein when said first selecting means selects said automatic mode, said control means selects a ratio (T1/T2) of the storage time T1 of said first image pickup means to the storage time T2 of said second image pickup means in response to the object luminance range detected by said object luminance range detecting means.

3. The image taking-in apparatus according to claim 1, further comprising second selecting means which is capable of selectively switching an extent of the dynamic range when a photographer sets the dynamic range of a picked-up image to a desired range manually.

4. The image talking-in apparatus according to claim 3, wherein when the photographer sets the dynamic range of the picked-up image to a desired range manually, a ratio (T1/T2) of the storage time T1 of said first image pickup means to the storage time (T2) of said second image pickup means is selected in accordance with an extent of the dynamic range selected by said second selecting means.

5. An image taking-in apparatus comprising:
a splitting optical system arranged on an axis of incident light from an object, the splitting optical system separating an optical path into two directions and keeping a light quantity separation ratio at a predetermined value;
first and second image pickup means, the first image pickup means being arranged on an optical axis of one optical path separated by said splitting optical system and the second image pickup means being arranged on an optical axis of the other optical path separated by said splitting optical system;
object luminance range detecting means for detecting an object luminance range that is a luminance range of an object;
AD converting means for performing an AD conversion for outputs of said first and second image pickup means;
synthesizing means for luminance synthesizing outputs of said first and second image pickup means, which have been subjected to the AD conversion, to output a synthesized output; and
control means for setting a storage time of image information from said first image pickup means and a storage time of image information from said second image pickup means in response to the object luminance range detected by said object luminance range detecting means.

6. An image taking-in apparatus comprising:
a splitting optical system arranged on an axis of incident light from an object, the splitting optical system separating an optical path into two directions;
first and second image pickup means, the first image pickup means being arranged on an optical axis of one optical path split by said splitting optical system and second image pickup means being arranged on an optical axis of the other optical path split by said splitting optical system;
adjusting means provided so that a photographer manually sets a dynamic range of a photographed image to a desired range;
AD converting means for performing an AD conversion for outputs of said first and second image pickup means;
synthesizing means for luminance synthesizing the outputs of said first and second image pickup means, which have been subjected to the AD conversion, to output the synthesized output; and
control means for setting a storage time of image information from said first image pickup means and a storage time of image information from said second image pickup means in response to said desired range set by said adjusting means.

7. The image taking-in apparatus according to any one of claims 1 to 6, wherein when a rate of a light quantity separated into said first image pickup means is indicated by r1 and a rate of a light quantity separated into said second image pickup means is indicated by r2, a ratio (r1/r2) is assumed to be a fixed value other than one.

8. The image taking-in apparatus according to claim 7, wherein when a rate of a light quantity separated into said first image pickup means is indicated by r1 and a rate of a light quantity separated into said second image pickup means is indicated by r2, a ratio (r1/r2) is a fixed value ranging from 2 to 20.

9. The image taking-in apparatus according to claim 8, wherein said ratio (r1/r2) is a fixed value ranging from 4 to 10.

10. The image picking-in apparatus according to claim any one of claims 1 to 6, said apparatus further comprising:
third selecting means which selects a relative relation between a timing of the storage time T1 of said first image pickup means and a timing of the storage time T2 of said second image pickup means at the time of a release operation,
wherein said control means controls said first and second image pickup means in accordance with the relative relation selected by said third selecting means.

11. The image taking-in apparatus according to claim 10, wherein when a difference between completion times at which the storage of said first and second image pickup devices terminate is equal to a predetermined value or more, image information outputted from one image pickup means with a shorter storage time is first read out, thus storing the read-out image information in memory means temporarily, and image information outputted from the other image pickup means with a longer storage time is subsequently read out, thus synthesizing images by the synthesizing means based on the image information stored in the memory means and the image information of the other image pickup means.

12. The image taking-in apparatus according to any one of claims 1 to 6, further comprising:
processing means for transforming a grayscale of each of image information outputted from said first and second image pickup means,
wherein an image synthesis is performed by the synthesizing means based on the image information that has been subjected to the grayscale transformation by said processing means.

13. The image taking-in apparatus according to any one of claims 1 and 5, wherein said object luminance range detecting means is realized by using said first and second image pickup devices, and said storage times T1 of said first image pickup device and T2 of said second image pickup device are changed in a state where a ratio (T1/T2) of the storage time T1 to the storage time T2 is kept at a predetermined value or more, thereby detecting an object luminance range.

14. The image taking-in apparatus according to any one of claims 1 to 6, wherein said synthesizing means performs the synthesis at a luminance overlapping portion where a luminance of image information outputted from said first and second image pickup devices by using a weight function which value changes in accordance with a luminance continuously, and said weight function changes its shape and parameter in accordance with any one of an extension of said object luminance range and an extension of the dynamic range which is set manually by the photographer.

15. The image taking-in apparatus according to any one of claims 1 to 6, wherein said synthesizing means performs the synthesis by forcibly adding the image informations outputted by said first and second image pickup means.

16. The image taking-in apparatus according to any one of claims 1 to 6, further comprising:
a strobe;
fourth selecting means for selecting a flash mode of the strobe; and
strobe reaching region discriminating means for detecting a region where the strobe reaches in the image,
wherein said synthesizing means performs a synthesis at a luminance overlapping portions of image informations outputted from said first and second image pickup devices by using a weight function which value changes in accordance with a luminance continuously, and the weight function changes its shape and parameter in accordance with results discriminated by said strobe reaching region discriminating means.

17. The image taking-in apparatus according to any one of claims 1 to 6, further comprising:

a strobe; and fourth selecting means for selecting a flash mode of the strobe, wherein said control means controls said first and second image pickup devices so that storage times of said first and second image pickup devices become equal to each other automatically at the time of use of the strobe, and said synthesizing means performs a synthesis by forcibly adding image information outputted from said first and second image pickup devices.

18. The image taking-in apparatus according to any one of claims 1 to 6, wherein said first and second image pickup devices are color image pickup means each capable of taking in a full color image.

19. The image taking-in apparatus according to claim 18, wherein said color image pickup means has an on-chip color filter, pixels are arranged in the relatively same position, and colors of the on-chip color filter are arranged in relatively shifted positions.

20. The image taking-in apparatus according to any one of claims 1 to 6, wherein in accordance with one of an extension of said object luminance range and an extension of the dynamic range which is set by the photographer, an algorithm of the synthesis by said synthesizing means is switched.

21. The image taking-in apparatus according to any one of claims 1 to 6, wherein said first and second image pickup means are color image pickup means each capable of taking a full color image, when said object luminance range is narrow, or when an extension of the dynamic range which is set by the photographer manually is narrow, said synthesizing means synthesizes images using an algorithm which prefers a prevention of a false color and an enhancement of a resolution, and when said object luminance range is broad, or when an extension of the dynamic range which is set by the photographer manually is broad, said synthesizing means synthesizes images by using an algorithm which prefers a dynamic range extension.

22. The image taking-in apparatus according to claim 10, further comprising:

a strobe; and fourth selecting means for selecting a flash mode of the strobe, wherein when the strobe is used, timing of the flash of the strobe is allowed to match with the timing selected by said third selecting means, and the strobe is made to flash in accordance with the exposing times of said first and second image pickup means.

23. An image taking-in apparatus comprising:

a splitting optical system arranged on an axis of incident light from an object, the splitting optical system separating an optical path into two directions;

first and second image pickup means in which color filters with a Bayer array are provided, the first image pickup means being arranged on an optical axis of one optical path split by said splitting optical system and the second image pickup means being arranged on an optical axis of the other optical path split by said splitting optical system, both of image pickup means being relatively offset by one pixel from each other;

AD converting means for performing an AD conversion for outputs of said first and second image pickup means;

synthesizing means for luminance synthesizing the outputs of said first and second image pickup means, which have been subjected to the AD conversion, to output the synthesized output; and control means for setting a storage time of image information from said first image pickup means and a storage time of image information from said second image pickup means in response to an object luminance range measured or a dynamic range of a photographed image which is set by a photographer manually.

\* \* \* \* \*